(12) United States Patent
Nishikawa et al.

(10) Patent No.: US 12,152,645 B2
(45) Date of Patent: Nov. 26, 2024

(54) PAD PIN RECEIVER, DISC BRAKE PAD, AND DISC BRAKE DEVICE

(71) Applicant: AKEBONO BRAKE INDUSTRY CO., LTD., Tokyo (JP)

(72) Inventors: Yutaka Nishikawa, Tokyo (JP); Isao Ishiguro, Tokyo (JP); Ryo Otake, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 252 days.

(21) Appl. No.: 17/149,198

(22) Filed: Jan. 14, 2021

(65) Prior Publication Data

US 2021/0215212 A1 Jul. 15, 2021

(30) Foreign Application Priority Data

Jan. 15, 2020 (JP) .................. 2020-004654

(51) Int. Cl.
*F16D 55/226* (2006.01)
*F16D 65/00* (2006.01)
(Continued)

(52) U.S. Cl.
CPC ....... *F16D 65/0006* (2013.01); *F16D 55/226* (2013.01); *F16D 65/095* (2013.01); *F16D 65/0977* (2013.01)

(58) Field of Classification Search
CPC ............. F16D 65/0977; F16D 65/0979; F16D 65/0006; F16D 65/095; F16D 65/097;
(Continued)

(56) References Cited

U.S. PATENT DOCUMENTS 5,284,228 A * 2/1994 Weiler .................. F16D 65/092
188/73.38
5,564,532 A 10/1996 Baba et al.
(Continued)

FOREIGN PATENT DOCUMENTS

DE U1-8023707 1/1982
DE 3338255 A * 5/1985 ......... F16D 65/0006
(Continued)

OTHER PUBLICATIONS

Machine translation of JP 2009-156334 (no date).*
(Continued)

*Primary Examiner* — Nicholas J Lane
(74) *Attorney, Agent, or Firm* — Faegre Drinker Biddle & Reath LLP

(57) ABSTRACT

A pad pin receiver includes a body plate is attached to an inner side of a pin insertion portion provided in a back plate of a disc brake pad. The pin insertion portion engages with a pin inserted into the pin insertion portion during braking. The body plate covers a portion of an inner peripheral surface of the pin insertion portion. A bent plate is bent at at least one end portion of the body plate in a length direction of the body plate. When the body plate is attached to the pin insertion portion, the body plate extends in a thickness direction of the back plate, and the bent plate overlaps with the back plate in the thickness direction of the back plate.

16 Claims, 59 Drawing Sheets

(51) Int. Cl.
*F16D 65/095* (2006.01)
*F16D 65/097* (2006.01)

(58) Field of Classification Search
CPC ............. F16D 65/0972; F16D 65/0973; F16D 65/0978; F16D 55/226
See application file for complete search history.

(56) References Cited

U.S. PATENT DOCUMENTS

| | | | |
|---|---|---|---|
| 5,706,917 A * | 1/1998 | Matsuzaki | F16D 65/0977 188/73.38 |
| 2002/0029942 A1 | 3/2002 | Miyata | |
| 2006/0060430 A1 * | 3/2006 | Schog | F16D 65/095 188/73.31 |
| 2006/0060432 A1 | 3/2006 | Schog et al. | |
| 2008/0006490 A1 * | 1/2008 | Jedele | F16D 65/0977 188/73.38 |
| 2011/0226566 A1 | 9/2011 | Zenzen et al. | |
| 2014/0291082 A1 * | 10/2014 | Mallmann | F16D 65/0972 188/250 E |
| 2014/0367208 A1 * | 12/2014 | Miyake | F16D 55/227 188/72.3 |
| 2015/0122602 A1 * | 5/2015 | Shimamura | F16D 55/228 188/250 E |
| 2016/0131209 A1 * | 5/2016 | Becker | F16D 65/0977 188/217 |
| 2017/0097057 A1 * | 4/2017 | Burgoon | F16D 65/0978 |
| 2017/0102042 A1 * | 4/2017 | Crippa | F16D 55/228 |
| 2018/0112732 A1 * | 4/2018 | Arakane | F16D 66/022 |
| 2019/0024736 A1 * | 1/2019 | Salzmann | F16D 65/543 |
| 2019/0338816 A1 | 11/2019 | Denhard et al. | |

FOREIGN PATENT DOCUMENTS

| | | | |
|---|---|---|---|
| EP | 0157169 A2 * | 10/1985 | |
| EP | A2-0563689 | 10/1993 | |
| EP | 1447585 A2 * | 8/2004 | ........... F16D 65/097 |
| JP | H01-180027 U | 12/1989 | |
| JP | H03-000133 U | 1/1991 | |
| JP | H06-032771 U | 4/1994 | |
| JP | H09-242795 A | 9/1997 | |
| JP | 2006-520448 A | 9/2006 | |
| JP | 2009156334 A * | 7/2009 | |
| JP | 2015-090201 A | 5/2015 | |
| JP | 2015-203479 A | 11/2015 | |

OTHER PUBLICATIONS

English-language abstract of DE 3338255 (no date).*
English-language abstract of EP 1447585 (no date).*
Extended European Search Report issued on May 18, 2021 in corresponding European patent application 21151803.0 (7 pages).
Japanese Office Action issued Aug. 1, 2023 in Application No. 2020-004654.

* cited by examiner

THE OTHER CIRCUMFERENTIAL SIDE

ONE CIRCUMFERENTIAL SIDE

ONE CIRCUMFERENTIAL SIDE

THE OTHER CIRCUMFERENTIAL SIDE

AXIALLY INNER SIDE        AXIALLY OUTER SIDE

THE OTHER CIRCUMFERENTIAL SIDE

ONE CIRCUMFERENTIAL SIDE

ONE CIRCUMFERENTIAL SIDE

THE OTHER CIRCUMFERENTIAL SIDE

THE OTHER CIRCUMFERENTIAL SIDE    ONE CIRCUMFERENTIAL SIDE

ONE CIRCUMFERENTIAL SIDE    THE OTHER CIRCUMFERENTIAL SIDE

THE OTHER CIRCUMFERENTIAL SIDE  ONE CIRCUMFERENTIAL SIDE

ONE CIRCUMFERENTIAL SIDE  THE OTHER CIRCUMFERENTIAL SIDE

THE OTHER CIRCUMFERENTIAL SIDE    ONE CIRCUMFERENTIAL SIDE

ONE CIRCUMFERENTIAL SIDE    THE OTHER CIRCUMFERENTIAL SIDE

THE OTHER CIRCUMFERENTIAL SIDE    ONE CIRCUMFERENTIAL SIDE

ONE CIRCUMFERENTIAL SIDE    THE OTHER CIRCUMFERENTIAL SIDE

AXIALLY INNER SIDE    AXIALLY OUTER SIDE

AXIALLY INNER SIDE

AXIALLY OUTER SIDE

THE OTHER CIRCUMFERENTIAL SIDE　　　ONE CIRCUMFERENTIAL SIDE

THE OTHER CIRCUMFERENTIAL SIDE　　　ONE CIRCUMFERENTIAL SIDE

THE OTHER CIRCUMFERENTIAL SIDE     ONE CIRCUMFERENTIAL SIDE

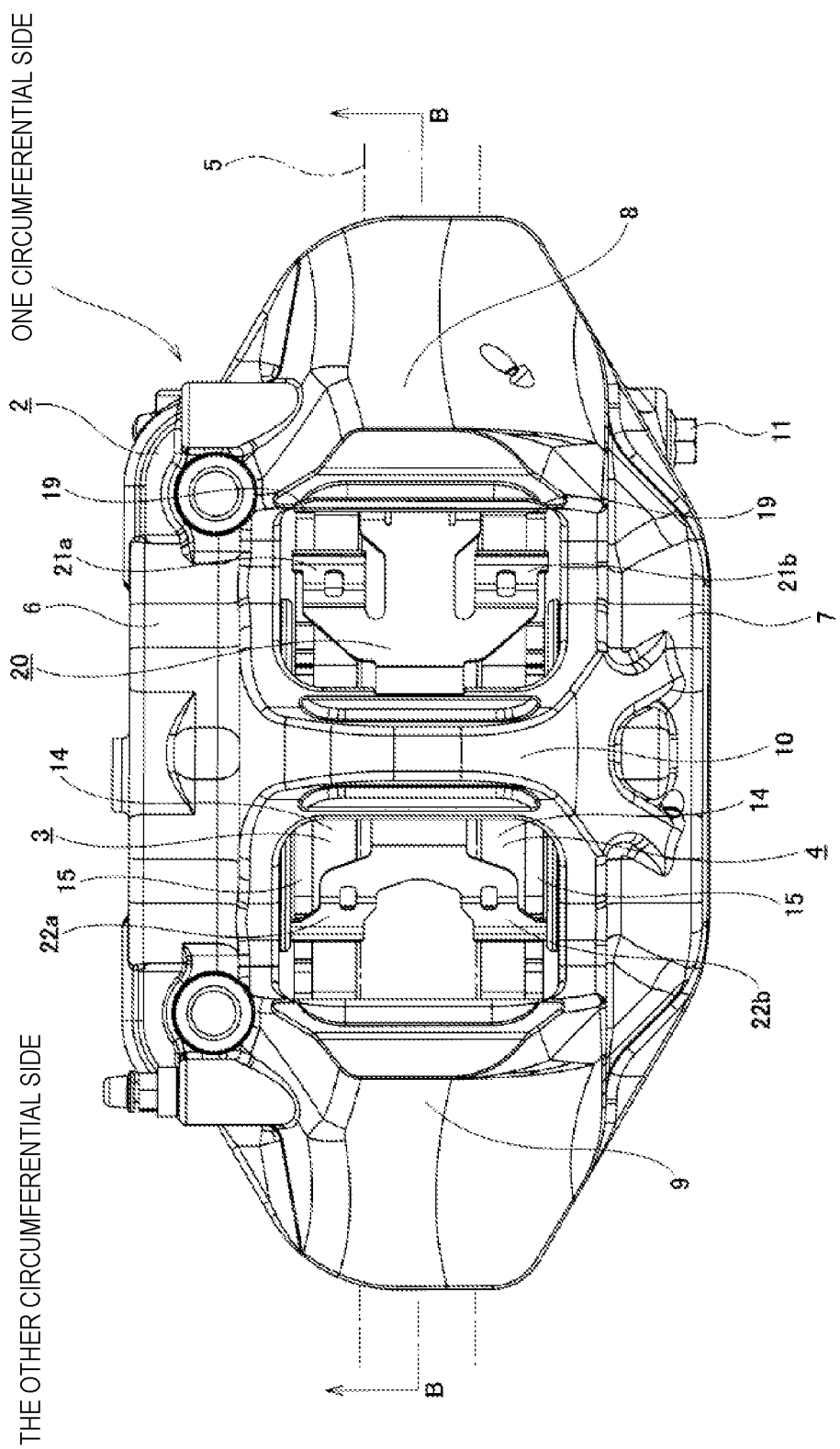

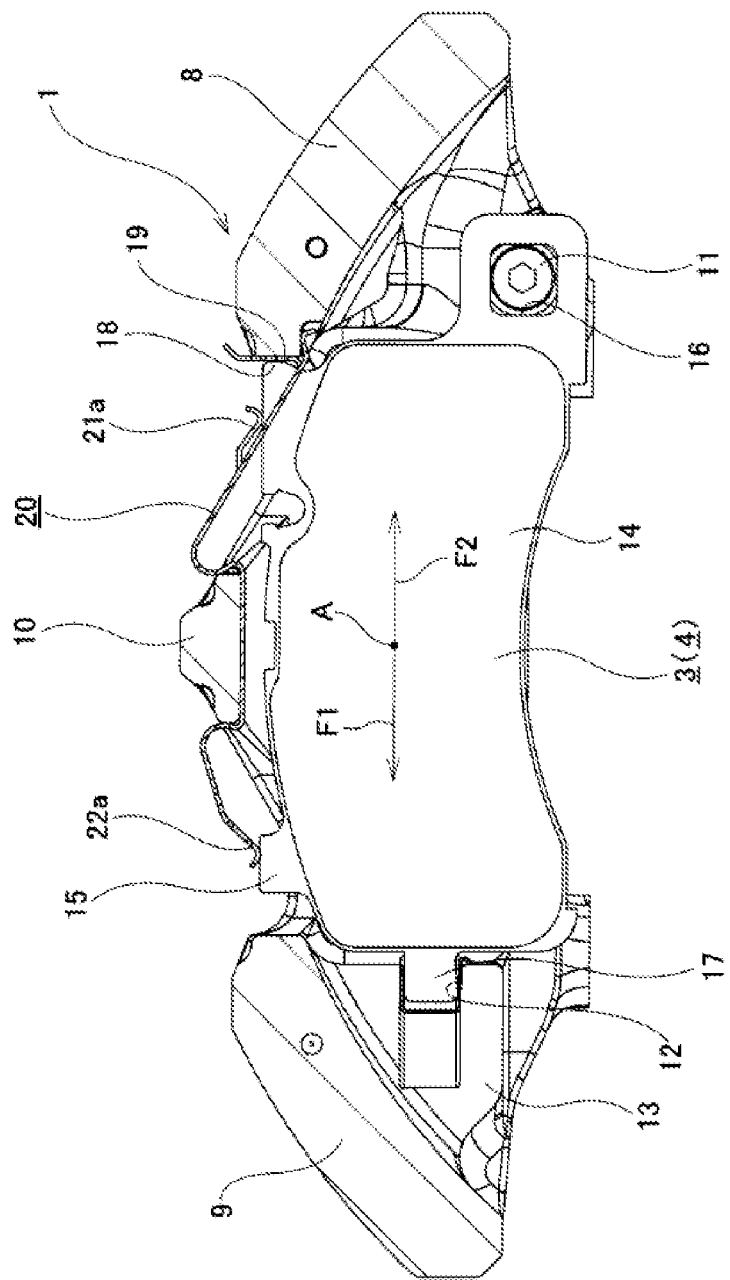

THE OTHER CIRCUMFERENTIAL SIDE　　　ONE CIRCUMFERENTIAL SIDE

THE OTHER CIRCUMFERENTIAL SIDE　　　ONE CIRCUMFERENTIAL SIDE

PAD PIN RECEIVER, DISC BRAKE PAD, AND DISC BRAKE DEVICE

CROSS-REFERENCE TO RELATED APPLICATIONS

The disclosure of Japanese Patent Application No. 2020-004654 filed on Jan. 15, 2020, including specification, drawings and claims is incorporated herein by reference in its entirety.

BACKGROUND

The present disclosure relates to a disc brake device used for braking a vehicle such as an automobile, in which a pin insertion portion provided on a back plate of a disc brake pad engages with a pin inserted into the pin insertion portion when braking.

An automobile disc brake device includes a pair of pads disposed on two sides of a rotor that rotates together with a wheel and a pad support member that supports the pair of pads to be movable. The disc brake device brakes the automobile by pressing the pair of pads against two side surfaces of the rotor. In such a disc brake device, the pads and the pad support member may collide with each other and generate abnormal sound called crunch sound (striking sound, clicking sound). A main cause of the crunch sound is that directions of moments that act on the pads during braking are opposite between forward braking and reverse braking.

JP-A-2015-90201 discloses a structure of a disc brake device in which directions of moments that act on pads during braking are the same between forward braking and reverse braking in order to prevent crunch sound. FIGS. 57 to 59B illustrate the disc brake device described in JP-A-2015-90201. A disc brake device 1 includes a caliper 2 serving as a pad support member, an inner pad 3, and an outer pad 4.

The caliper 2 supports the inner pad 3 and the outer pad 4 to be movable in an axial direction (upper-lower direction in FIG. 57, front-back direction in FIG. 58). The caliper 2 includes an inner body 6 and an outer body 7 disposed on two sides of a rotor 5 (see FIG. 57) in the axial direction, a rotation-in side coupling portion 8 and a rotation-out side coupling portion 9 each of which joints one of two circumferential side end portions of the inner body 6 with a corresponding one of two circumferential side end portions of the outer body 7, and a center bridge 10 that joints a circumferential intermediate portion of the inner body 6 with a circumferential intermediate portion of the outer body 7. The rotation-in side coupling portion 8 has an abutted surface 18 at a part where the rotation-in side coupling portion 8 faces the center bridge 10 in a circumferential direction.

In the disc brake device 1, the axial direction, the circumferential direction, and a radial direction refer to an axial direction, a circumferential direction, and a radial direction of the rotor 5 unless otherwise specified.

Each of the inner body 6 and the outer body 7 includes a pin 11 and a guide groove 12 to support the inner pad 3 and the outer pad 4 to be movable in the axial direction. Specifically; each of the inner body 6 and the outer body 7 includes the pin 11 at a radially inner side portion of one circumferential side portion. The pin 11 is in parallel to a central axis of the rotor 5. Each of the inner body 6 and the outer body 7 includes a guide wall portion 13 axially protruding on an axially inner side surface of the other circumferential side portion. The guide wall portion 13 has, at its radially intermediate portion, the guide groove 12 opening toward the axially inner side surface and one circumferential side surface. In the illustrated example, one circumferential side corresponds to a rotation-in side when a vehicle is traveling forward, and the other circumferential side corresponds to a rotation-out side when the vehicle is traveling forward.

Each of the inner pad 3 and the outer pad 4 includes a friction member 14 and a back plate 15 that supports a back surface of the friction member 14. The back plate 15 has a substantially rectangular insertion hole 16 serving as a pin insertion portion on the radially inner side portion of the one circumferential side portion (rotation-in side end portion), and includes a convex ear portion 17 protruding in the circumferential direction on the other circumferential side surface (rotation-out side side surface).

The pin 11 provided on the one circumferential side portion of each of the inner body 6 and the outer body 7 is inserted through the insertion hole 16 in the axial direction. The ear portion 17 is engaged with the guide groove 12 provided on the other circumferential side portion of each of the inner body 6 and the outer body 7 to be movable in the axial direction.

In order to prevent the inner pad 3 and the outer pad 4 from rattling during non-braking, the disc brake device 1 further includes a pad spring 20. The pad spring 20 is formed by a metal plate and includes a pair of rotation-in side pressing portions 21a, 21b on the one circumferential side portion and a pair of rotation-out side pressing portions 22a, 22b on the other circumferential side portion. Each of the pair of rotation-in side pressing portions 21a, 21b presses respective one circumferential side portion of an outer peripheral edge portion of the back plate 15 of each of the inner pad 3 and the outer pad 4 toward a radially inner side. Each of the pair of rotation-out side pressing portions 22a, 22b presses the other respective circumferential side portion of the outer peripheral edge portion of the back plate 15 of each of the inner pad 3 and the outer pad 4 toward the radially inner side.

The disc brake device 1 generates a moment on the inner pad 3 and the outer pad 4 in following directions during braking. This will be described below with reference to FIGS. 59A and 59B.

During forward braking, as illustrated in FIG. 59A, a brake tangential force F1 directed to the other circumferential side (left sides in FIGS. 59A and 59B, rotation-out side) acts on a friction surface center point A of the friction member 14 constituting the inner pad 3 (outer pad 4). Accordingly; the inner pad 3 (outer pad 4) slightly moves toward the other circumferential side. The insertion hole 16 provided on the radially inner side relative to an action line of the brake tangential force F1 engages with the pin 11 to bear the brake tangential force F1. For this reason, during forward braking, a moment M1 acts on the inner pad 3 (outer pad 4) to rotate the inner pad 3 (outer pad 4) counterclockwise.

During reverse braking, as illustrated in FIG. 59B, a brake tangential force F2 directed to the one circumferential side (right sides in FIGS. 59A and 59B, rotation-out side in reverse) acts on the friction surface center point A of the friction member 14. Accordingly, the inner pad 3 (outer pad 4) slightly moves toward the one circumferential side. Then, an abutting surface 19, which is provided on a radially outer side relative to an action line of the brake tangential force F2 on one circumferential side surface of the back plate 15, abuts against the abutted surface 18 to bear the brake tangential force F2. For this reason, during reverse braking, a moment M2 in the same direction as the moment M1 acts on the inner pad 3 (outer pad 4) to rotate the inner pad 3 (outer pad 4) counterclockwise.

As described above, in the disc brake device 1 described in JP-A-2015-90201, directions of the moments M1, M2 that act on the inner pad 3 and the outer pad 4 can be the same during forward braking and reverse braking. For this reason, even when the forward braking and the reverse braking are repeated, the inner pad 3 and the outer pad 4 can be maintained in a state of being rotated counterclockwise. Therefore, crunch sound can be prevented.

Further, each of the rotation-in side pressing portions 21a, 21b and the rotation-out side pressing portions 22a, 22b of the pad spring 20 presses a respective one of two circumferential side portions of each of the inner pad 3 and the outer pad 4 toward the radially inner side. Therefore, in a non-braking state, a radially outer side surface of an inner peripheral surface of the insertion hole 16 can be pressed against a radially outer side end portion of an outer peripheral surface of the pin 11, and a radially inner side surface of the ear portion 17 can be pressed against a radially inner side surface of the guide groove 12. Therefore, the inner pad 3 and the outer pad 4 can be stabilized even in the non-braking state, and rattling sound (abnormal sound) due to rattling of the pads can be prevented.

Patent Literature 1: JP-A-2015-90201

SUMMARY

A pad pin receiver according to a first aspect of the present disclosure includes a body plate configured to be attached to an inner side (inner peripheral edge portion) of a pin insertion portion provided in a back plate of a disc brake pad, the pin insertion portion being configured to engage with a pin inserted into the pin insertion portion during braking, the body plate being configured to cover a portion of an inner peripheral surface of the pin insertion portion.

In the pad pin receiver according to the first aspect of the present disclosure, a shape of the body plate may be, for example, a flat plate shape or a partial cylindrical shape to cope a shape of the inner peripheral surface of the pin insertion portion. Specifically; when the shape of the portion of the inner peripheral surface of the pin insertion portion to be covered by the body plate is a flat surface shape, the body plate may be formed in a flat plate shape, and the body plate may be formed in a partial cylindrical shape when the shape of the portion to be covered by the body plate is a concave curved surface shape.

The pad pin receiver may further may further include a bent plate that is bent at at least one end portion of the body plate in a length direction of the body plate. When the body plate is attached to the pin insertion portion, the body plate may be configured to extend in a thickness direction of the back plate, and the bent plate may be configured to overlap with the back plate in the thickness direction of the back plate. The bent plate may be bent at a substantially right angle relative to the body plate at the at least one end portion of the body plate in the length direction.

The body plate and the bent plate may be jointed to each other by a curved portion having an arc cross-sectional shape.

The bent plate may be provided on each of two end portions of the body plate in the length direction so that a pair of bent plates elastically hold the back plate therebetween.

At least one of the pair of bent plates may include a retaining portion configured to engage with the back plate.

The retaining portion may be provided only on one of the bent plates, and the one of the bent plates is disposed farer away from a rotor than the other of the bent plates.

Alternatively, the retaining portion may be provided on each of the pair of bent plates.

The retaining portion may be constituted by a tongue piece surrounded by a substantially U-shaped slit.

The tongue piece may extend in an extending direction of the bent plates, and one of end portions of the tongue piece at a side of the body plate may be a free end.

The bent plate may have a substantially V-shaped bent shape as a whole, and an intermediate portion of the bent plate in an extending direction of the bent plate may serve as a top portion. The retaining portion may be constituted by the bent portion.

The retaining portion may be constituted by an engagement hole formed in the bent plate.

The pad pin receiver according to the first aspect of the present disclosure further includes an auxiliary plate that is bent at at least one end portion of the body plate in a width direction of the body plate, the width direction being orthogonal to a length direction and a thickness direction of the body plate, and the auxiliary plate is configured to cover a portion of the inner peripheral surface of the pin insertion portion which is excluded from the portion covered by the body plate, when the body plate is attached to the pin insertion portion. The auxiliary plate may be bent at a substantially right angle (right angle or an angle defined by the auxiliary plate and the body plate being an acute angle) relative to the body plate at least one end portion of the body plate in the width direction.

In this case, the auxiliary plate may apply or not apply an elastic force to the pin inserted into the pin insertion portion.

The auxiliary plate may include a guide portion at one of end portions of the auxiliary plate in a length direction of the body plate, the one of the end portions of the auxiliary plate may be disposed at farer away from a rotor than the other of the end portions of the auxiliary plate, and the guide portion may be configured to protrude to an outer side relative to the pin insertion portion when the body plate is attached to the pin insertion portion.

At least a portion of a surface of the body plate which faces the inner peripheral surface of the pin insertion portion may be covered with an elastic member.

A disc brake pad according to a second aspect of the present disclosure includes: the pad pin receiver according to the first aspect: a back plate including a pin insertion portion constituted by an insertion hole or a notch that engages with a pin inserted into the pin insertion portion; and a friction member supported on a front surface of the back plate. The pad pin receiver is attached to an inner side of the pin insertion portion.

When the pin engages with the pin insertion portion during braking, a torque (moment) can be borne.

In the disc brake pad according to the second aspect of the present disclosure, the pin insertion portion may be an insertion hole that opens only on two sides of the back plate in an axial direction, and the insertion hole has a substantially rectangular shape Alternatively, in the disc brake pad according to the second aspect of the present disclosure, the pin insertion portion may be an insertion hole having a substantially triangular shape (including a fan shape), a substantially circular shape, or a substantially polygonal shape.

Further, in the disc brake pad according to the second aspect of the present disclosure, the pin insertion portion may be a notch that opens not only on two sides of the back plate in an axial direction but also opens at an outer peripheral edge portion of the back plate. In this case, the notch may have a substantially rectangular shape, a substantially triangular shape (including a fan shape), a substantially circular shape, or a substantially polygonal shape. An opening position of the notch at the outer peripheral edge portion of the back plate is not particularly limited.

The body plate may cover a radially outer side surface of the inner peripheral surface of the pin insertion portion which is located on an outer side in a radial direction of a rotor. Alternatively, the body plate may cover a circumferential side surface of the inner peripheral surface of the pin insertion portion which is located on a side opposite to the friction member in a circumferential direction of a rotor.

The pad pin receiver may be adhesively fixed to the back plate.

A disc brake pad according to a third aspect of the present disclosure includes: the pad pin receiver according to the first aspect: a back plate including a pin insertion portion constituted by an insertion hole or a notch that engages with a pin inserted into the pin insertion portion; and a friction member supported on a front surface of the back plate. The back plate includes an engagement concave portion formed in vicinity of the pin insertion portion. The pad pin receiver is attached to an inner side of the pin insertion portion. The tongue piece or the top portion serving as the retaining portion is engaged with the engagement concave portion.

According to the third aspect of the present disclosure, the engagement concave portion includes an inclined surface portion which is inclined to separate from the body plate in an extending direction of the bent plate as approaching a deep side of the engagement concave portion in a thickness direction of the back plate. The tongue piece or the top portion serving as the retaining portion is engaged with the inclined surface portion to press the body plate against the inner peripheral surface of the pin insertion portion.

A disc brake pad according to a fourth aspect of the present disclosure includes: the pad pin receiver according to the first aspect: a back plate including a pin insertion portion that is an insertion hole or a notch that engages with a pin inserted into the pin insertion portion; and a friction member supported on a front surface of the back plate. The back plate includes an engagement convex portion formed in vicinity of the pin insertion portion. The pad pin receiver is attached to an inner side of the pin insertion portion. The engagement convex portion is fitted to an inner side of the engagement hole serving as the retaining portion.

According to the fourth aspect of the present disclosure, a top end portion of the engagement convex portion may be crimped (plastically deformed) to the engagement hole.

A disc brake device according to a fifth aspect of the present disclosure includes: a pair of disc brake pads disposed with a rotor sandwiched therebetween; and a pad support member including at least one pair (for example, two or four) of pins arranged in parallel to a central axis of the rotor, and configured to support the pair of disc brake pads to be movable in an axial direction of the rotor. At least one of the pair of disc brake pads is the disc brake pad according to any one of the second to the fourth aspects.

BRIEF DESCRIPTION OF DRAWINGS

FIGS. 20A to 20D illustrate the pin receiver according to the first embodiment, in which FIG. 20A is a front view, FIG. 20B is a plan view, FIG. 20C is a bottom view, and FIG. 20D is a side view.

FIGS. 21A and 21B are perspective views illustrating the pin receiver according to the first embodiment, in which FIG. 21A is a perspective view when viewed from a top end side of a bent plate, and FIG. 21B is a perspective view when viewed from a base end side of the bent plate.

FIGS. 33A and 33B are perspective views illustrating a pin receiver according to the eighth embodiment, in which FIG. 33A is a perspective view when viewed from one side of a main plate in a width direction, and FIG. 33B is a perspective view when viewed from the other side of the main plate in the width direction.

FIGS. 52A and 52B illustrate a pin receiver according to the fifteenth embodiment, in which FIG. 52A is a front view and FIG. 52B is a side view.

FIG. 57 is a plan view illustrating a disc brake device having a related-art structure.

FIG. 58 is a cross-sectional view taken along a line B-B of FIG. 57.

FIGS. 59A and 59B are front views when a pad is taken out, in which FIG. 59A illustrates a state during forward braking, and FIG. 59B illustrates a state during reverse braking.

DETAILED DESCRIPTION OF EXEMPLIFIED EMBODIMENT

Figure 1:
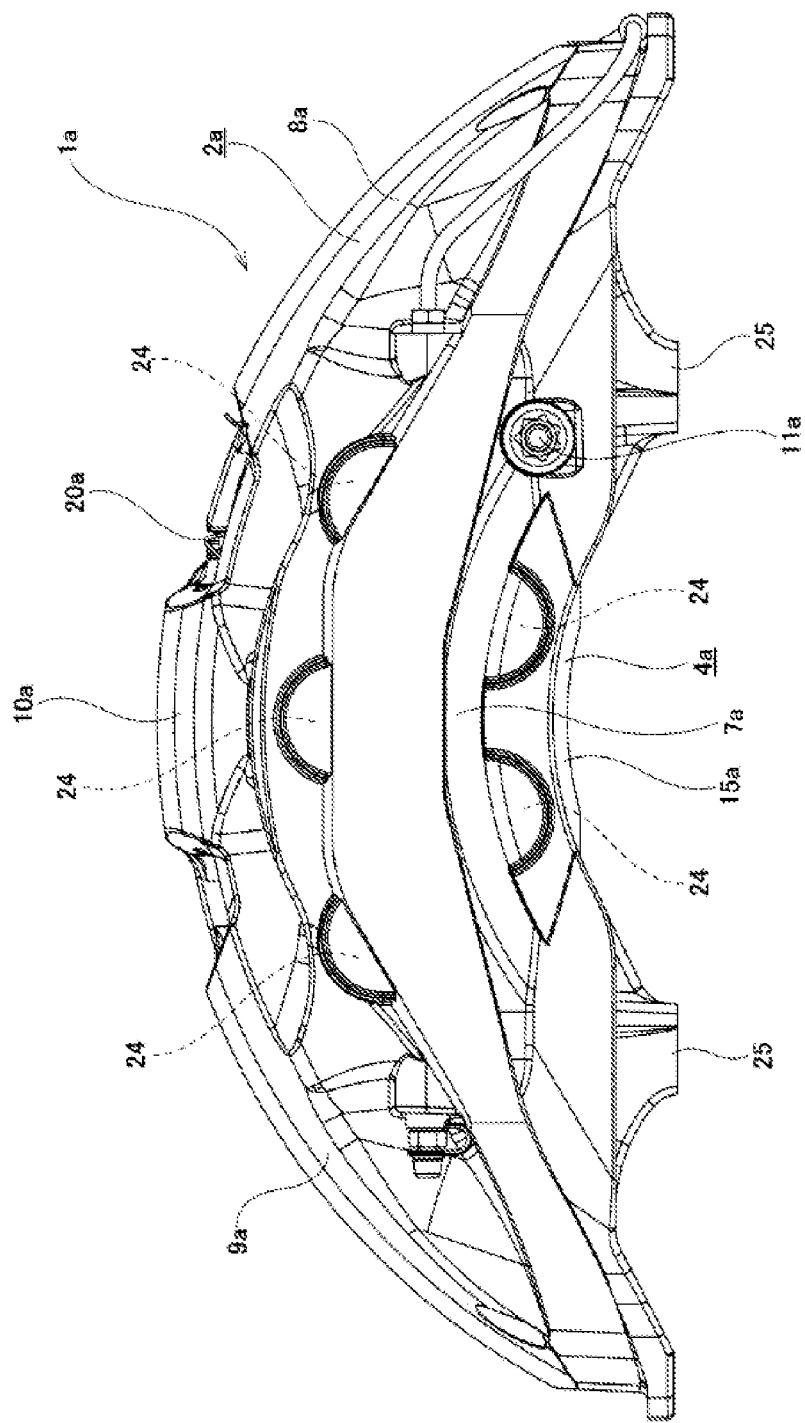
FIG. 1 is a front view illustrating a disc brake device according to a first embodiment.
Figure 2:
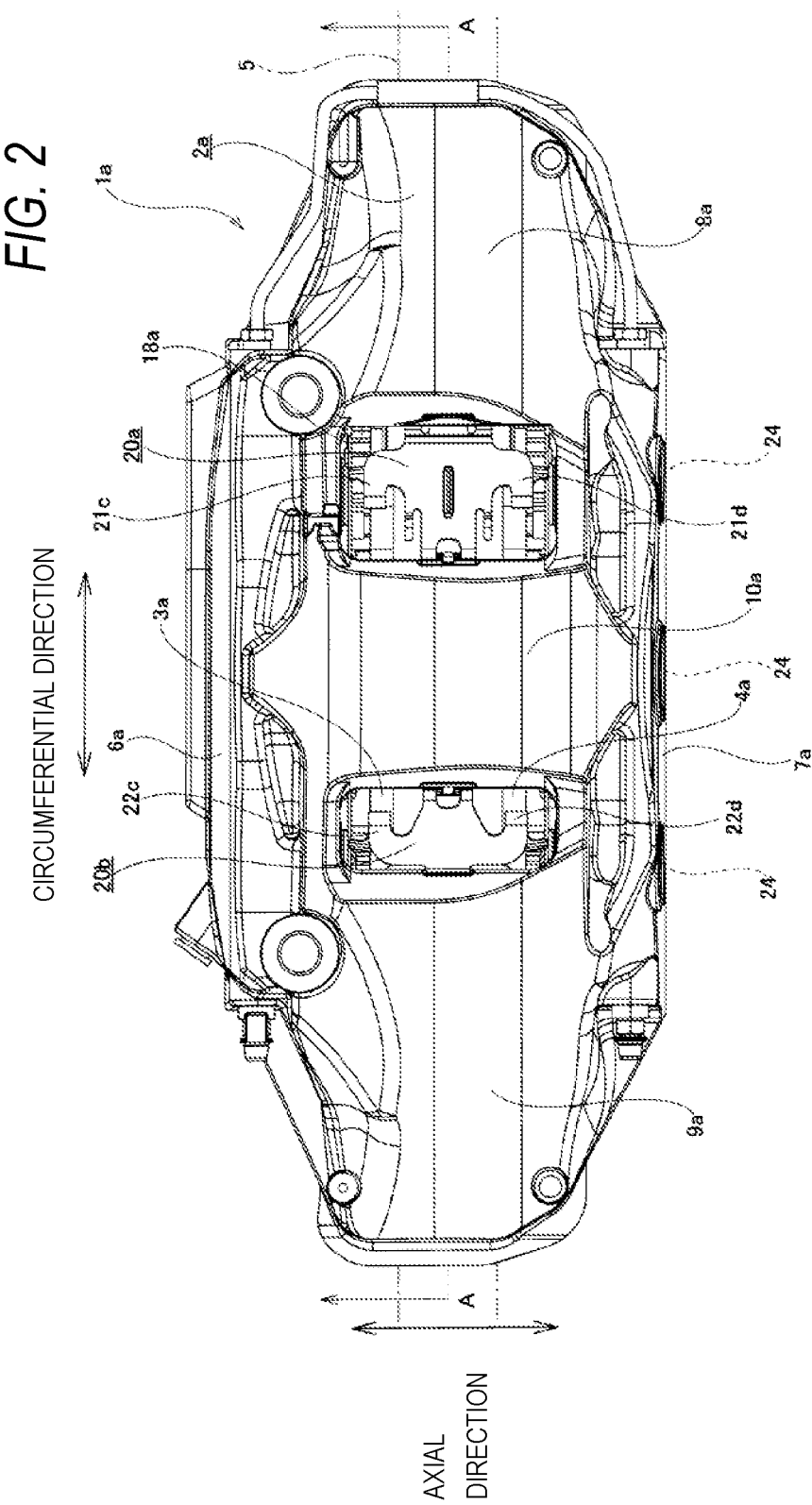
FIG. 2 is a plan view illustrating the disc brake device according to the first embodiment.
Figure 3:
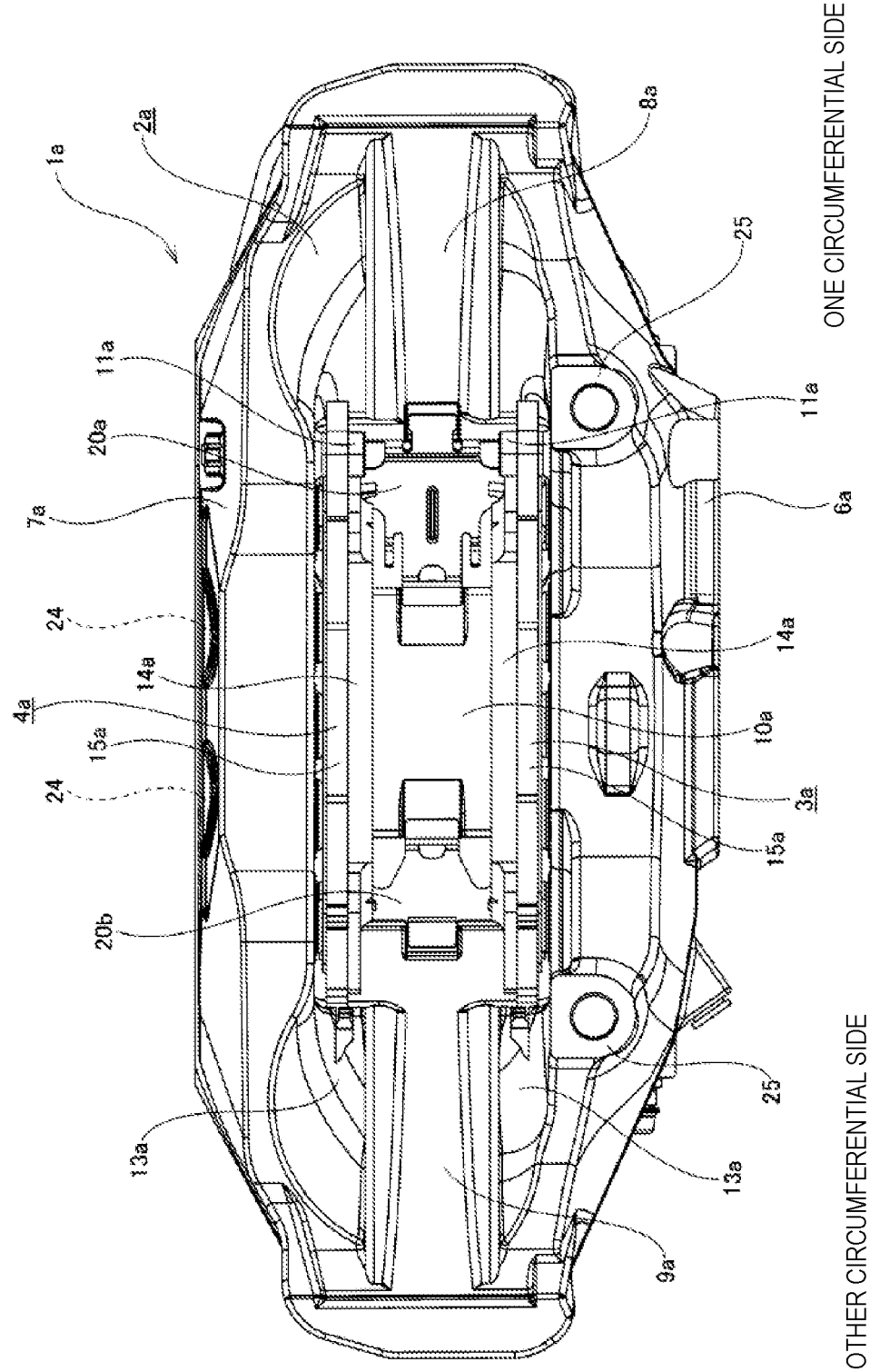
FIG. 3 is a bottom view illustrating the disc brake device according to the first embodiment.
Figure 4:
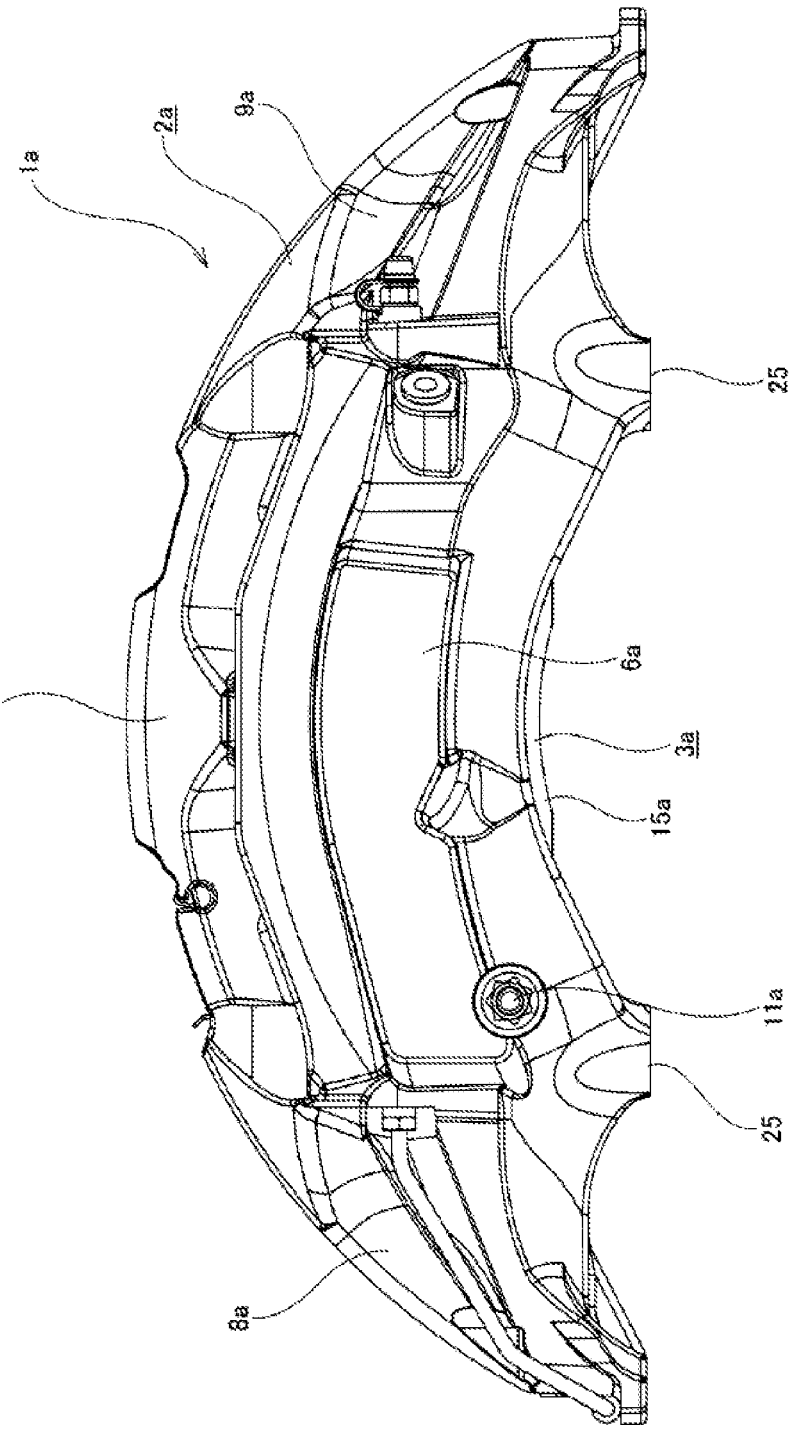
FIG. 4 is a rear view illustrating the disc brake device according to the first embodiment.
Figure 5:
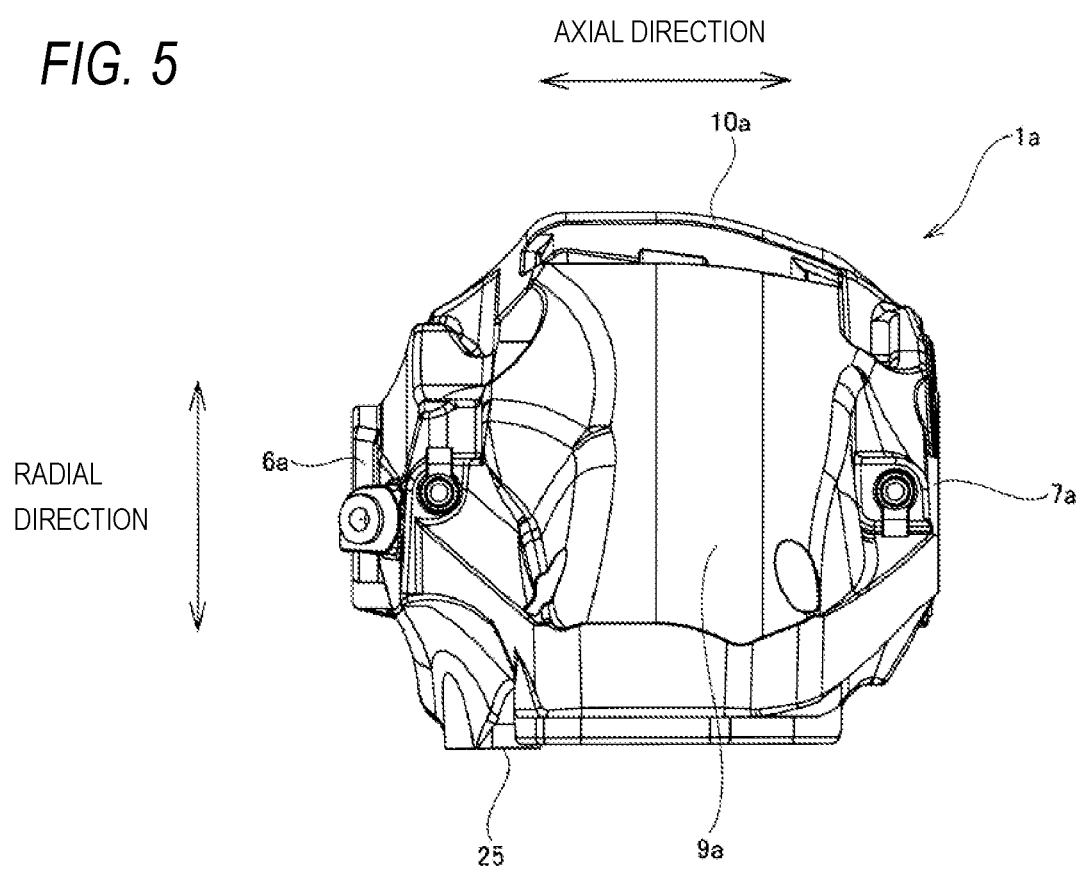
FIG. 5 is a side view illustrating the disc brake device according to the first embodiment.
Figure 6:
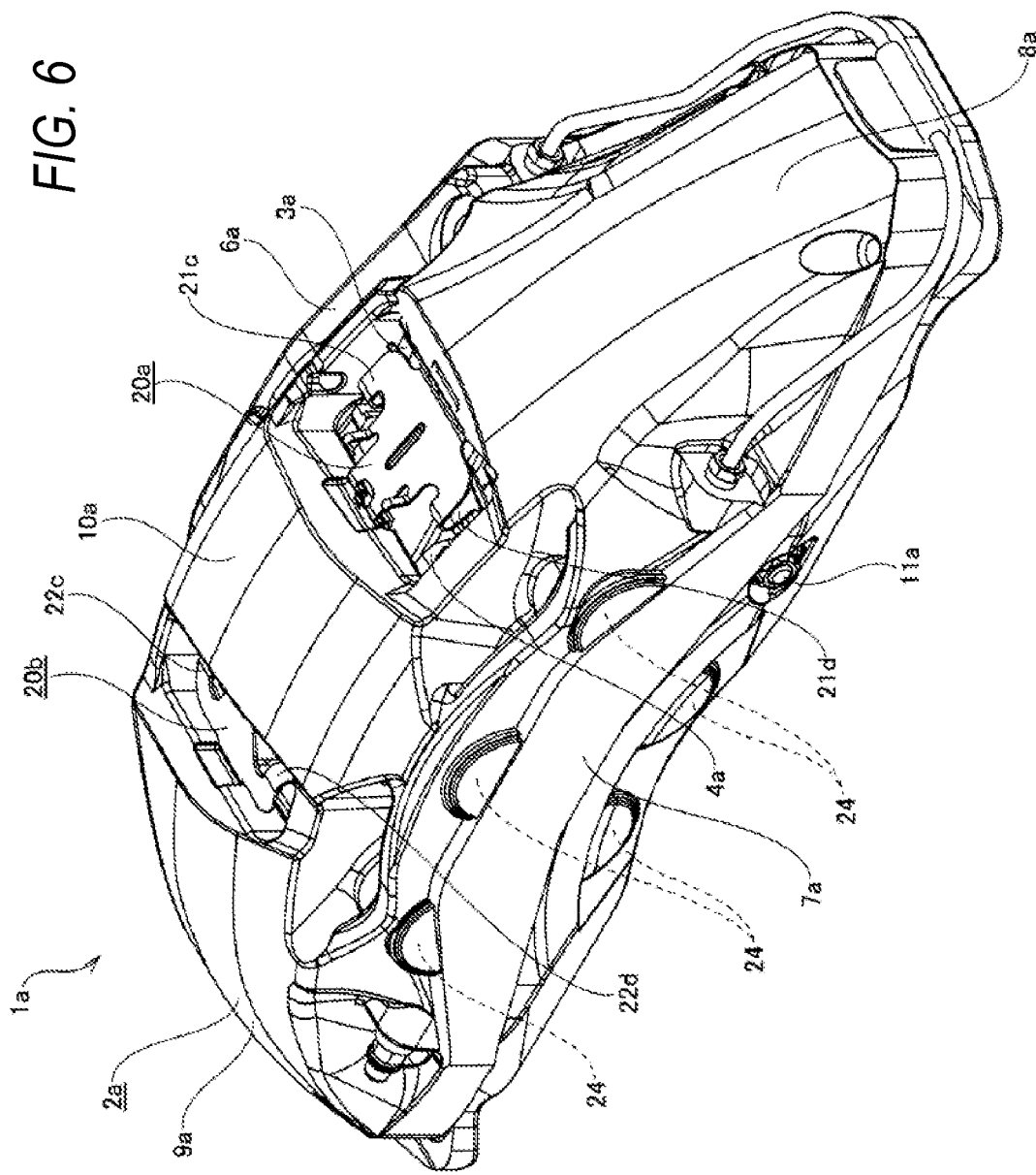
FIG. 6 is a perspective view of the disc brake device according to the first embodiment when viewed from a radially outer side and one circumferential side.

In the disc brake device 1 described in JP-A-2015-90201, the outer peripheral surface of the pin 11 and the inner peripheral surface of the insertion hole 16 are in direct contact with each other. For this reason, during braking or braking release, abnormal sound (striking sound) may be generated due to a collision between the outer peripheral surface of the pin 11 and the inner peripheral surface of the insertion hole 16.

The present disclosure has been made to solve the above problem and an object thereof is to provide a disc brake device capable of reducing abnormal sound due to a collision between an inner peripheral surface of a pin insertion portion provided on a back plate and an outer peripheral surface of a pin inserted into the pin insertion portion.

FIRST EMBODIMENT

The first embodiment will be described with reference to FIGS. 1 to 22.

[Overall Configuration of Disc Brake Device]

A disc brake device 1a according to the present embodiment is an opposed-piston type disc brake device used for braking an automobile. The disc brake device 1a includes a caliper 2a corresponding to a pad support member, a pair of inner pad 3a and outer pad 4a, a pair of pad springs 20a, 20b, and a pair of pad pin receivers 23 attached to each of the inner pad 3a and the outer pad 4a.

Figure 16:
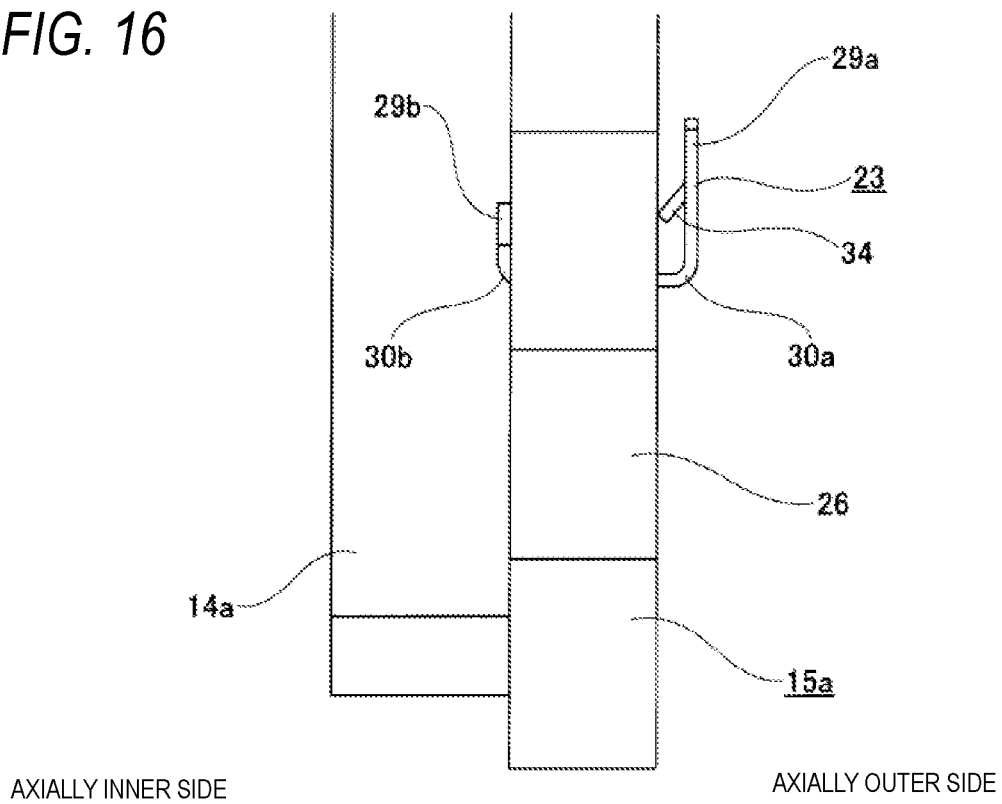
FIG. 16 is a side view of FIG. 15A when viewed from a right side.
Figure 17:
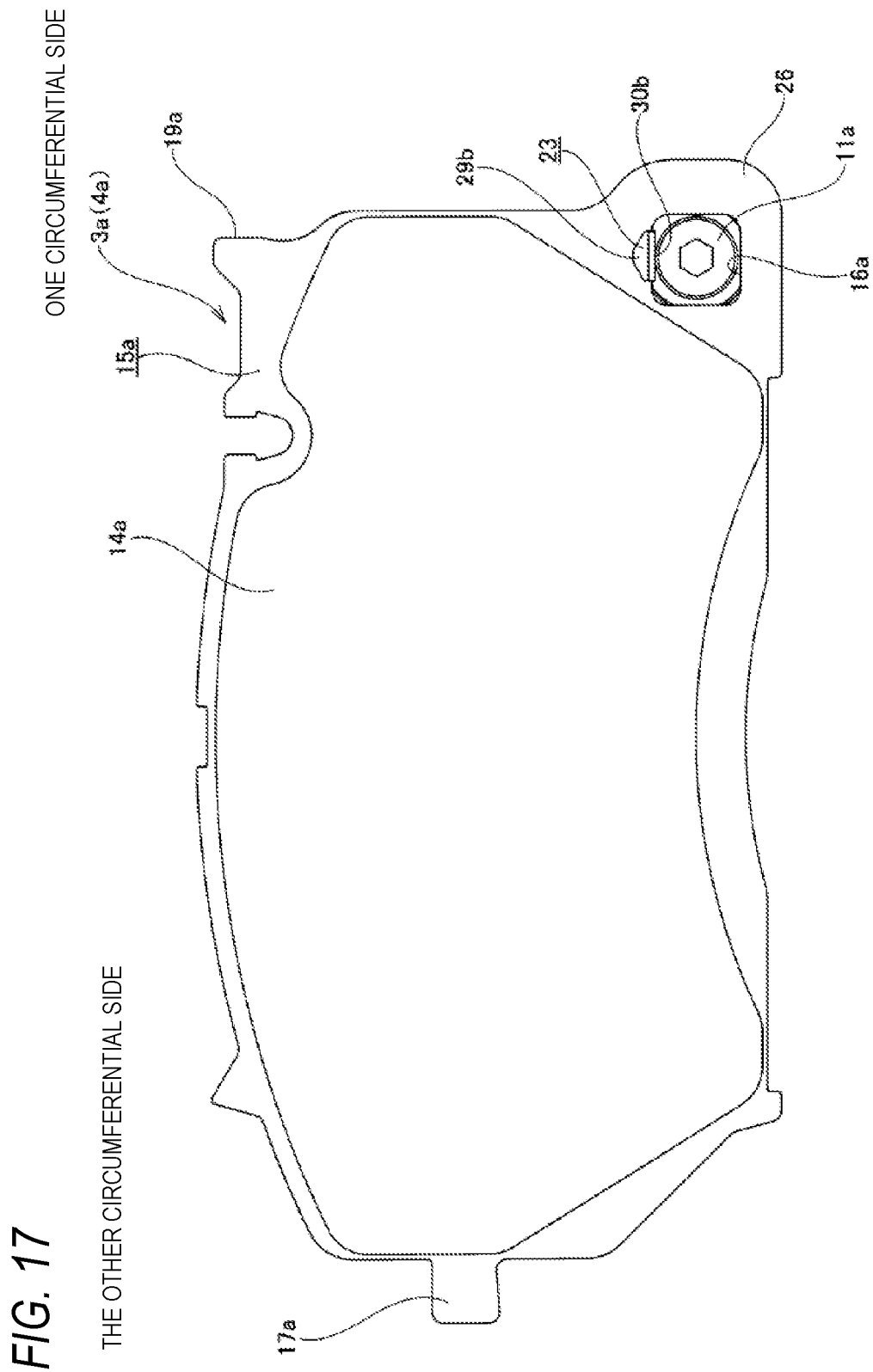
FIG. 17 illustrates a state in which a pin is inserted into an insertion hole of the inner pad according to the first embodiment to which the pin receiver is attached and corresponds to FIG. 11.
Figure 18:
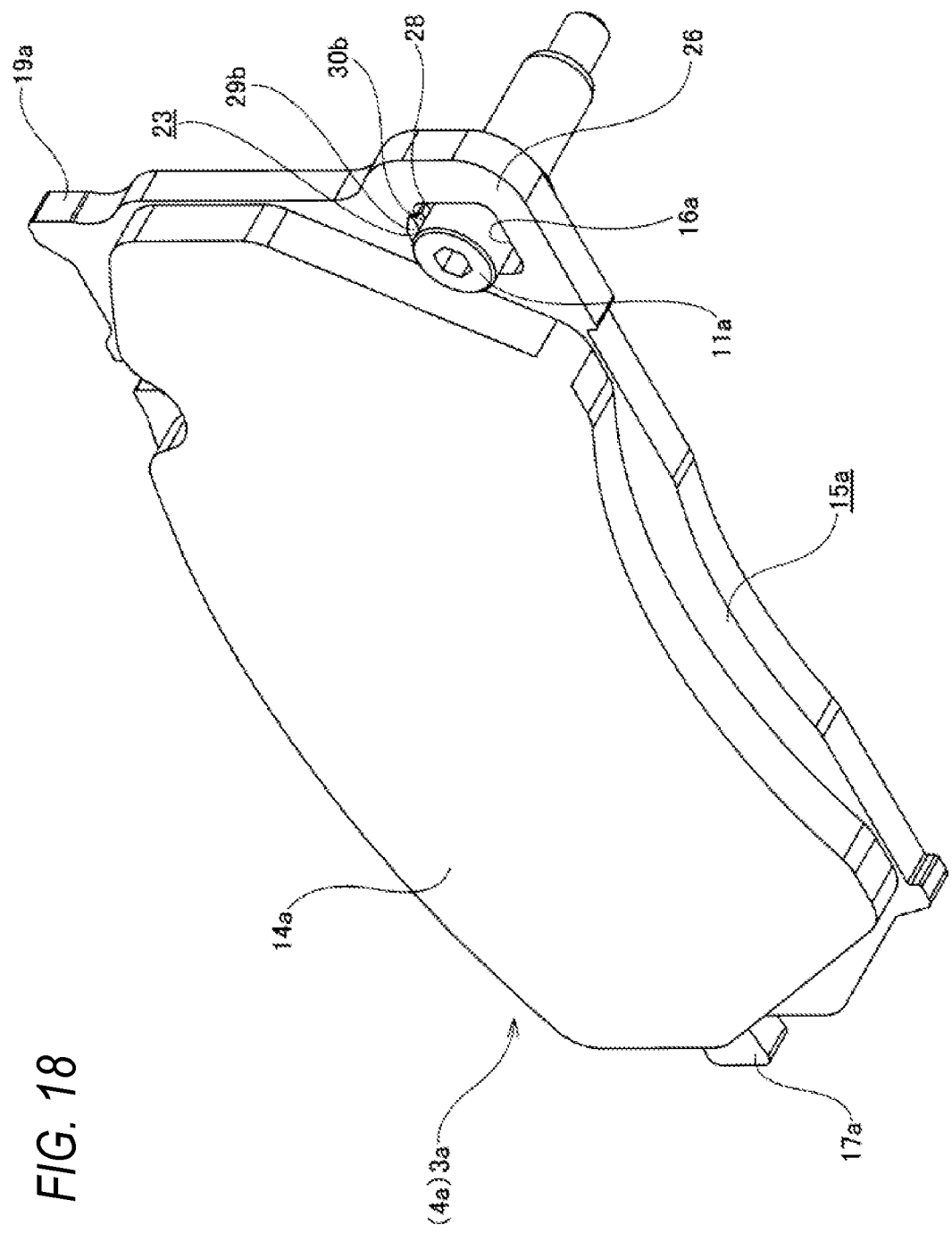
FIG. 18 illustrates the state in which the pin is inserted into the insertion hole of the inner pad according to the first embodiment to which the pin receiver is attached and corresponds to FIG. 13.
Figure 19:
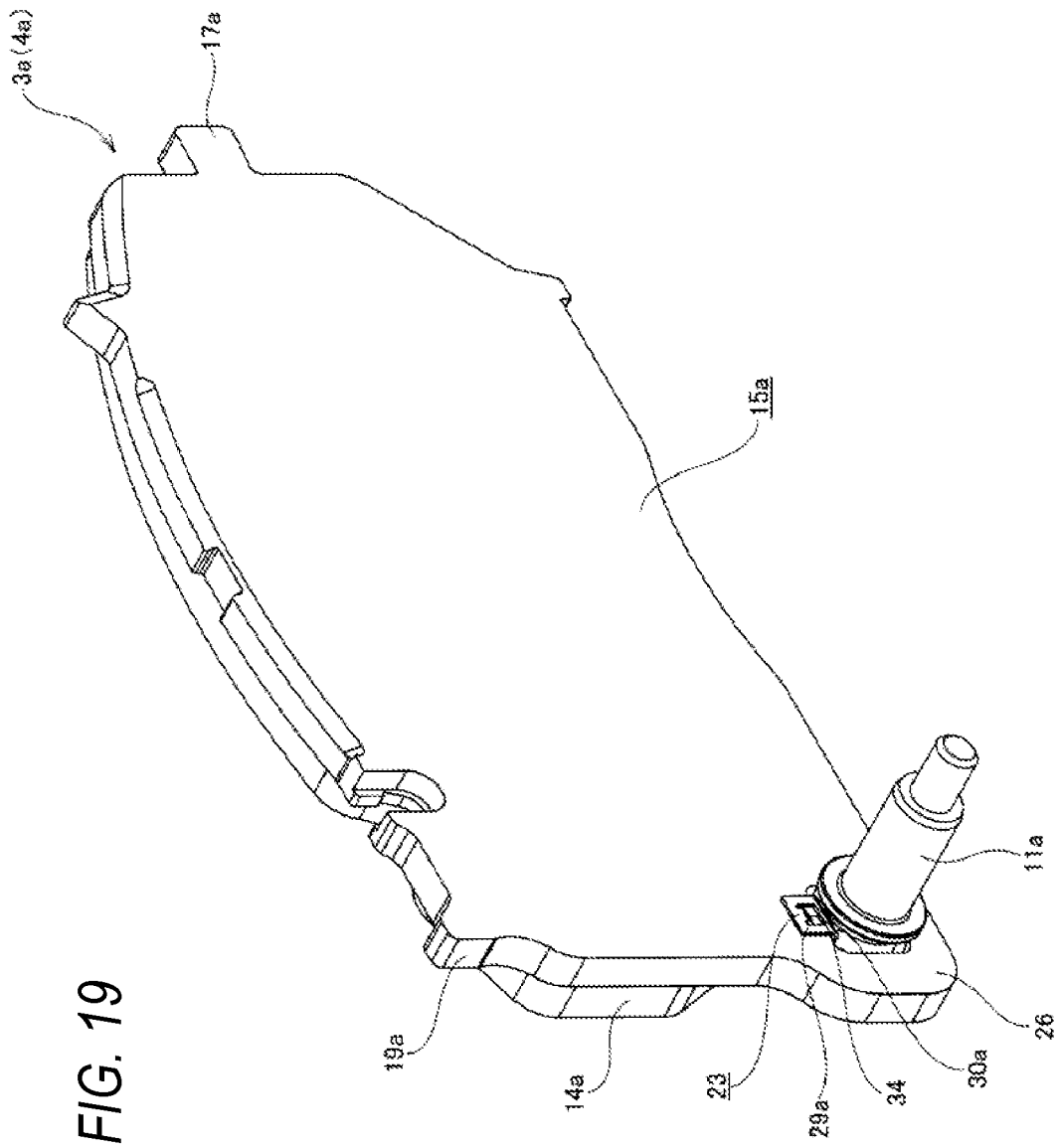
FIG. 19 illustrates the state in which the pin is inserted into the insertion hole of the inner pad according to the first embodiment to which the pin receiver is attached and corresponds to FIG. 14.

In the present embodiment, an axial direction, a circumferential direction, and a radial direction refer to an axial direction, a circumferential direction, and a radial direction of a disc-shaped rotor 5 (see FIG. 2) that rotates together with a wheel unless otherwise specified. Each of front-back directions of FIGS. 1, 4, 9 to 12, and 17, upper-lower directions of FIGS. 2 and 3, and left-right directions of FIGS. 5 and 16 corresponds to the axial direction, a side close to the rotor 5 in the axial direction is referred to as an axially inner side, and a side far from the rotor 5 in the axial direction is referred to as an axially outer side. Each of left-right directions of FIGS. 1 to 4, 9 to 12, and 17 and front-back directions of FIGS. 5 and 16 corresponds to the circumferential direction, each of right sides of FIGS. 1 to 3, 9 to 11, and 17, left sides of FIGS. 4 and 12, a back side of FIG. 5, and a front side of FIG. 16 is referred to as one circumferential side, and each of left sides of FIGS. 1 to 3, 9 to 11, and 17, right sides of FIGS. 4 and 12, a front side of FIG. 5, and a back side of FIG. 16 is referred to as the other circumferential side. In the present embodiment, the one circumferential side is a rotation-in side when a vehicle is traveling forward and a rotation-out side when the vehicle is traveling reversely, and the other circumferential side is the rotation-out side when the vehicle is traveling forward and the rotation-in side when the vehicle is traveling reversely. Each of upper-lower directions of FIGS. 1, 4, 5, 9 to 12, and 17 and front-back directions of FIGS. 2 and 3 corresponds to the radial direction, each of upper sides of FIGS. 1, 4, 5, 9 to 12, and 17, a front side of FIG. 2, and a back side of FIG. 3 corresponds to a radially outer side, and each of lower sides of FIGS. 1, 4, 5, 9 to 12, and 17, a back side of FIG. 2, and a front side of FIG. 3 corresponds to a radially inner side. The rotation-in side refers to a side from which the rotor 5 enters the caliper 2a, and the rotation-out side refers to a side from which the rotor 5 comes out of the caliper 2a.

[Caliper]

The caliper 2a supports the inner pad 3a and the outer pad 4a to be movable in the axial direction. The caliper 2a covers a part of the rotor 5 in the circumferential direction from the radially outer side and is supported and fixed by a knuckle constituting a suspension device. The caliper 2a is integrally formed by performing a casting processing or the like on a light alloy such as an aluminum alloy or a material made of an iron-based alloy. The caliper 2a includes an inner body 6a, an outer body 7a, a rotation-in side coupling portion 8a, a rotation-out side coupling portion 9a, and a center bridge 10a.

The inner body 6a and the outer body 7a sandwich the rotor 5 on two sides of the rotor 5 in the axial direction. The inner body 6a is disposed on an inner side (central side) in a width direction of the vehicle relative to the rotor 5, and the outer body 7a is disposed on an outer side in the width direction of the vehicle relative to the rotor 5. Each of the rotation-in side coupling portion 8a and the rotation-out side coupling portion 9a joints one of two circumferential side end portions of the inner body 6a with a corresponding one of two circumferential side end portions of the outer body 7a in the axial direction. The rotation-in side coupling portion 8a joints one circumferential side end portion of the inner body 6a with one circumferential side end portion of the outer body 7a in the axial direction, and the rotation-out side coupling portion 9a joints the other circumferential side end portion of the inner body 6a with the other circumferential side end portion of the outer body 7a in the axial direction. The center bridge 10a joints a circumferential intermediate portion of the inner body 6a with a circumferential intermediate portion of the outer body 7a in the axial direction.

The inner body 6a includes a plurality of (five in the illustrated example) inner cylinders (not illustrated), and the outer body 7a includes a plurality of (five in the illustrated example) outer cylinders 24. Each of the inner cylinders faces a corresponding one of the outer cylinders 24 in the axial direction. An inner piston and an outer piston are fitted respectively on inner sides of the inner cylinders and inner sides of the outer cylinders 24 to be displaceable in the axial direction. The inner body 6 includes a pair of attachment supports 25 to support and fix the caliper 2a to the knuckle.

Each of the inner body 6a and the outer body 7a includes a pin 11a disposed at a radially inner side portion of one circumferential side portion thereof. The pin 11a is in parallel to a central axis of the rotor 5. The pin 11a is supported and fixed to each of the inner body 6a and the outer body 7a. A pair of pins 11a supported and fixed to the inner body 6a and the outer body 7a are coaxial with each other. A top end portion of each of the pair of pins 11a axially protrudes from an axially inner surface of each of the inner body 6a and the outer body 7a, and faces a side surface of the rotor 5 in the axial direction with a gap therebetween. The top end portion of each of the pair of pins 11a is formed in a substantially columnar shape, and has a cylindrical-shaped outer peripheral surface. In the present embodiment, the pin 11a is formed by inserting a bolt having a columnar head from the axially inner side into a through hole passing in the axial direction through the radially inner side portion of the one circumferential side portion of each of the inner body 6a and the outer body 7a and screwing a nut to a top end portion of the bolt. However, when the present disclosure is carried out, the pin can be integrally provided to the inner body and the outer body.

Figure 7:
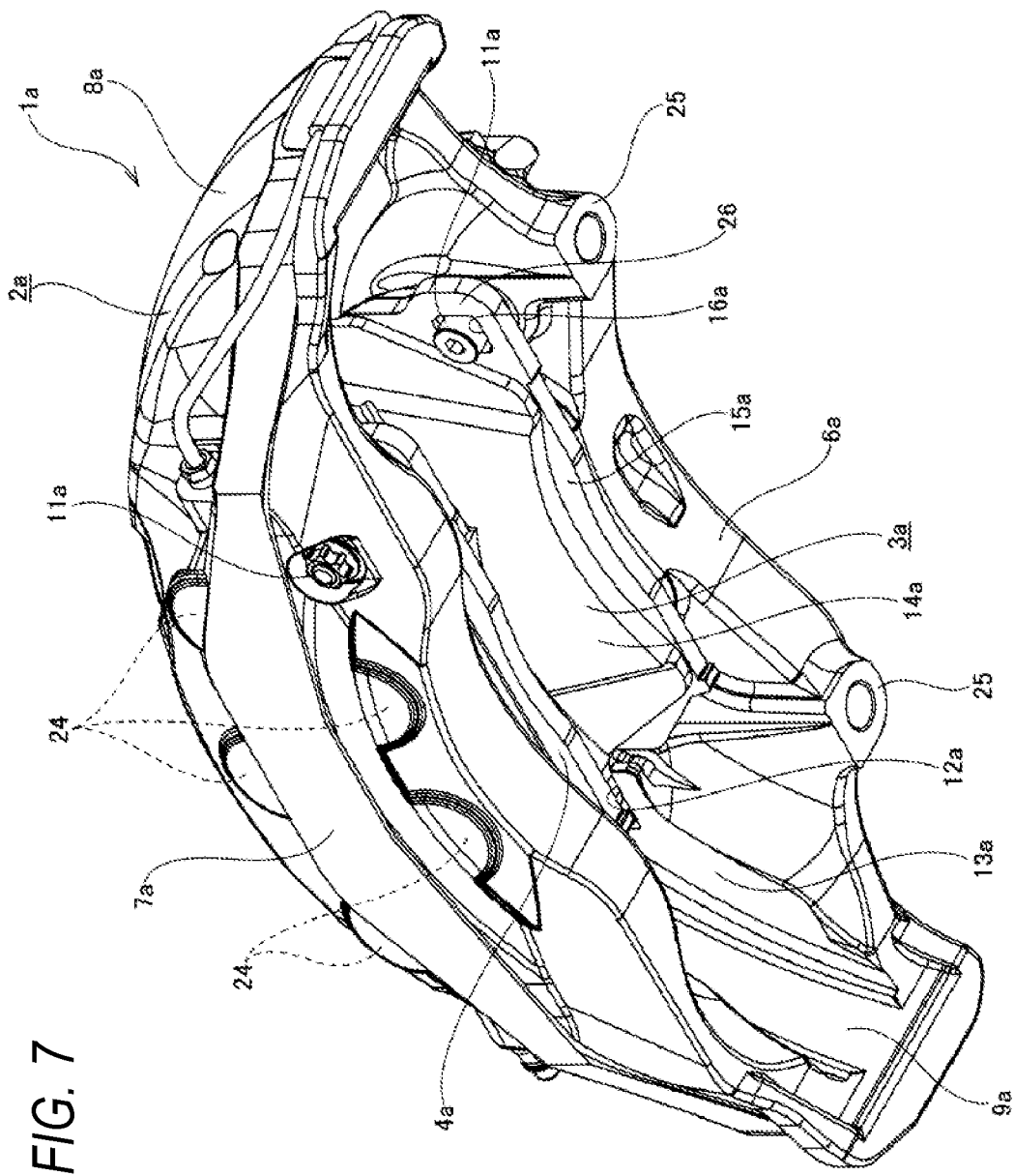
FIG. 7 is a perspective view of the disc brake device according to the first embodiment when viewed from a radially inner side and the one circumferential side.
Figure 8:
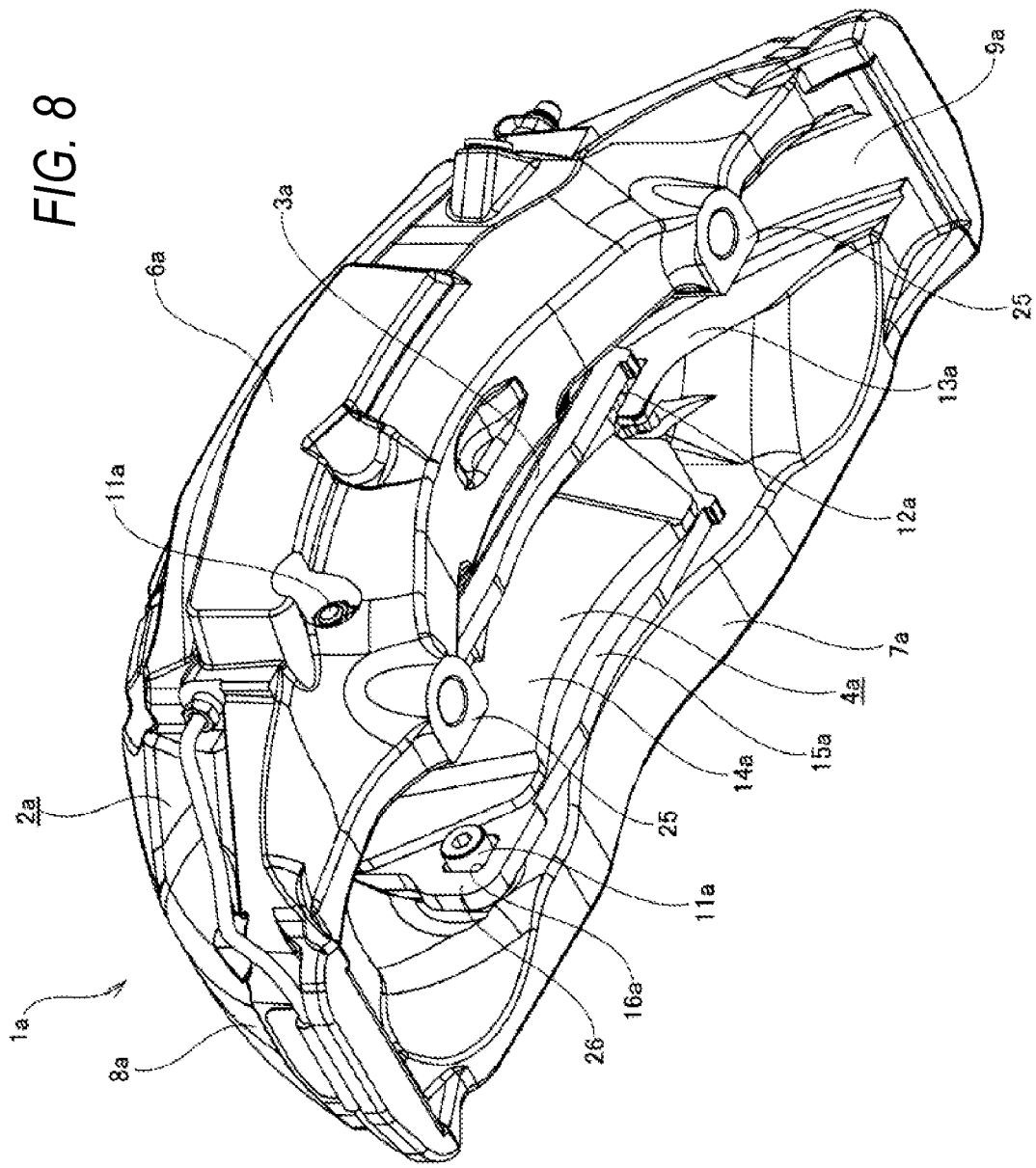
FIG. 8 is a perspective view of the disc brake device according to the first embodiment when viewed from the radially inner side and the other circumferential side.
Figure 9:
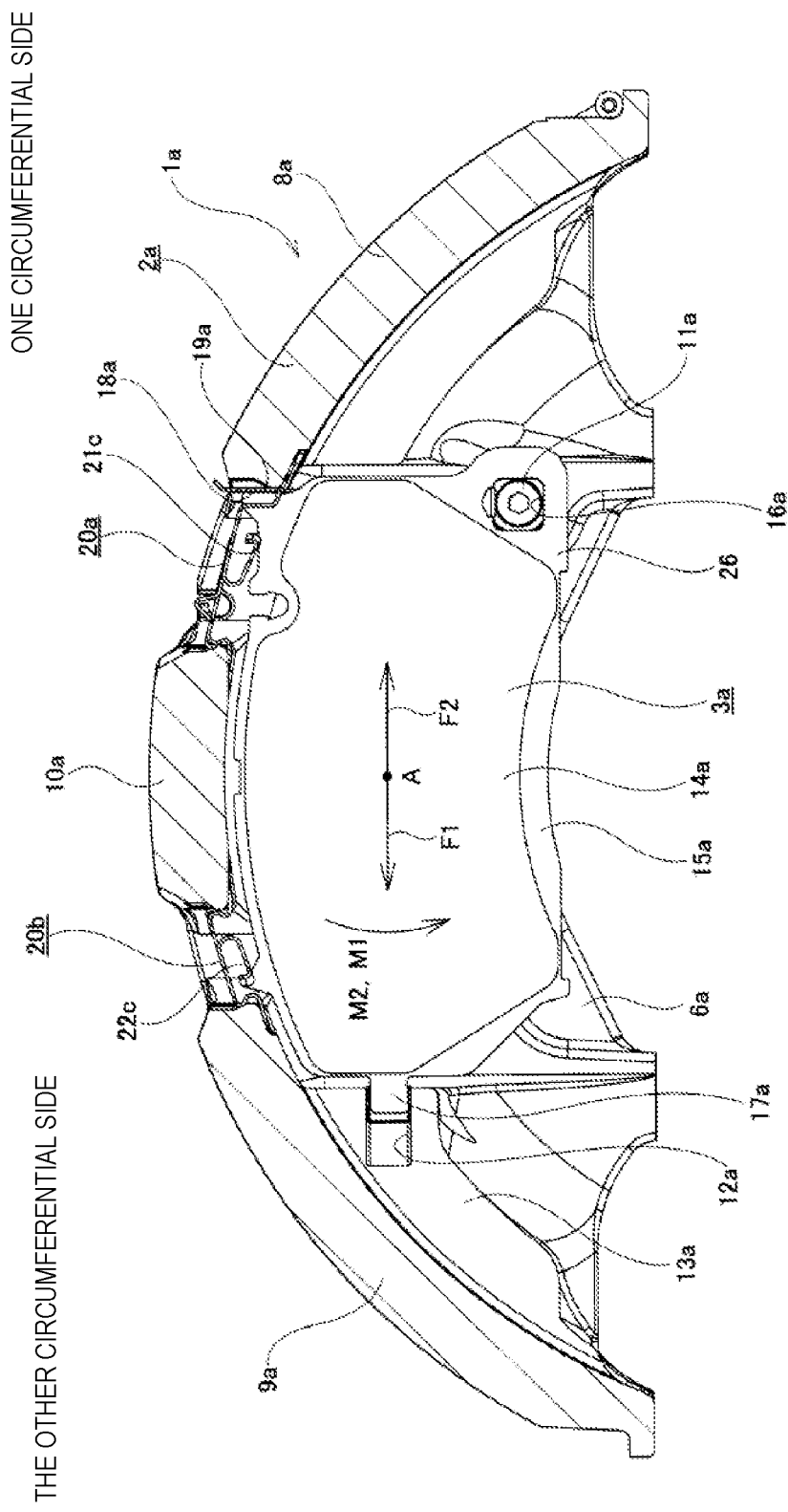
FIG. 9 is a cross-sectional view taken along a line A-A in FIG. 2.

As illustrated in FIGS. 7 to 9, each of the inner body 6a and the outer body 7a includes a guide wall portion 13a axially protruding on an axially inner side surface of the other circumferential side portion thereof. The guide wall portion 13a has, at its radially intermediate portion, a guide groove 12a opening toward the axially inner side surface and one circumferential side surface.

The rotation-in side coupling portion 8a has a flat abutted surface 18a at a part where the rotation-in coupling portion 8 faces the center bridge 10a in the circumferential direction. The abutted surface 18a is on a virtual plane orthogonal to a brake tangential force.

[Inner Pad and Outer Pad]

Each of the inner pad 3a and the outer pad 4a includes a friction member (lining) 14a and a metal back plate (pressure plate) 15a. The friction member 14a is supported on a front surface of two side surfaces of the back plate 15a in the axial direction which faces the rotor 5. Of the two side surfaces of the back plate 15a in the axial direction, a surface (axially outer side surface) which faces a side opposite to the rotor 5 is referred to as a back surface of the back plate 15a. The inner pad 3a and the outer pad 4a have symmetrical shapes in the axial direction.

The back plate 15a of each of the inner pad 3a and the outer pad 4a includes a substantially triangular plate-shaped protruding portion 26 on a radially inner side portion of one circumferential side end portion (rotation-in side end portion). The protruding portion 26 circumferentially protrudes from the friction member 14a. The protruding portion 26 is located on a radially inner side relative to an action line (frictional surface center point A) of a brake tangential force that acts during braking. The protruding portion 26 has an insertion hole 16a that axially passes through the protruding portion 26 at a substantially central portion. The insertion hole 16a serves as a pin insertion portion.

Figure 10:
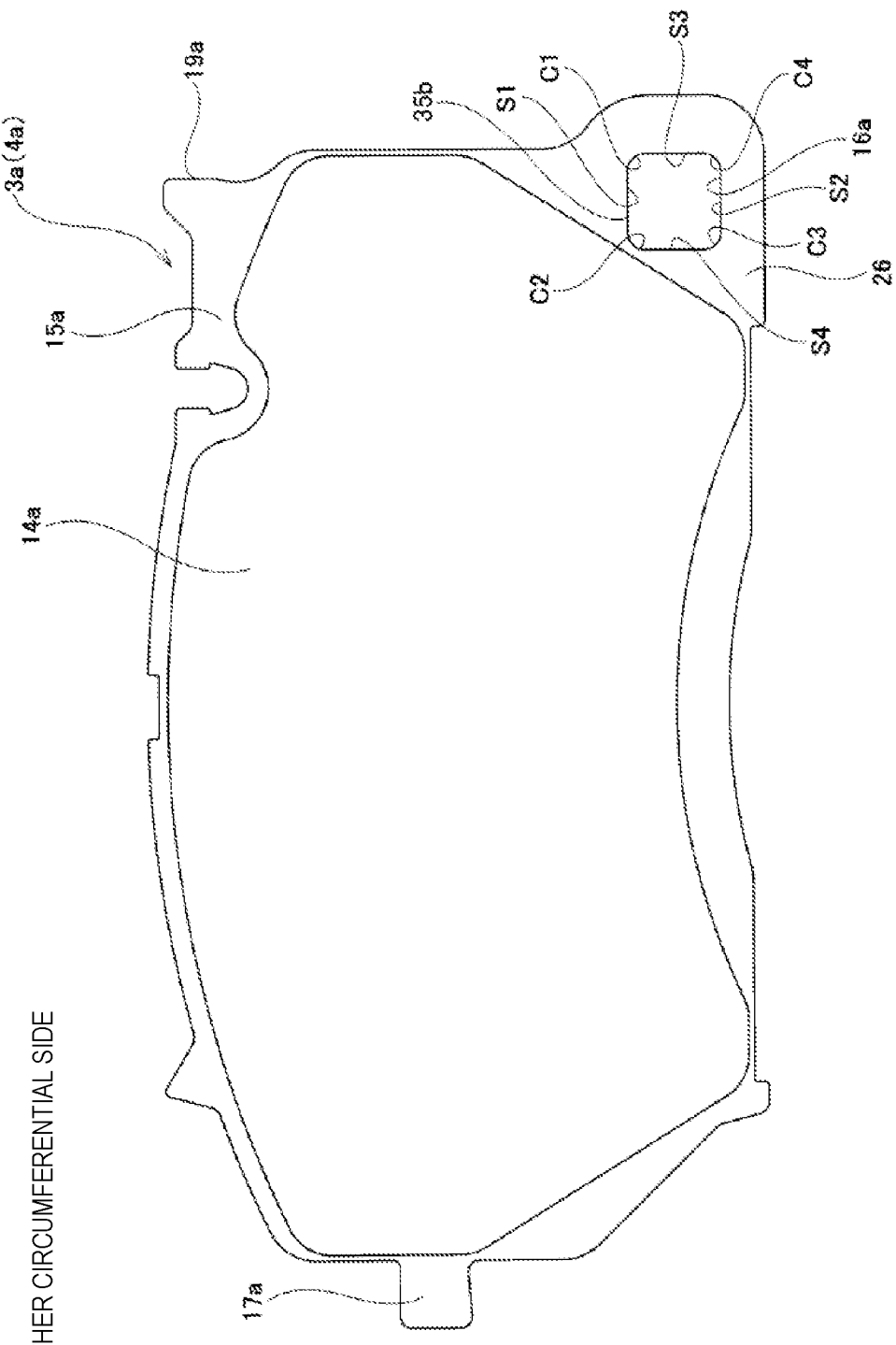
FIG. 10 is a front view illustrating an inner pad according to the first embodiment.
Figure 11:
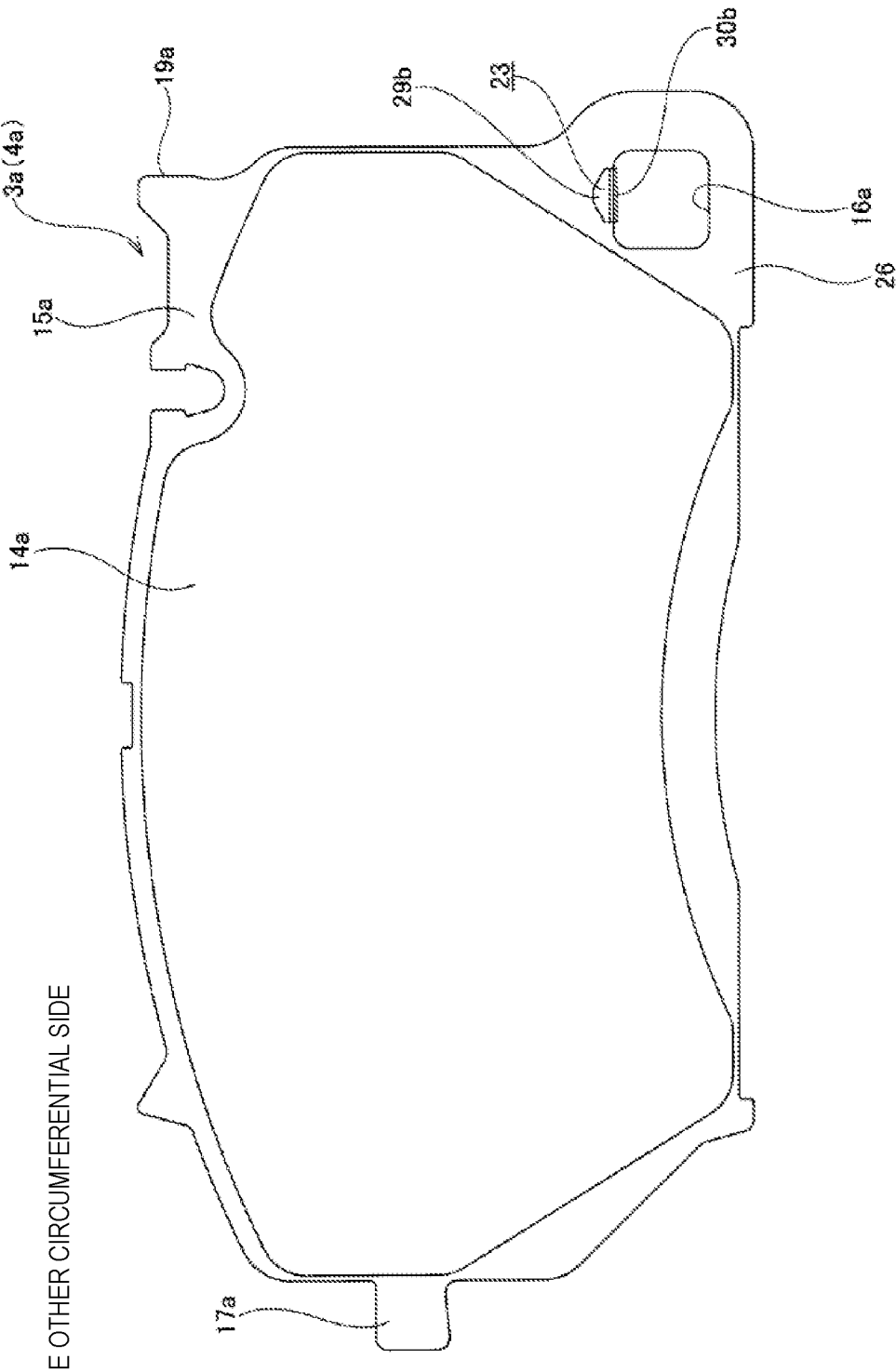
FIG. 11 is a front view illustrating the inner pad according to the first embodiment to which a pin receiver is attached.
Figure 12:
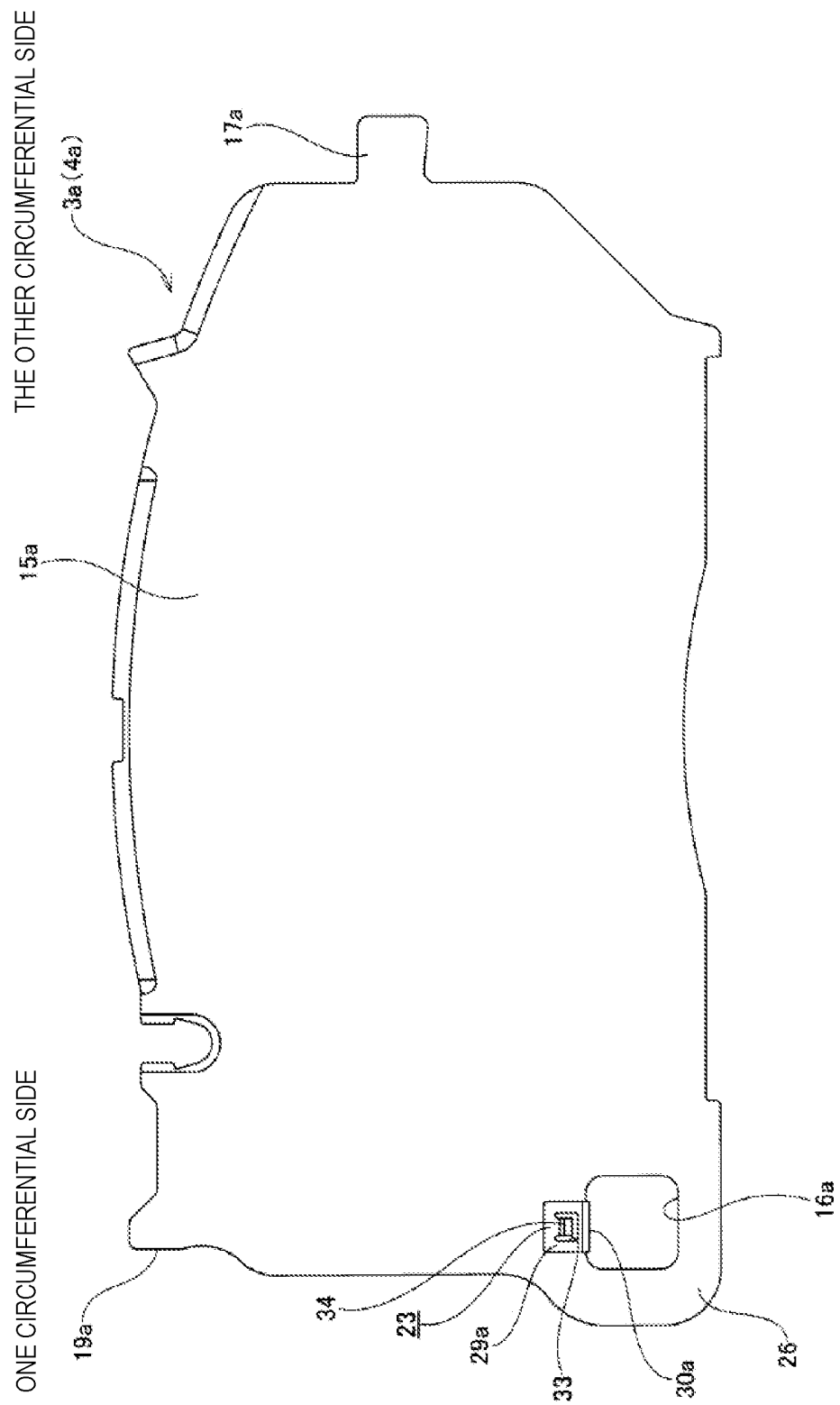
FIG. 12 is a back view illustrating the inner pad according to the first embodiment to which the pin receiver is attached.
Figure 13:
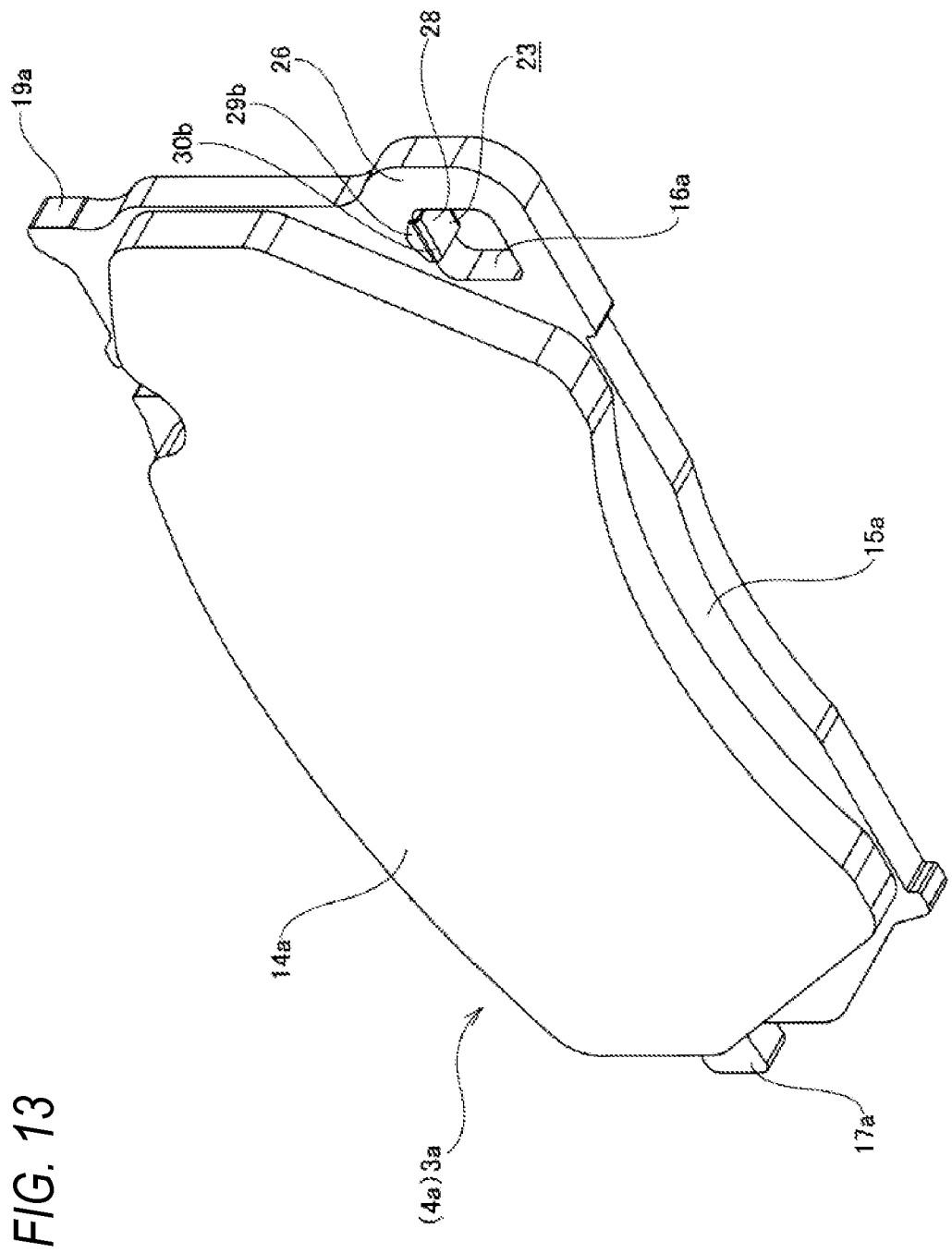
FIG. 13 is a perspective view of the inner pad according to the first embodiment to which the pin receiver is attached when viewed from an axially inner side (front side) and the radially inner side.
Figure 14:
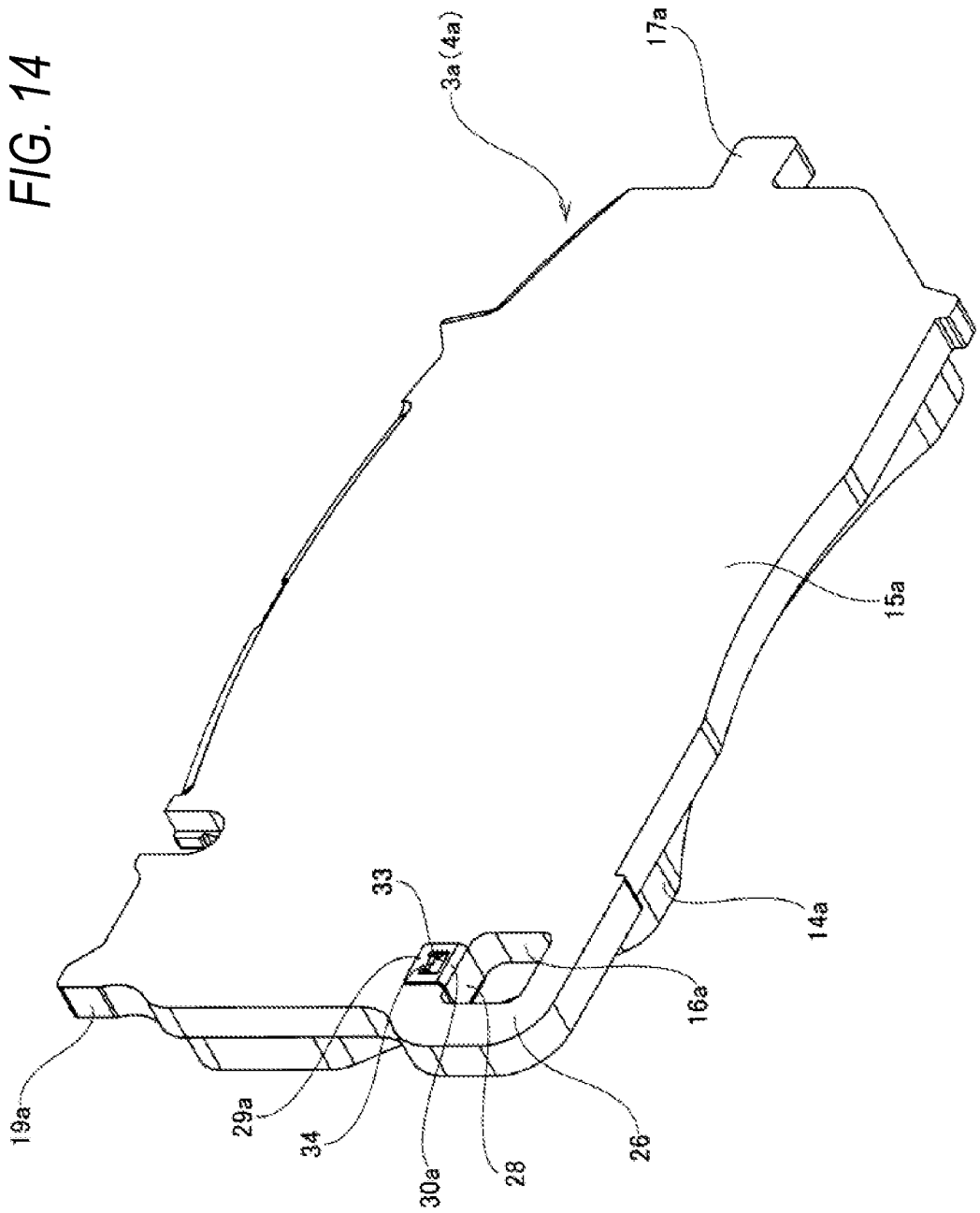
FIG. 14 is a perspective view of the inner pad according to the first embodiment to which the pin receiver is attached when viewed from an axially outer side (back side) and the radially inner side.
Figure 15A:
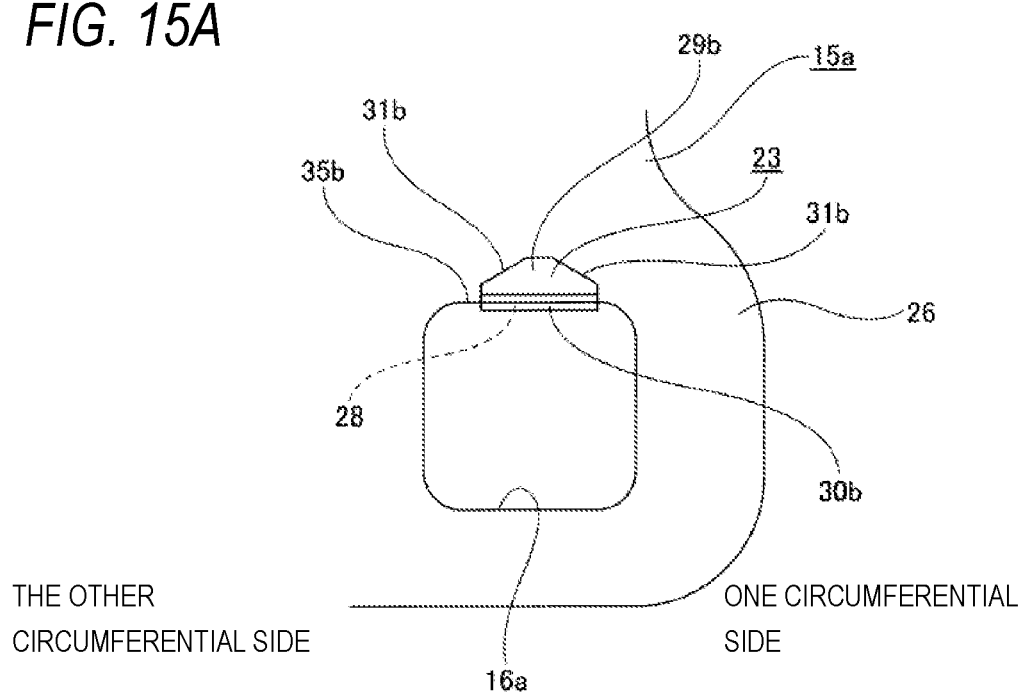
FIG. 15A is an enlarged view of a part of FIG. 11.
Figure 15B:
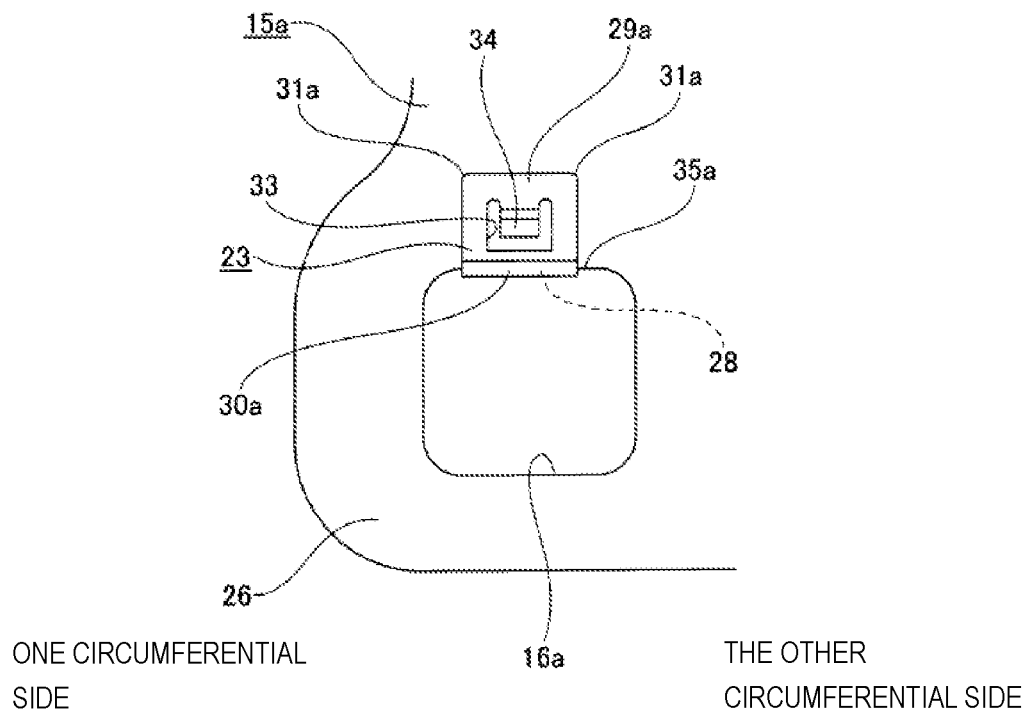
FIG. 15B is an enlarged view of a part of FIG. 12.

The insertion hole 16a has a substantially rectangular shape when viewed in the axial direction, and opens only on two sides of the back plate 15a (protruding portion 26) in the axial direction. In the present embodiment, as illustrated in FIG. 10, an inner peripheral surface of the insertion hole 16a is constituted by four flat side surfaces S1 to S4 (radially outer side surface S1, radially inner side surface S2, one circumferential side surface S3, the other circumferential side surface S4) and four corner portions C1 to C4 that are concave curved surfaces. Of the four side surfaces constituting the inner peripheral surface of the insertion hole 16a, the side surface (surface facing the radially inner side) located on an outer side in the radial direction of the rotor 5 is referred to as the radially outer side surface, and the side surface (surface facing the radially outer side) located on an inner side in the radial direction of the rotor 5 is referred to as the radially inner side surface. Of the four side surfaces constituting the inner peripheral surface of the insertion hole 16a, the side surface (surface facing the other circumferential side) located on one side in the circumferential direction of the rotor 5 is referred to as the one circumferential side surface, and the side surface (surface facing the one circumferential side) located on the other side in the circumferential direction of the rotor 5 is referred to as the other circumferential side surface.

The pin 11a provided on each of the inner body 6a and the outer body 7a is loosely inserted into the insertion hole 16a.

When a central axis of the insertion hole 16a coincides with a central axis of the pin 11a, a gap is defined between the outer peripheral surface of the pin 11a and the four side surfaces constituting the inner peripheral surface of the insertion hole 16a. In the illustrated example, as illustrated in FIG. 10, the shape of the insertion hole 16a when viewed from the axial direction is a substantially square shape having four sides equal in length.

Figure 22:
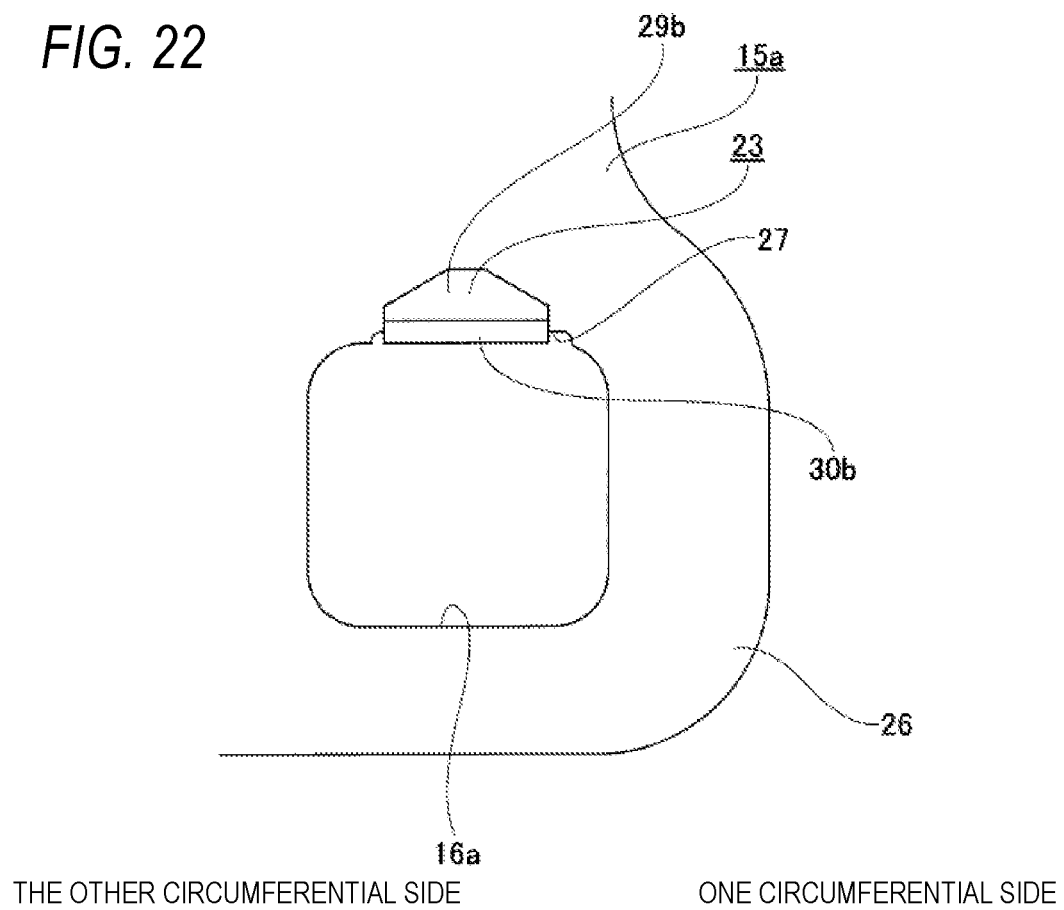
FIG. 22 illustrates another example of the insertion hole and corresponds to FIG. 15A.

However, when the present disclosure is carried out, the shape of the insertion hole when viewed from the axial direction can also be a substantially rectangular shape in which a radial width is slightly larger than a circumferential width (by a thickness of the pin receiver 23), and a magnitude of rattling allowed between the pin and the back plate can be set to be the same in the radial direction and the circumferential direction when the pin receiver is attached to an inner side of the insertion hole. When the present disclosure is carried out, as illustrated in FIG. 22, a surface (radially outer side surface in the illustrated example) of the inner peripheral surface of the insertion hole 16a which is covered by the pin receiver 23 can be formed with a concave portion 27 to accommodate the pin receiver 23.

The back plate 15a has, at a radially outer side end portion on its one circumferential side surface which is located on the radially outer side relative to the action line of the brake tangential force that acts during braking, a flat abutting surface 19a that faces the abutted surface 18a in the circumferential direction.

The back plate 15a includes, at a radially intermediate portion on the other circumferential side surface, a convex ear portion 17a protruding toward the other circumferential side. The ear portion 17a is engaged with the guide groove 12a provided in each of the inner body 6a and the outer body 7a to be movable in the axial direction.

As illustrated in FIGS. 7 to 9, by inserting the pin 11a provided on each of the inner body 6a and the outer body 7a into the insertion hole 16a provided on the one circumferential side portion of the back plate 15a and engaging the ear portion 17a provided on the other circumferential side portion of the back plate 15a with the guide groove 12a provided on each of the inner body 6a and the outer body 7a, each of the inner pad 3a and the outer pad 4a is supported on the caliper 2a to be movable in the axial direction. When the inner pad 3a and the outer pad 4a are supported on the caliper 2a, the abutting surface 19a provided on the one circumferential side surface of the back plate 15a faces the abutted surface 18a provided on the rotation-in side coupling portion 8a in the circumferential direction.

[Pad Spring]

The disc brake device 1a according to the present embodiment further includes a pair of pad springs 20a, 20b in order to prevent the inner pad 3a and the outer pad 4a from rattling during non-braking. When the present disclosure is carried out, a structure as illustrated in FIG. 57 in which the pair of pad springs 20a, 20b are integrated can be adopted.

The pad spring 20a presses one circumferential side portion of an outer peripheral edge portion of the back plate 15a of each of the inner pad 3a and the outer pad 4a toward the radially inner side. The pad spring 20a is disposed on the radially outer side relative to the inner pad 3a and the outer pad 4a and is between the rotation-in side coupling portion 8a and the center bridge 10a in the circumferential direction. The pad spring 20a is formed by a metal plate and includes a pair of rotation-in side pressing portions 21c, 21d. The pair of rotation-in side pressing portions 21c, 21d press, of the outer peripheral edge portion of the back plate 15a of each of the inner pad 3a and the outer pad 4a, positions where the back plate 15a radially overlaps with the pin 11a (insertion hole 16a) toward the radially inner side and the axially outer side.

The pad spring 20b presses the other circumferential side portion of the outer peripheral edge portion of the back plate 15a of each of the inner pad 3a and the outer pad 4a toward the radially inner side. The pad spring 20b is disposed on the radially outer side relative to the inner pad 3a and the outer pad 4a and is between the rotation-out side coupling portion 9a and the center bridge 10a in the circumferential direction. The pad spring 20b is formed by a metal plate and includes a pair of rotation-out side pressing portions 22c, 22d. The pair of rotation-out side pressing portions 22c, 22d press the other circumferential side portion of the outer peripheral edge portion of the back plate 15a of each of the inner pad 3a and the outer pad 4a toward the radially inner side.

[Moment During Braking]

In the disc brake device 1a according to the present embodiment, the same moment as that in the structure illustrated in FIGS. 57 to 59B described above is generated on each of the inner pad 3a and the outer pad 4a during braking.

During forward braking, as illustrated in FIG. 9, the brake tangential force F1 directed to the other circumferential side (left side in FIG. 9, rotation-out side) acts on the friction surface center point A of the friction member 14a of the inner pad 3a (outer pad 4a). Accordingly, the inner pad 3a (outer pad 4a) slightly moves toward the other circumferential side. The one circumferential side surface of the inner peripheral surface of the insertion hole 16a is engaged with one circumferential side end portion of the outer peripheral surface of the pin 11a to bear the brake tangential force F1 (so-called pull anchor structure). For this reason, during forward braking, the moment M1 in a direction in which the other circumferential side portion is pressed down toward the radially inner side acts on the inner pad 3a and the outer pad 4a. The friction surface center point A is a centroid of a friction surface, which is determined by diameter, an arrangement, and the like of a piston.

In contrast, during reverse braking, the brake tangential force F2 directed to the one circumferential side (right side in FIG. 9, rotation-out side) acts on the friction surface center point A of the friction member 14a of the inner pad 3a (outer pad 4a). Accordingly, the inner pad 3a (outer pad 4a) slightly moves toward the one circumferential side. The abutting surface 19a and the abutted surface 18a abut against each other to bear the brake tangential force F2 (so-called push anchor structure). For this reason, during reverse braking, the moment M2 (in the same direction as M1) in the direction in which the other circumferential side portion is pressed down toward the radially inner side acts on the inner pad 3a and the outer pad 4a. Therefore, according to the disc brake device 1a according to the present embodiment, directions of the moments M1, M2 acting on the inner pad 3a and the outer pad 4a can be the same during forward braking and reverse braking. For this reason, the inner pad 3a and the outer pad 4a can be maintained in a state of being rotated counterclockwise even when the forward braking and the reverse braking are repeated as when the vehicle enters a garage or the like. Therefore, crunch sound can be prevented.

During forward braking and reverse braking, the moments (torques) M1, M2 acting on each of the inner pad 3a and the outer pad 4a cause the radially inner side surface of the inner peripheral surface of the insertion hole 16a to engage with the radially inner side end portion of the outer peripheral surface of the pin 11a, and the radially inner side surface of the ear portion 17a to abut against the radially inner side surface of the guide groove 12a, thereby bearing the brake tangential forces. When a braking force is released, each of the inner pad 3a and the outer pad 4a moves the one circumferential side portion toward the radially inner side by gravity and a pressing force of the pad spring 20a.

[Pin Receiver]

Next, the pin receiver 23 attached to each of the inner pad 3a and the outer pad 4a will be described.

As illustrated in FIGS. 11 to 19, the pin receiver 23 is attached to an inner side of the insertion hole 16a provided in the back plate 15a of each of the inner pad 3a and the outer pad 4a, that is, to a portion of an inner peripheral edge portion of the insertion hole 16a. In the present embodiment, pin receivers 23 having the same configuration (which are the same component) is provided on the inner pad 3a and the outer pad 4a. However, when the present disclosure is carried out, different pin receivers can be attached to the inner pad 3a and the outer pad 4a.

The pin receiver 23 is attached to the inner side of the insertion hole 16a and comes into contact with the outer peripheral surface of the pin 11a inserted into the insertion hole 16a. In other words, the pin receiver 23 is held between the outer peripheral surface of the pin 11a and the inner peripheral surface of the insertion hole 16a. Accordingly, when braking is released, since the one circumferential side portion of each of the inner pad 3a and the outer pad 4a is pressed toward the radially inner side by the pad spring 20a, the outer peripheral surface of the pin 11a and the inner peripheral surface of the insertion hole 16a are prevented from coming into direct contact with each other.

Figure 20B:
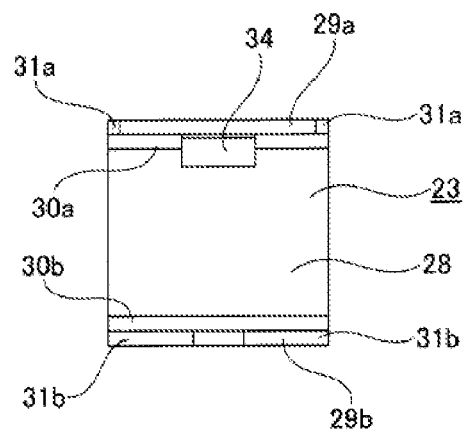
Figure 20A:
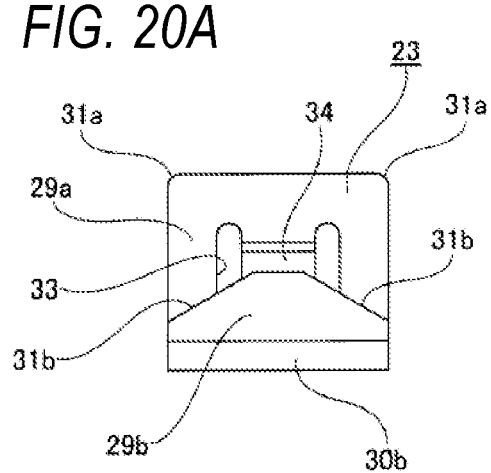
Figure 20D:
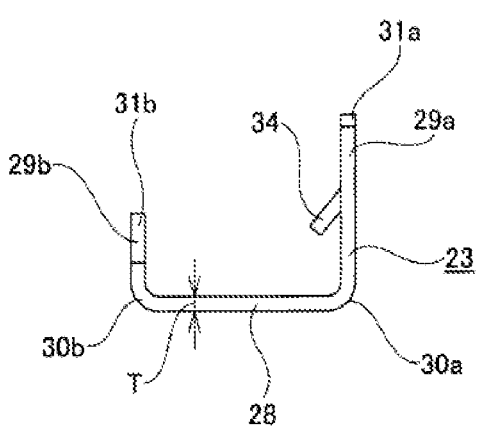
Figure 20C:
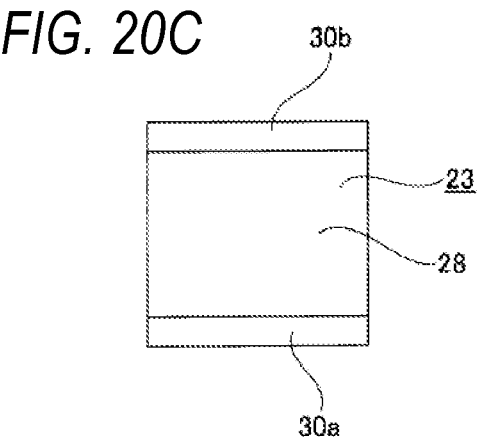
Figure 21A:
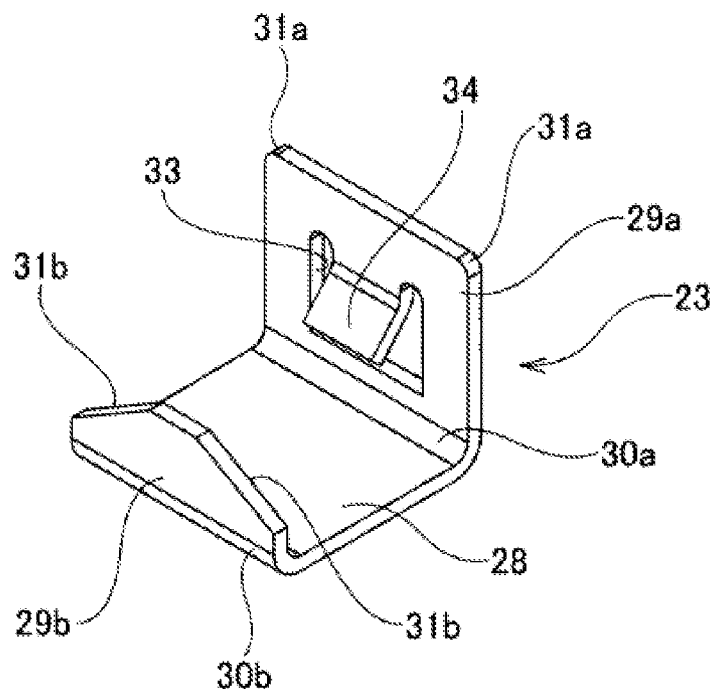
Figure 21B:
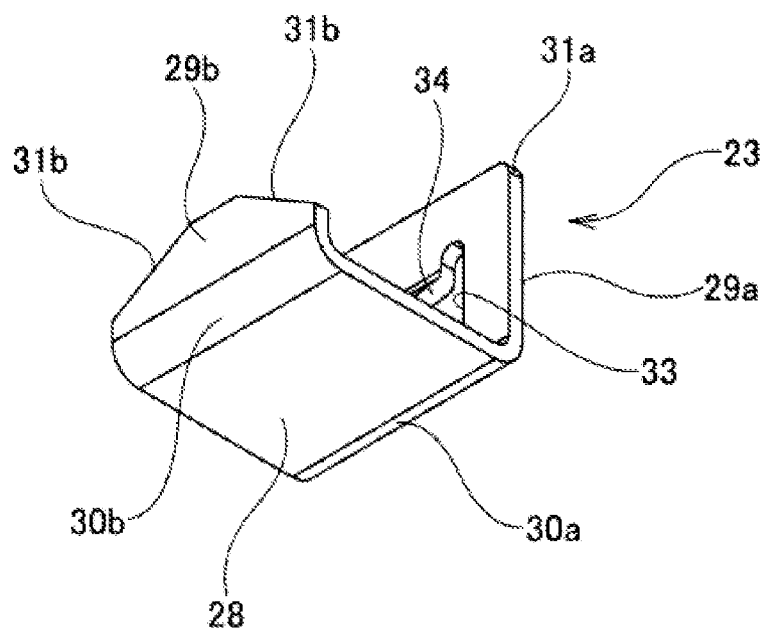

The pin receiver 23 is formed by pressing a single metal plate such as a stainless steel plate and has a substantially J shape or a substantially U shape as a whole as illustrated in FIG. 20D. A thickness T of the pin receiver 23 is restricted to a thickness at which the pin 11a can be loosely inserted into the insertion hole 16a in the axial direction when the pin receiver 23 is attached to the inner side of the insertion hole 16a. In the present embodiment, a portion of the pin receiver 23 (bent plate 29b to be described later) is disposed on a front surface (axially inner side surface) side of the back plate 15a. For this reason, the thickness T of the pin receiver 23 is smaller than an allowable limit thickness of the friction member 14a.

The pin receiver 23 includes a body plate 28, a pair of bent plates 29a, 29b, and a pair of curved portions 30a, 30b.

The body plate 28 is disposed between the outer peripheral surface of the pin 11a and the inner peripheral surface of the insertion hole 16a and has a function of reducing impact when the outer peripheral surface of the pin 11a and the inner peripheral surface of the insertion hole 16a collide with each other. The body plate 28 is formed in a flat plate shape and covers substantially the entire radially outer side surface of the inner peripheral surface of the insertion hole 16a. Regarding the body plate 28, a direction in a thickness direction of the back plate 15a (front-back direction of FIG. 20A, upper-lower directions of FIGS. 20B and 20C, left-right direction of FIG. 20A) is referred to as a length direction. The length direction coincides with the axial direction of the rotor 5 when the disc brake device 1a is assembled. Regarding the body plate 28, a direction orthogonal to each of the length direction and the thickness direction (left-right directions in FIGS. 20A to 20C, front-back direction in FIG. 20D) is referred to as a width direction. The width direction coincides with the circumferential direction of the rotor 5 when the disc brake device 1a is assembled. The length of the body plate 28 is substantially the same as the thickness of the back plate 15a (protruding portion 26).

The pair of bent plates 29a, 29b have a function of fixing the pin receiver 23 to the back plate 15a. The pair of bent plates 29a, 29b are bent at two end portions of the body plate 28 in the length direction, and overlap with the back plate 15a in the thickness direction of the back plate 15a. The pair of bent plates 29a, 29b are bent at substantially right angles relative to the body plate 28. The pair of bent plates 29a, 29b extend from the two end portions of the body plate 28 in the length direction toward an outer side in the radial direction of the insertion hole 16a (outer side in the radial direction of the rotor 5 in the present embodiment). The pair 30) of bent plates 29a, 29b are substantially in parallel to each other, and elastically hold a part of the back plate 15a which is close to a radially outer side of the insertion hole 16a. In the present embodiment, the extension direction (length direction) of the bent plates 29a, 29b coincides with the radial direction of the rotor 5 when the disc brake device 1a is assembled, and a width direction coincides with the circumferential direction of the rotor 5 when the disc brake device 1a is assembled.

The pair of bent plates 29a, 29b have different lengths. Specifically, of the pair of bent plates 29a, 29b, the length of the bent plate 29a disposed on the axially outer side (anti-rotor side) is larger than the length of the bent plate 29b disposed on the axially inner side (rotor side).

Top end portions (radially outer side end portions) of the pair of bent plates 29a, 29b respectively include chamfered portions 31a, 31b on two sides in the width direction. For this reason, the top end portions of the pair of bent plates 29a, 29b have a tapered shape. In the illustrated example, the chamfered portion 31a on the bent plate 29a adopts R chamfering, the chamfered portion 31b on the bent plate 29b adopts C chamfering, and a type (shape) of chamfering is not particularly limited.

The bent plate 29a disposed on the axially outer side is engaged with the back plate 15a and further has a function of preventing the pin receiver 23 from coming off from the back plate 15a. For this reason, the bent plate 29a includes a retaining portion. In contrast, the bent plate 29b disposed on the axially inner side is formed in a flat plate shape as a whole and includes no retaining portion.

The retaining portion provided only on the bent plate 29a is constituted by a tongue piece 34 surrounded by a substantially U-shaped slit 33. The tongue piece 34 extends in an extending direction of the bent plate 29a, and one of end portions of the tongue piece 34 at a side of the body plate 28 is a free end. In other words, the tongue piece 34 includes a free end at a radially inner side end portion which is an end portion close to the body plate 28, and a coupling end at a radially outer side end portion which is an end portion far from the body plate 28. The tongue piece 34 is inclined toward the axially inner side (toward the back surface of the back plate 15a) as approaching the radially inner side. The tongue piece 34 is elastically deformed toward the axially outer side when the pin receiver 23 is attached to the back plate 15a, and a top end portion (top end corner portion) thereof engages with the back surface of the back plate 15a. That is, when the pin receiver 23 is to move toward the radially inner side relative to the back plate 15a, the tongue piece 34 abuts against (bites) the back surface of the back plate 15a, thereby preventing the pin receiver 23 from moving to the radially inner side relative to the back plate 15a. When the present disclosure is carried out, the top end portion of the tongue piece can also be engaged with an engagement concave portion formed in the back surface of the back plate.

Each of the pair of curved portions 30a, 30b has an arc cross-sectional shape, and is formed in a substantially quarter-cylindrical shape as a whole. Each of the pair of curved portions 30a. 30b joints the body plate 28 with a corresponding one of the pair of bent plates 29a, 29b. Each of the pair of curved portions 30a. 30b covers a corresponding one of edge portions 35a, 35b which are sides (sides on the radially outer side) of opening edge portions of the insertion hole 16a on two sides in the axial direction. Each of the edge portions 35a. 35b has a right-angled cross section.

The pin receiver 23 can be attached by the following steps.

First, the pin receiver 23 is disposed on the inner side of the insertion hole 16a in a state in which the length direction of the body plate 28 coincides with the thickness direction of the back plate 15a and the top end portions of the pair of bent plates 29a, 29b are directed to the outer side in the radial direction of the insertion hole 16a (radially outer side of the rotor 5 in the present embodiment).

Thereafter, the pin receiver 23 is moved relative to the back plate 15a so that the body plate 28 approaches the inner peripheral surface (radially outer side surface) of the insertion hole 16a and thereby the back plate 15a is pushed in between the pair of bent plates 29a, 29b. Accordingly, the back plate 15a is elastically held between the tongue piece 34 of the bent plate part 29a and the bent plate 29b. At this time, the tongue piece 34 serving as the retaining portion is elastically deformed and the top end portion thereof engages with the back surface of the back plate 15a. In the present embodiment, the pin receiver 23 is fixed to the back plate 15a in this manner.

According to the disc brake device 1a in the present embodiment as described above, abnormal sound due to a collision between the inner peripheral surface of the insertion hole 16a provided on the back plate 15a of each of the inner pad 3a and the outer pad 4a and the outer peripheral surface of the pin 11a inserted into the insertion hole 16a when braking is released can be reduced.

That is, in the present embodiment, the pin receiver 23 is attached to the inner side of the insertion hole 16a provided in the back plate 15a of each of the inner pad 3a and the outer pad 4a, and covers the radially outer side surface of the inner peripheral surface of the insertion hole 16a by the body plate 28 constituting the pin receiver 23. Therefore, the radially outer side end portion of the outer peripheral surface of the pin 11a can be prevented from coming into direct contact with the radially outer side surface of the inner peripheral surface of the insertion hole 16a. When braking is released, the moments (torques) M1, M2 that act on the inner pad 3a and the outer pad 4a during braking do not act any longer, and the one circumferential side portion of the back plate 15a is pressed by the pad spring 20a and moves toward the radially inner side. At this time, in the present embodiment, the radially outer side surface of the inner peripheral surface of the insertion hole 16a can collide with the radially outer side end portion of the outer peripheral surface of the pin 11a via the body plate 28. For this reason, the abnormal sound due to the collision between the outer peripheral surface of the pin 11a and the inner peripheral surface of the insertion hole 16a can be reduced.

Further, the pair of curved portions 30a, 30b can respectively cover the edge portions 35a, 35b at the opening edge portions of the insertion hole 16a. For this reason, the edge portions 35a. 35b can be prevented from coming into direct contact with the pin 11a. Therefore, damage to the edge portions 35a, 35b and the pin 11a due to stress concentration can be prevented. Further, since the curved portions 30a, 30b having the arc-shaped cross-sectional shape instead of the edge portions 35a, 35b are slid relative to the pin 11a during braking and braking release, sliding resistance of the inner pad 3a and the outer pad 4a relative to the pin 11a can be reduced. As a result, sufficient clearance between the friction member 14a and the rotor 5 can be ensured during braking release and drag resistance can be reduced.

Further, when the pin receiver 23 is attached to each of the inner pad 3a and the outer pad 4a, constraint conditions on each of the inner pad 3a and the outer pad 4a during braking can be changed comparing to a case where no pin receiver 23 is attached. The body plate 28 instead of the radially outer side surface of the inner peripheral surface of the insertion hole 16a can be brought into contact with the pin 11a. For this reason, acoustic noise in the inner pad 3a and the outer pad 4a during braking can be prevented.

Further, since the top end portions of the pair of bent plates 29a, 29b are tapered, the back plate 15a can be prevented from being caught between the pair of bent plates 29a, 29b when the pin receiver 23 is attached to each of the inner pad 3a and the outer pad 4a. Therefore, workability of the attachment of the pin receiver 23 can be improved.

In the present embodiment, the pin receiver 23 is fixed on the back plate 15a by elastically interposing the back plate 15a with the pair of bent plates 29a, 29b constituting the pin receiver 23, and no other components such as screws or rivets are necessary to fix the pin receiver 23. For this reason, cost required for fixing the pin receiver 23 to the back plate 15a is reduced.

Since the top end portion (top end corner portion) of the tongue piece 34 serving as the retaining portion is engaged with the back surface of the back plate 15a, the pin receiver 23 can be effectively prevented from moving to the radially inner side relative to the back plate 15a. Therefore, the pin receiver 23 can be effectively prevented from coming off from the back plate 15a. Further, since the radially inner side end portion of the tongue piece 34 is a free end that is inclined toward the axially inner side as approaching the radially inner side, the top end portion of the tongue piece 34 can be engaged with the back surface of the back plate 15a by simply pushing the back plate 15a in between the pair of bent plates 29a, 29b. For this reason, no special processing is necessary to prevent the pin receiver 23 from coming off from the back plate 15a. Therefore, cost can also be reduced from this aspect.

Second Embodiment

Figure 23A:
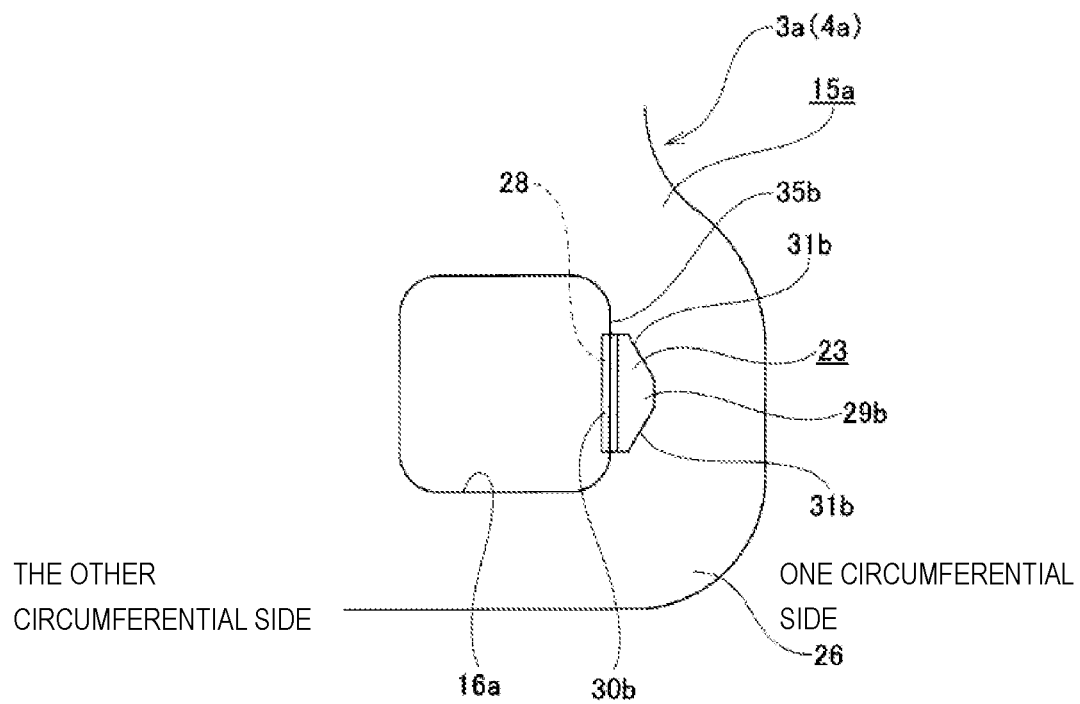
FIGS. 23A and 23B illustrate a second embodiment and correspond to FIGS. 15A and 15B.
Figure 23B:
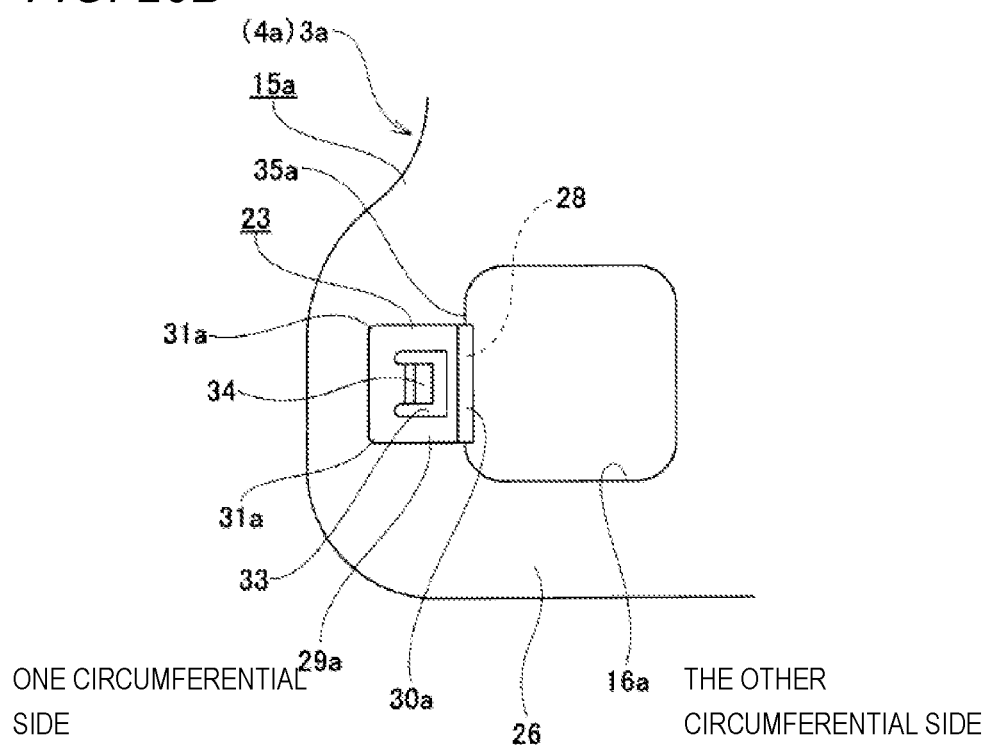

The second embodiment will be described with reference to FIGS. 23A and 23B.

In the present embodiment, an attachment position of the pin receiver 23 to the insertion hole 16a provided in the back plate 15a of the inner pad 3a (and the outer pad 4a) is changed from the structure of the first embodiment.

In the present embodiment, the pin receiver 23 is attached to an inner side of the insertion hole 16a to cover one circumferential side surface (surface opposite to the friction member 14a in the circumferential direction) of an inner peripheral surface of the insertion hole 16a by the body plate 28. For this reason, the body plate 28 is held between one circumferential side end portion of an outer peripheral surface of the pin 11a (see FIG. 17 and the like) and the one circumferential side surface of the inner peripheral surface of the insertion hole 16a. The pair of bent plates 29a, 29b extend from two end portions of the body plate 28 in a length direction toward one circumferential side.

In the present embodiment as described above, when each of the inner pad 3*a* and the outer pad 4*a* is displaced toward the other circumferential side during forward braking, the one circumferential side surface of the insertion hole 16*a* can be caused to collide with the circumferential side end portion of the outer peripheral surface of the pin 11*a* via the body plate 28 and thereby abnormal sound can be reduced.

Other configurations, operations, and effects are the same as those of the first embodiment.

Third Embodiment

Figure 24A:
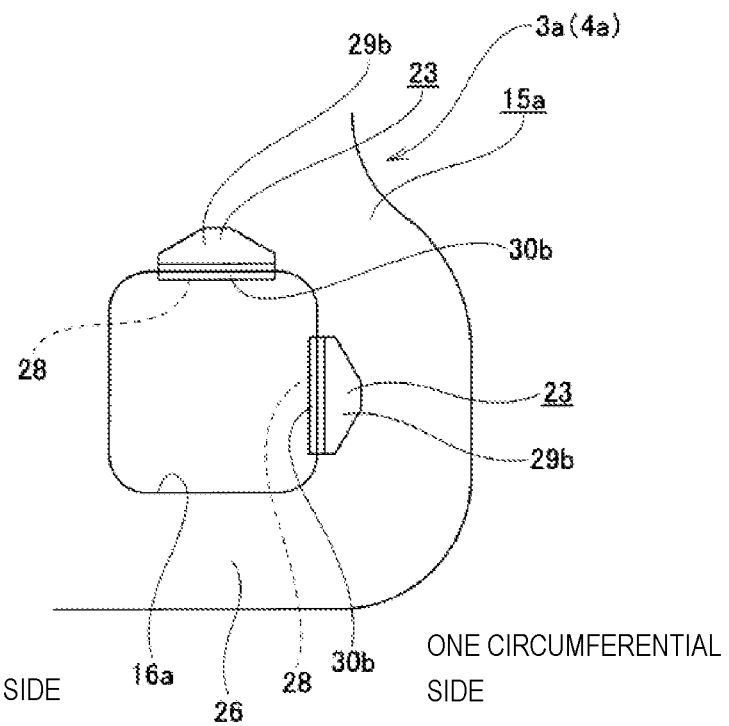
FIGS. 24A and 24B illustrate a third embodiment and correspond to FIGS. 15A and 15B.
Figure 24B:
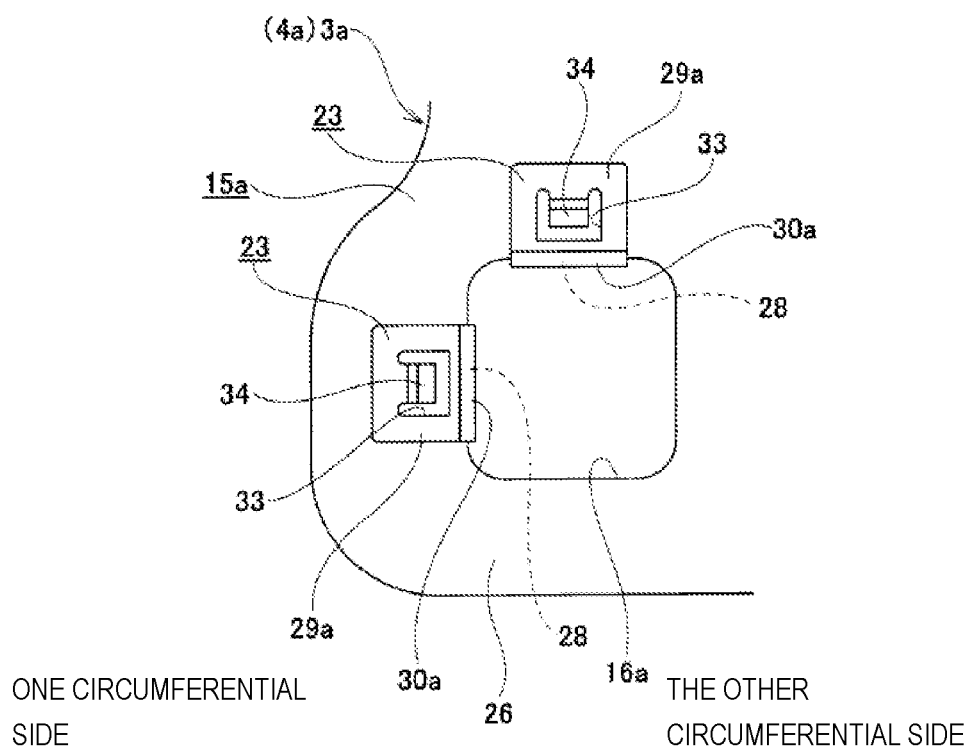

The third embodiment will be described with reference to FIGS. 24A and 24B.

In the present embodiment, the number of the pin receiver 23 attached to the insertion hole 16*a* provided in the back plate 15*a* of the inner pad 3*a* (and the outer pad 4*a*) is changed from the structures of the first embodiment and the second embodiment.

Although only one pin receiver 23 is attached to the inner side of the insertion hole 16*a* in the first embodiment and the second embodiment, two pin receivers 23 are attached to the inner side of the insertion hole 16*a*. The first pin receiver 23 is attached to the inner side of the insertion hole 16*a* to cover a radially outer side surface of an inner peripheral surface of the insertion hole 16*a* by the body plate 28, and the second pin receiver 23 is attached to the inner side of the insertion hole 16*a* to cover one circumferential side surface of the inner peripheral surface of the insertion hole 16*a* by the body plate 28. In short, the present embodiment has a structure similar to a combination of the first embodiment and the second embodiment.

According to the present embodiment, during braking release, the radially outer side surface of the inner peripheral surface of the insertion hole 16*a* can be caused to collide with a radially outer side end portion of an outer peripheral surface of the pin 11*a* (see FIG. 17 and the like) via the body plate 28 constituting the first pin receiver 23. During forward braking, the one circumferential side surface of the inner peripheral surface of the insertion hole 16*a* can be caused to collide (engage) with a circumferential side end portion of the outer peripheral surface of the pin 11*a* via the body plate 28 constituting the second pin receiver 23. Therefore, abnormal sound can be reduced during both braking release and forward braking.

Other configurations, operations, and effects are the same as those of the first embodiment and the second embodiment.

Fourth Embodiment

The fourth embodiment will be described with reference to FIG. 25.

In the present embodiment, a surface (upper surface in FIG. 25) of the body plate 28 constituting a pin receiver 23*a* which faces an inner peripheral surface of the insertion hole 16*a* is covered (coated) with a thin film of an elastic member 36 such as rubber or synthetic resin. In FIG. 25, the elastic member 36 is represented by a diagonal lattice pattern. In contrast, a surface (lower surface in FIG. 25) of the body plate 28 which faces the pin 11*a* (see FIG. 17 and the like) is not covered with the elastic member 36.

In the present embodiment, since the surface of the body plate 28 which faces the inner peripheral surface of the insertion hole 16*a* is covered with the elastic member 36, it is possible to more effectively reduce impact when the inner peripheral surface of the insertion hole 16*a* collides with the outer peripheral surface of the pin 11*a*. On the contrary, since the surface of the body plate 28 which faces the outer peripheral surface of the pin 11*a* is not covered with the elastic member 36, sliding resistance thereof relative to the pin 11*a* can be prevented from increasing.

Figure 25:
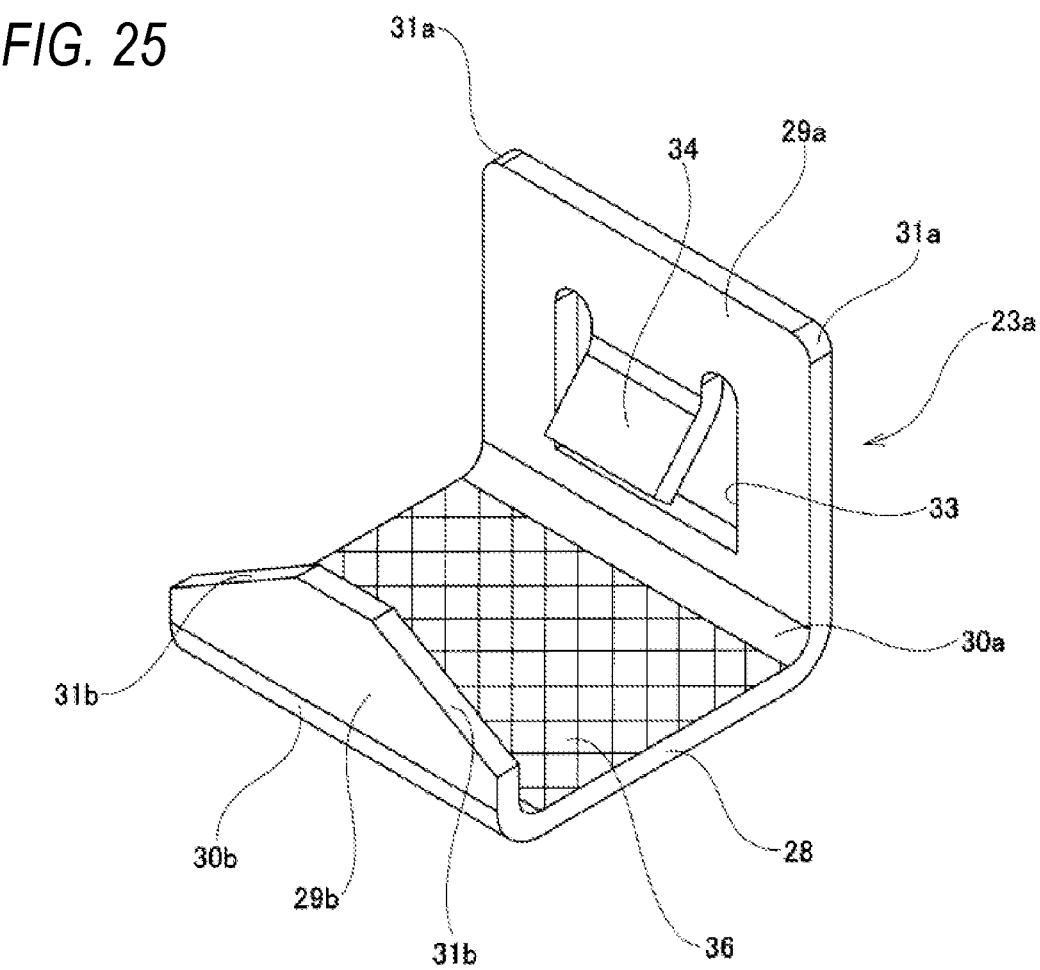
FIG. 25 illustrates a fourth embodiment and corresponds to FIG. 21A.
Figure 26A:
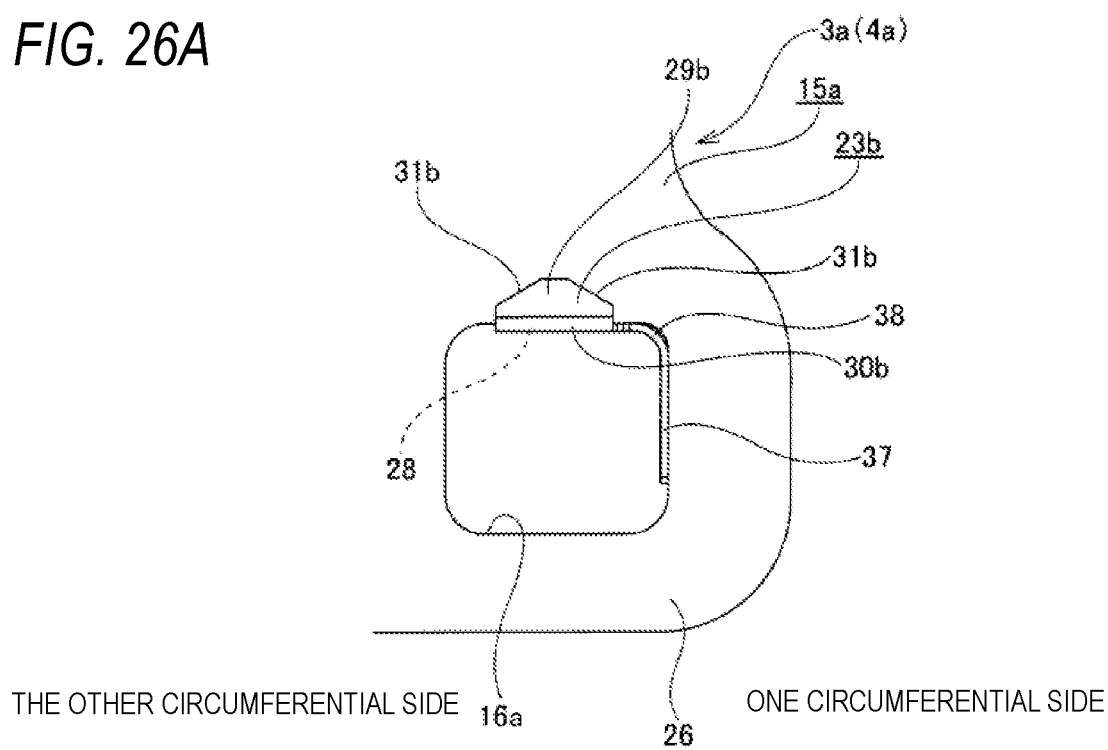
FIGS. 26A and 26B illustrate a fifth embodiment and correspond to FIGS. 15A and 15B.
Figure 26B:
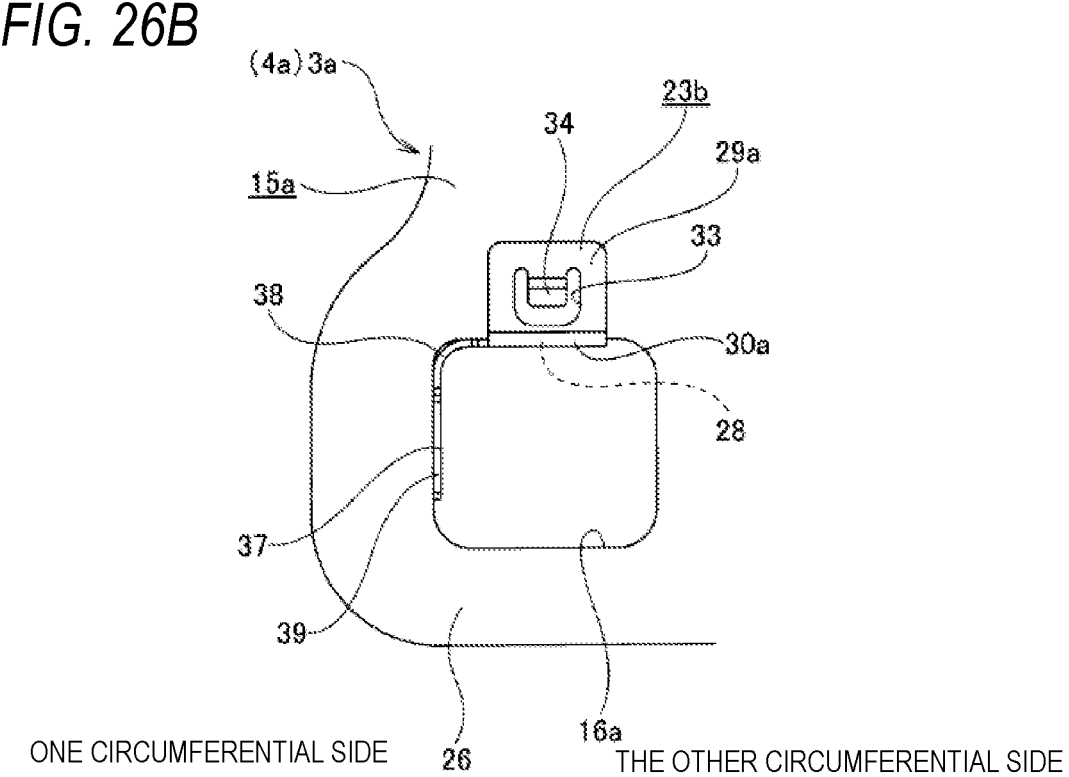
Figure 27B:
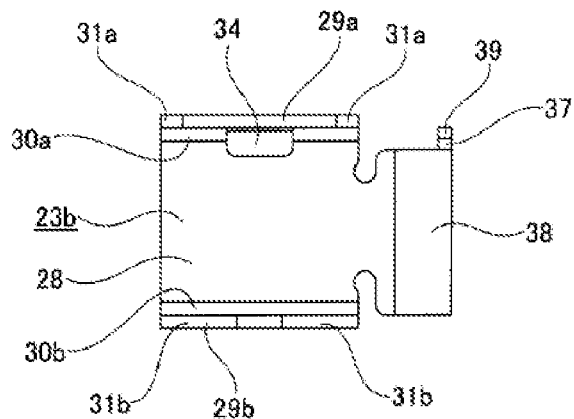
FIGS. 27A to 27D illustrate the fifth embodiment and correspond to FIGS. 20A to 20D.
Figure 27A:
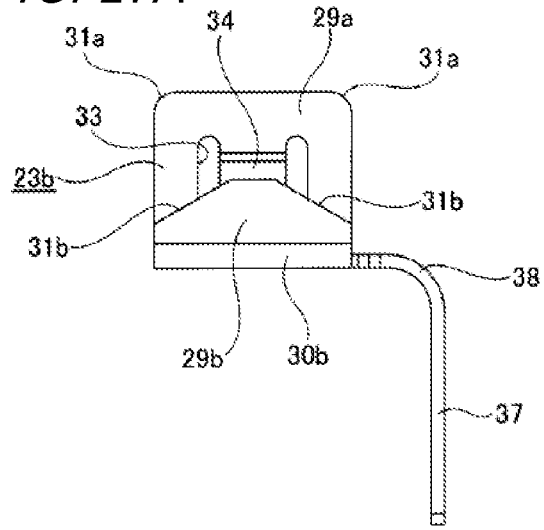
Figure 27D:
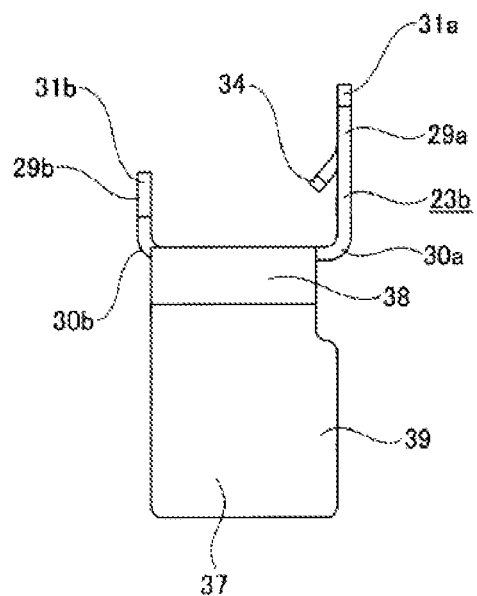
Figure 27C:
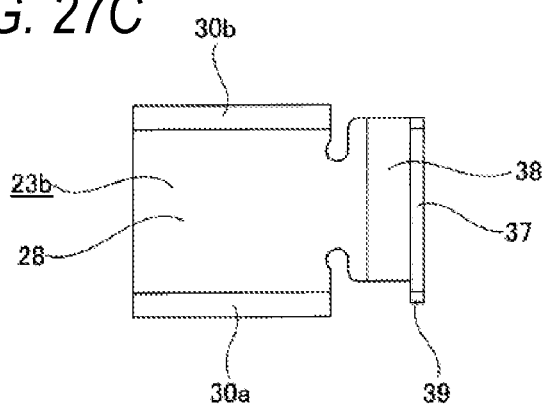
Figure 28A:
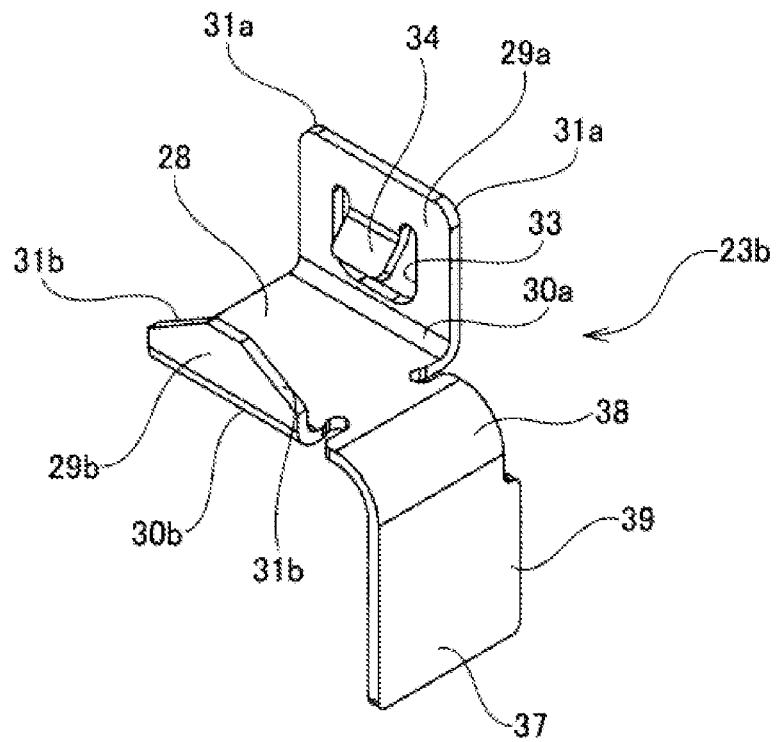
FIGS. 28A and 28B illustrate the fifth embodiment and correspond to FIGS. 21A and 21B.
Figure 28B:
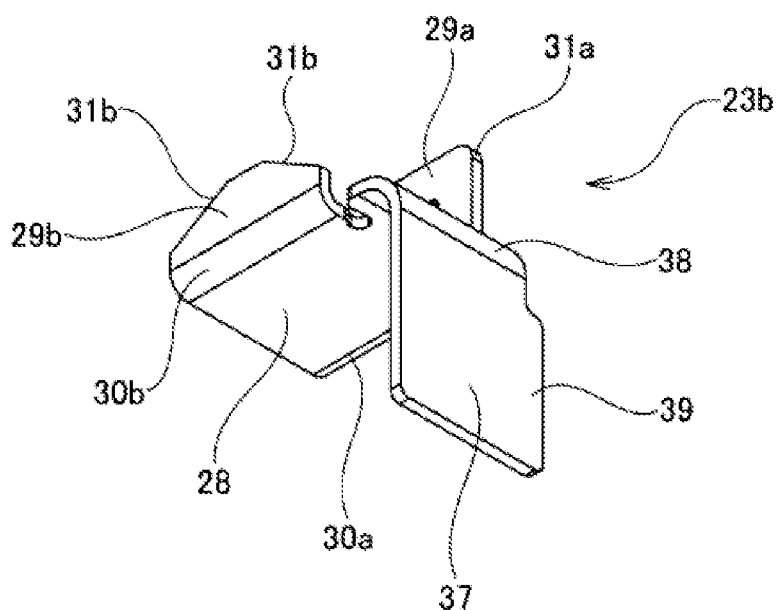

When the present disclosure is carried out, as illustrated in FIG. 25, the entire surface of the body plate which faces the inner peripheral surface of the insertion hole can be covered with the elastic member, or only a portion of the surface can be covered with the elastic member. The inner peripheral surface of the insertion hole can be covered with an elastic member, or a plate-shaped elastic member can be held between the body plate and the inner peripheral surface of the insertion hole.

Other operations and effects are the same as those of the first embodiment and the second embodiment.

Fifth Embodiment

The fifth embodiment will be described with reference to FIGS. 26A to 28B.

The fifth embodiment is a modification of the first embodiment. A pin receiver 23*b* according to the present embodiment includes not only the body plate 28, the pair of bent plates 29*a*, 29*b*, the pair of curved portions 30*a*, 30*b*, but also includes an auxiliary plate 37 and a bent portion 38.

The auxiliary plate 37 has a flat plate shape and is provided at one end portion of the body plate 28 in a width direction of the body plate 28 (one circumferential side in the present embodiment). The auxiliary plate 37 is bent at a right angle relative to the body plate 28 and extends toward a radially inner side. The auxiliary plate 37 covers one circumferential side surface of an inner peripheral surface of the insertion hole 16*a*, when the body plate 28 is attached to the pin insertion hole 16*a*. A surface of the auxiliary plate 37 which faces the inner peripheral surface of the insertion hole 16*a* can be covered with an elastic member as described in the above-described fourth embodiment.

The auxiliary plate 37 includes a guide portion 39 that facilitates insertion of the pin 11*a* into the insertion hole 16*a*. The auxiliary plate 37 includes the guide portion 39 at one of end portions of the auxiliary plate 37 in the length direction of the body plate 28, the one of the end portions of the auxiliary plate 37 is disposed at farer away from the rotor 5 than the other of the end portions of the auxiliary plate 37. Specifically, the guide portion 39 is provided at an axially outer end portion of the auxiliary plate 37 which is an end portion far from the rotor 5. The guide portion 39 protrudes toward an outer side (axially outer side) relative to the insertion hole 16*a* when the body plate 28 is attached to the insertion hole 16*a*. The guide portion 39 has a flat plate shape and is disposed on the same plane as a part (part disposed on an inner side of the insertion hole 16*a*) of the auxiliary plate 37 except for the guide portion 39. However, when the present disclosure is carried out, the guide portion may be inclined relative to the part of the auxiliary plate except for the guide portion. In this case, the guide portion can be inclined toward the one circumferential side as approaching the axially outer side.

The bent portion 38 has an arc cross-sectional shape and is formed in a substantially quarter cylindrical shape as a whole. The bent portion 38 joints the body plate 28 with the auxiliary plate 37. The bent portion 38 covers a corner portion on a radially outer side and the one circumferential side of the inner peripheral surface of the insertion hole 16*a*.

In the present embodiment, during braking release, a radially outer side surface of the inner peripheral surface of the insertion hole 16a can be caused to collide with a radially outer side end portion of an outer peripheral surface of the pin 11a (see FIG. 17 and the like) via the body plate 28. During forward braking, the one circumferential side surface of the inner peripheral surface of the insertion hole 16a can be caused to collide with a circumferential side end portion of the outer peripheral surface of the pin 11a via the auxiliary plate 37. For this reason, abnormal sound can be reduced during both braking release and forward braking.

In order to obtain the effect described above, two pin receivers are necessary for the structure of the third embodiment, whereas only one pin receiver 23b is sufficient in the present embodiment. For this reason, the number of components can be reduced, cost can be reduced, and the number of attachment steps can be reduced. In the present embodiment, no defect such as forgetting to attach one pin receiver in a case of attaching two pin receivers would occur since only one pin receiver 23b may be attached. Further, since the guide portion 39 is provided on the auxiliary plate 37, the pin 11a can be easily inserted into the insertion hole 16a.

Other configurations, operations, and effects are the same as those of the first embodiment.

Sixth Embodiment

Figure 29A:
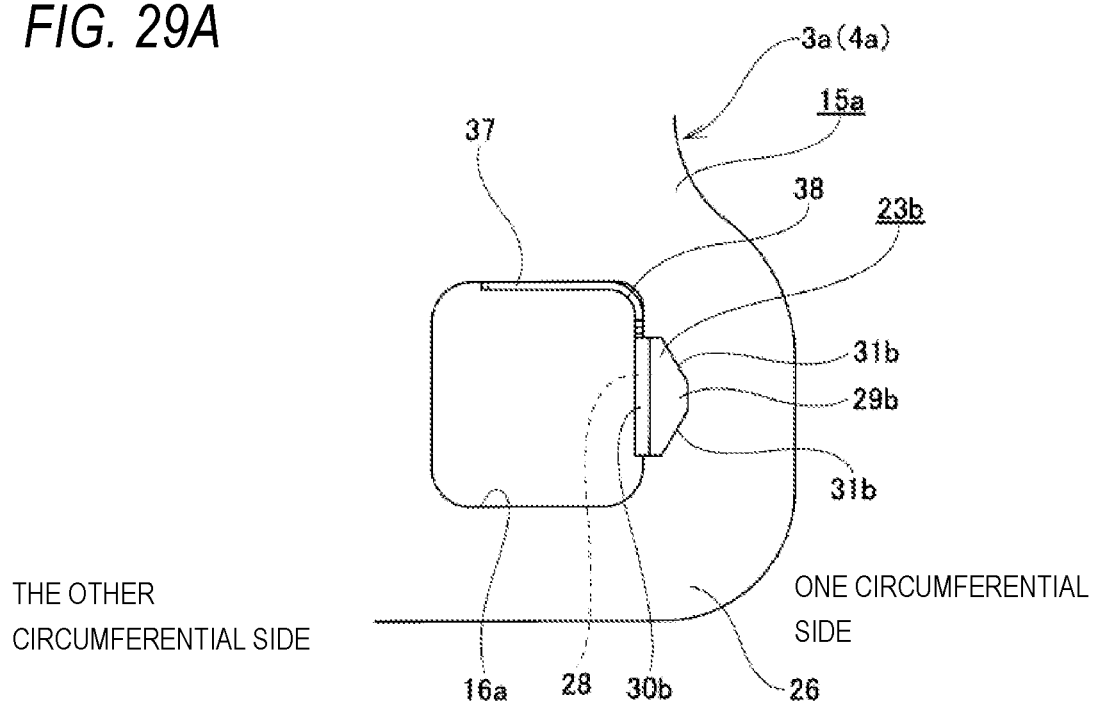
FIGS. 29A and 29B illustrate a sixth embodiment and correspond to FIGS. 15A and 15B.
Figure 29B:
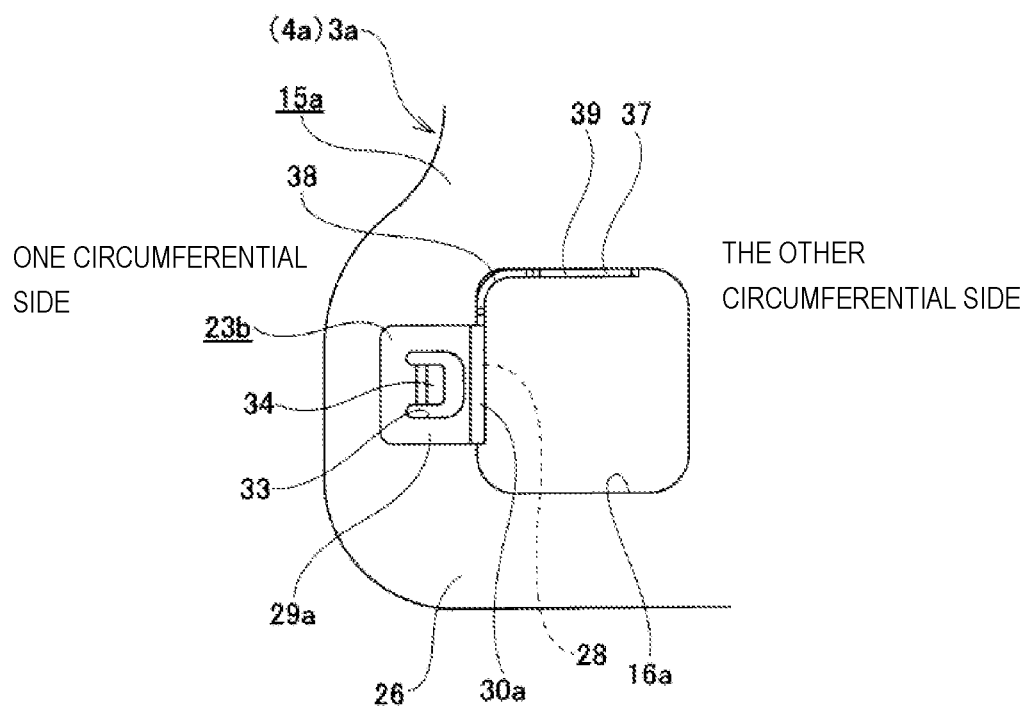

The sixth embodiment will be described with reference to FIGS. 29A and 29B.

In the present embodiment, an attachment position of the pin receiver 23b to the insertion hole 16a provided in the back plate 15a of the inner pad 3a (and the outer pad 4a) is changed from the structure of the fifth embodiment.

That is, in the present embodiment, the pin receiver 23b is attached to an inner side of the insertion hole 16a so that the body plate 28 covers one circumferential side surface (surface opposite to the friction member 14a in a circumferential direction of the rotor 5) of an inner peripheral surface of the insertion hole 16a and the auxiliary plate 37 covers a radially outer side surface of the inner peripheral surface of the insertion hole 16a.

For this reason, the body plate 28 is held between one circumferential side end portion of an outer peripheral surface of the pin 11a (see FIG. 17 and the like) and the one circumferential side surface of the inner peripheral surface of the insertion hole 16a, and the auxiliary plate 37 is held between a radially outer side end portion of the outer peripheral surface of the pin 11a and the radially outer side surface of the inner peripheral surface of the insertion hole 16a. The pair of bent plates 29a, 29b extend from two end portions of the body plate 28 in a length direction toward one circumferential side.

In the present embodiment as described above, when each of the inner pad 3a and the outer pad 4a is displaced toward the other circumferential side during forward braking, the one circumferential side surface of the insertion hole 16a can be caused to collide (engage) with the circumferential side end portion of the outer peripheral surface of the pin 11a via the body plate 28. During braking release, the radially outer side surface of the inner peripheral surface of the insertion hole 16a can be caused to collide with the radially outer side end portion of the outer peripheral surface of the pin 11a via the auxiliary plate 37. For this reason, abnormal sound can be reduced during both braking release and forward braking.

Other configurations, operations, and effects are the same as those of the fifth embodiment.

Seventh Embodiment

Figure 30A:
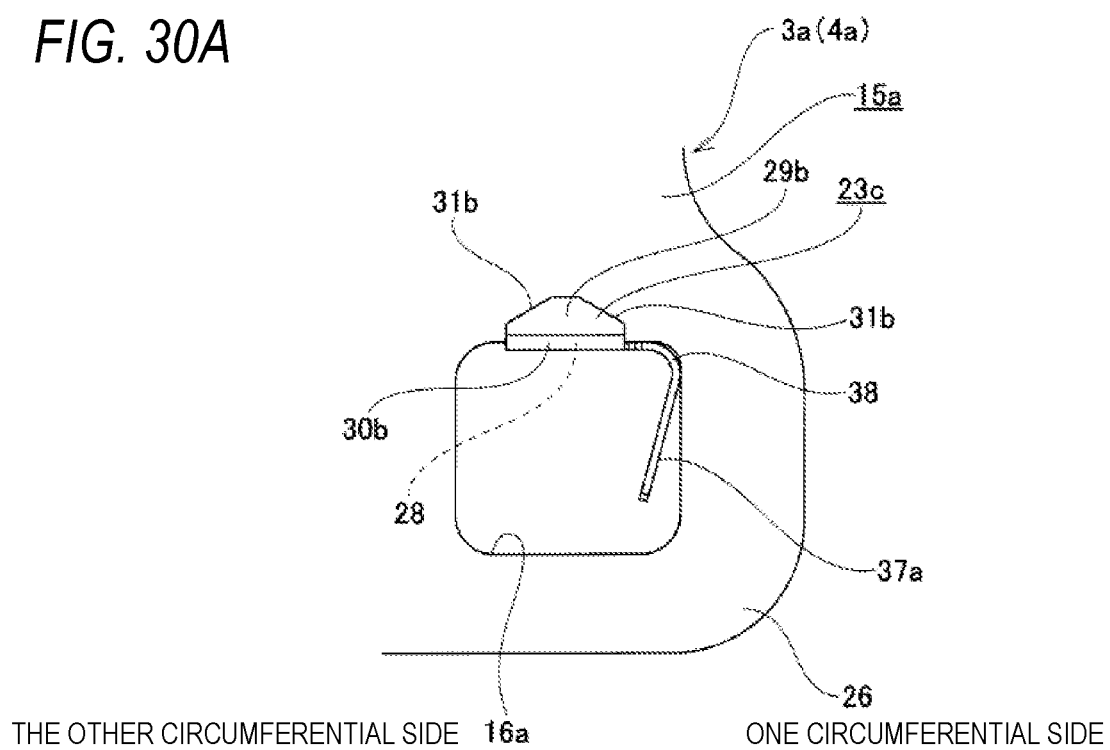
FIGS. 30A and 30B illustrate a seventh embodiment and correspond to FIGS. 15A and 15B.
Figure 30B:
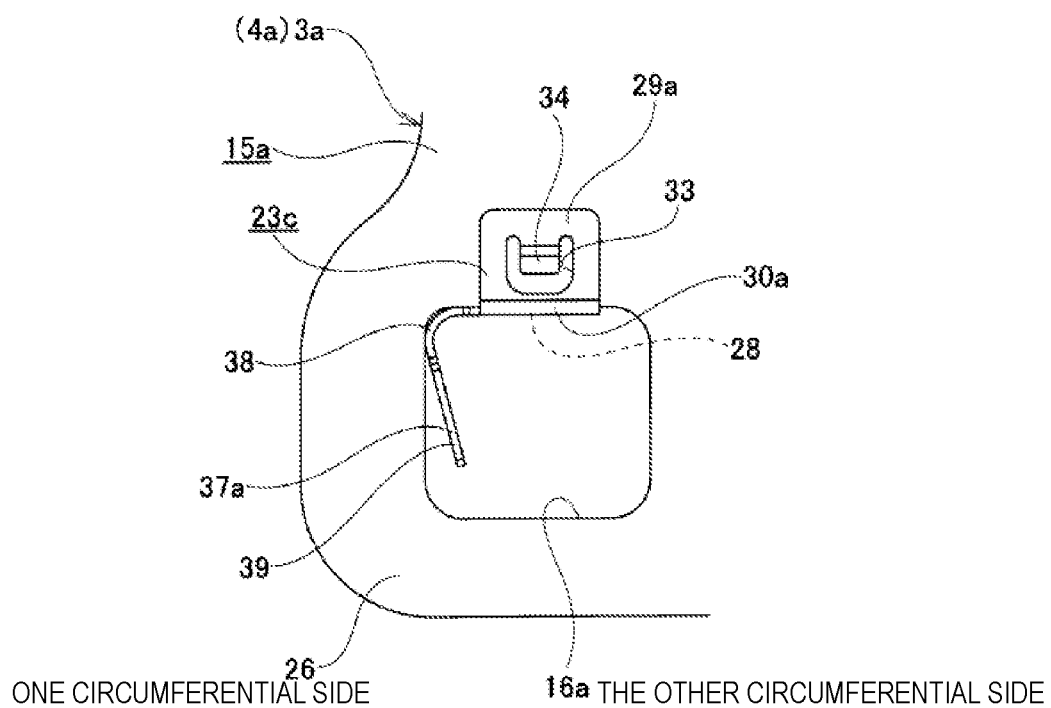
Figure 31A:
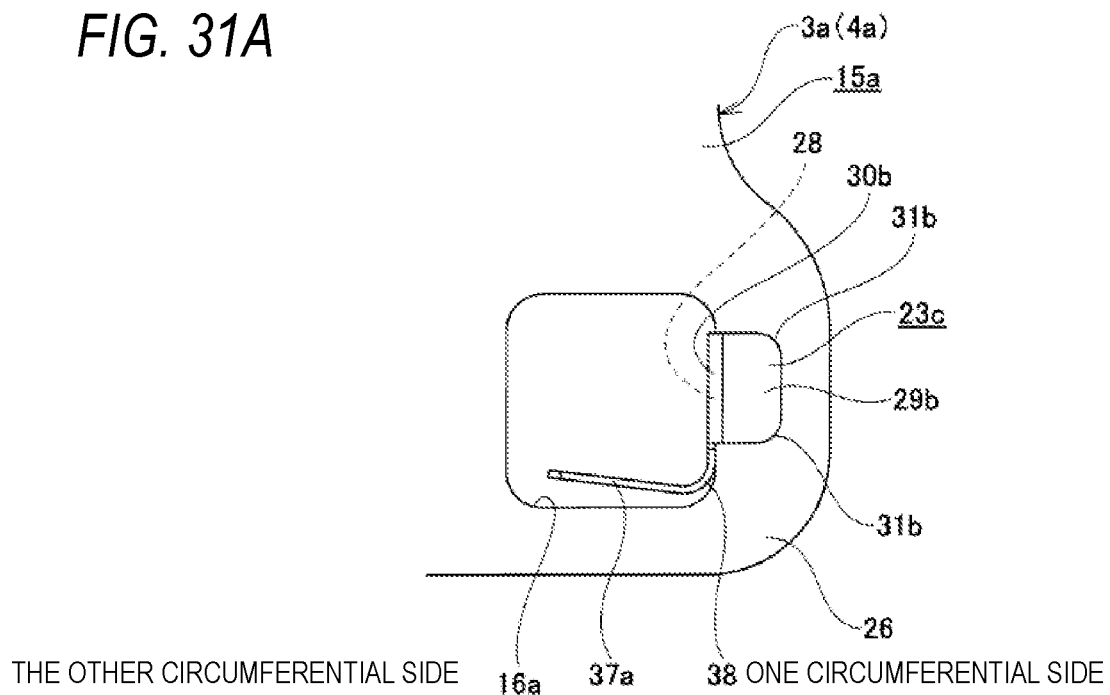
FIGS. 31A and 31B illustrate an eighth embodiment and correspond to FIGS. 15A and 15B.
Figure 31B:
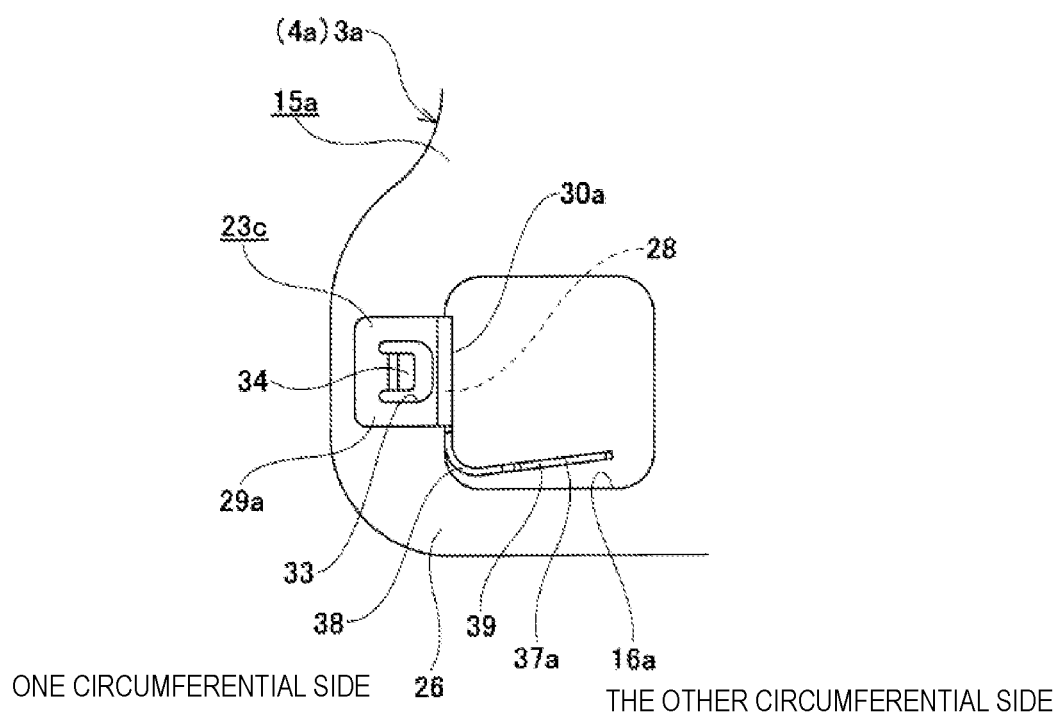
Figure 32B:
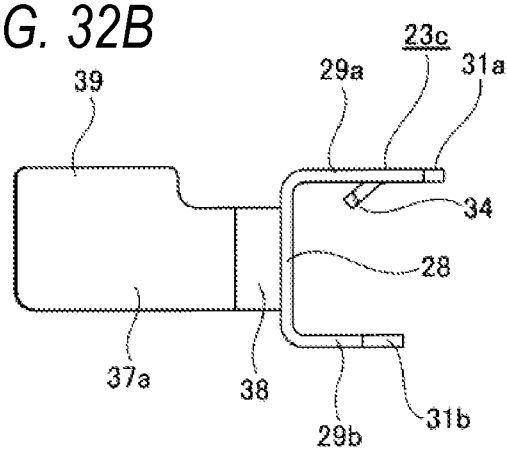
FIGS. 32A to 32D illustrate the eighth embodiment and correspond to FIGS. 20A to 20D.
Figure 32A:
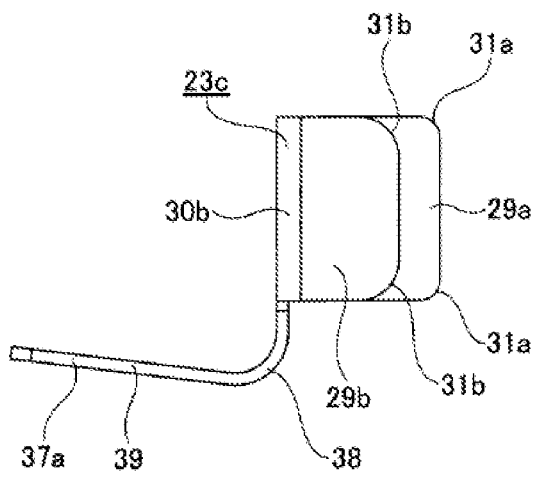
Figure 32D:
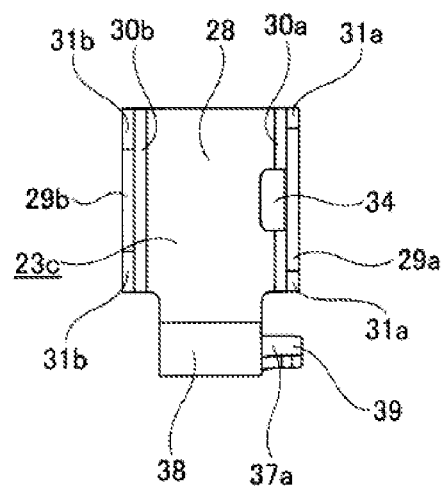
Figure 32C:
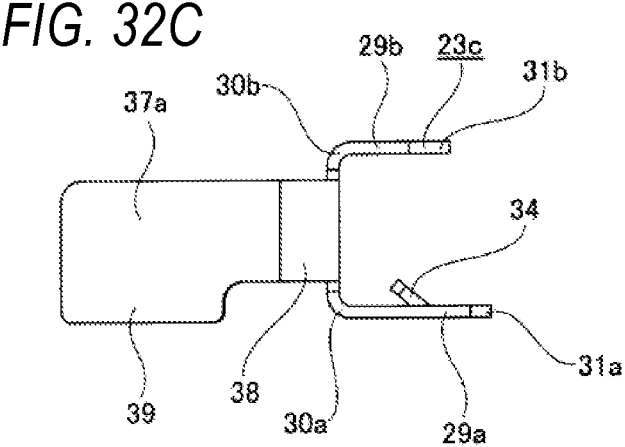
Figure 33A:
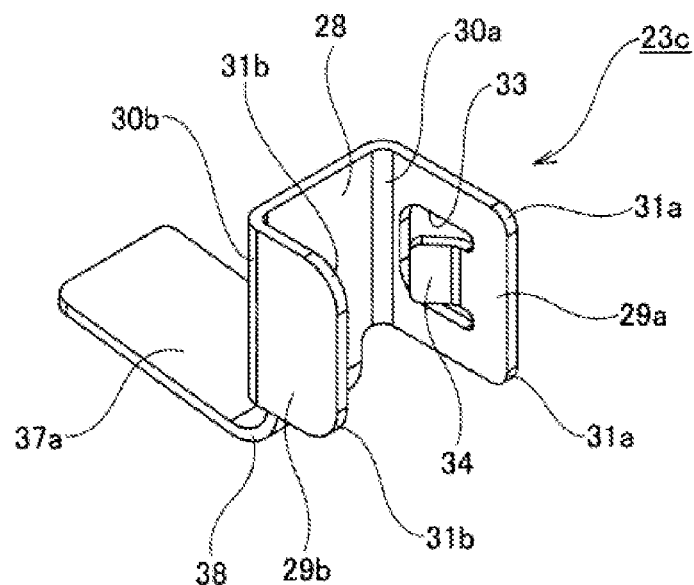
Figure 33B:
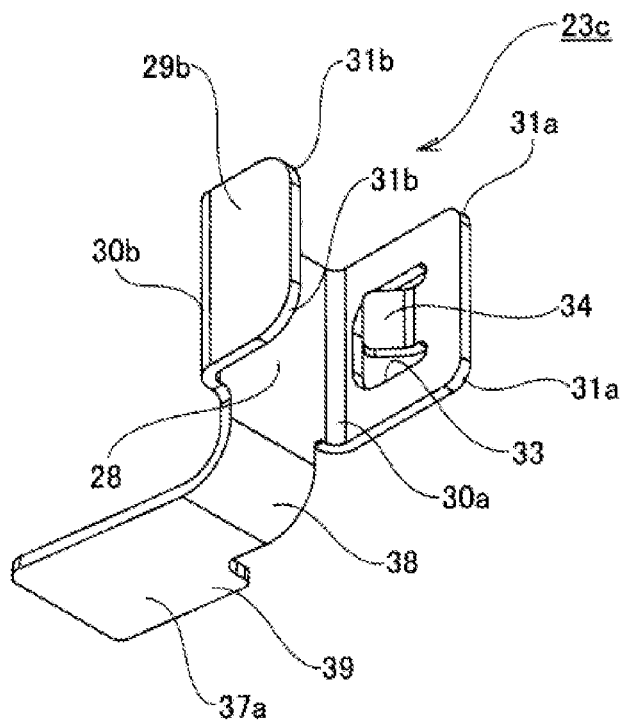

The seventh embodiment will be described with reference to FIGS. 30A and 30B.

The present embodiment is a modification of the fifth embodiment. A pin receiver 23c according to the present embodiment includes an auxiliary plate 37a having a function of applying an elastic force to the pin 11a (see FIG. 17 and the like). For this reason, in a free state of the auxiliary plate 37a, an angle between the body plate 28 and the auxiliary plate 37a is an acute angle that is slightly smaller than a right angle (90 degrees). A substantially triangular gap is defined between the auxiliary plate 37a and one circumferential side surface of an inner peripheral surface of the insertion hole 16a when viewed in an axial direction.

When the pin 11a is inserted into the insertion hole 16a, the auxiliary plate 37a is elastically deformed by being abutted against the pin 11a to increase the angle between the auxiliary plate 37a and the body plate 28 (approaching the one circumferential side surface of the insertion hole 16a). Accordingly, the auxiliary plate 37a applies an elastic force directed to the other circumferential side to the pin 11a.

In the present embodiment as described above, the auxiliary plate 37a can press the pin 11a toward the other circumferential side. For this reason, rattling between the outer peripheral surface of the pin 11a and the inner peripheral surface of the insertion hole 16a can be prevented. That is, the inner pad 3a and the outer pad 4a can be prevented from being displaced in the circumferential direction relative to the pin 11a.

Other operations and effects are the same as those of the fifth embodiment.

Eighth Embodiment

The eighth embodiment will be described with reference to FIGS. 31A to 33B.

In the present embodiment, an attachment position of the pin receiver 23c to the insertion hole 16a provided in the back plate 15a of the inner pad 3a (and the outer pad 4a) is changed from the structure of the seventh embodiment. The pin receiver 23c according to the present embodiment and the pin receiver 23c according to the seventh embodiment have the same basic shape except for different shapes at a detailed portion such as the chamfered portion 31b, and thus descriptions of the difference in shape will be omitted.

In the present embodiment, the pin receiver 23c is attached to an inner side of the insertion hole 16a so that the body plate 28 covers one circumferential side surface of an inner peripheral surface of the insertion hole 16a and the auxiliary plate 37 covers a radially inner side surface of the inner peripheral surface of the insertion hole 16a. The auxiliary plate 37a applies an elastic force directed to a radially outer side to the pin 11a (see FIG. 17 and the like). In the present embodiment as described above, the auxiliary plate 37a can press the pin 11a toward the radially outer side. For this reason, in combination with a pressing force of the pad spring 20a that presses an outer peripheral edge portion of the back plate 15a toward a radially inner side, one circumferential side portion of each of the inner pad 3a and the outer pad 4a can be prevented from being displaced (floated) toward the radially outer side.

Other configurations, operations, and effects are the same as those of the seventh embodiment.

Ninth Embodiment

Figure 34A:
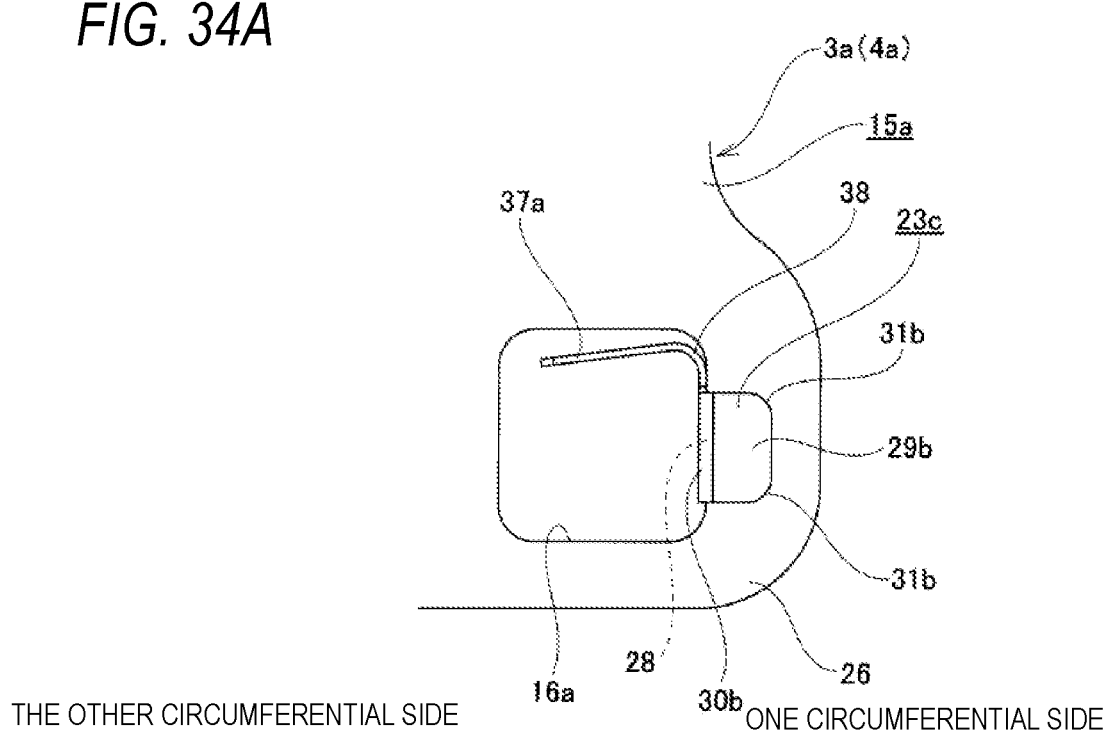
FIGS. 34A and 34B illustrate a ninth embodiment and correspond to FIGS. 15A and 15B.
Figure 34B:
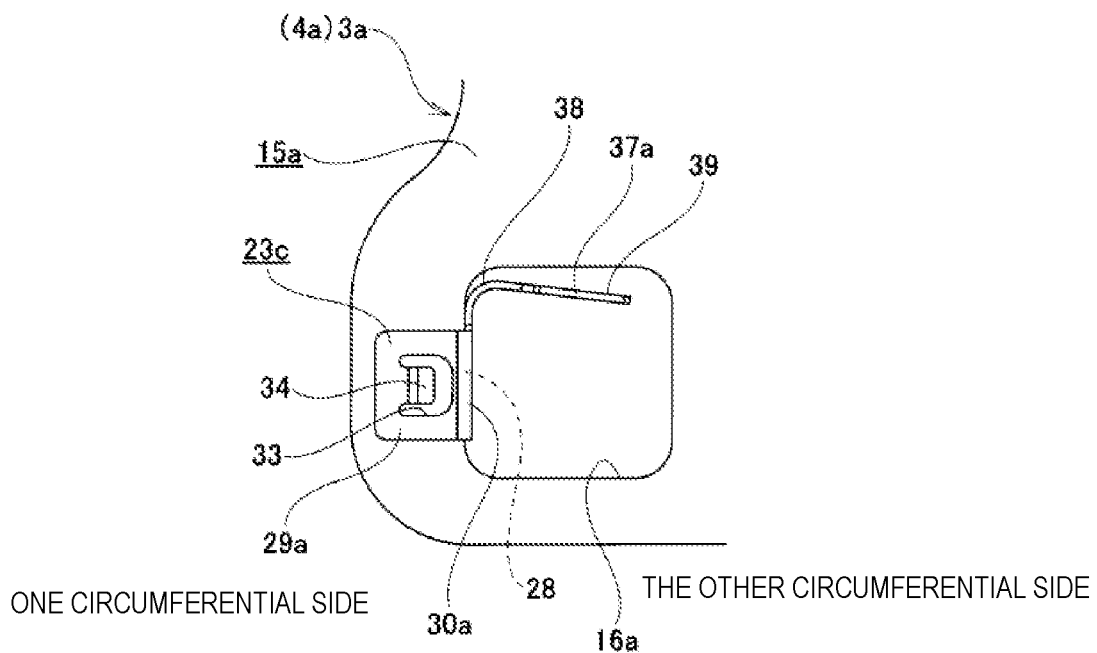
Figure 35A:
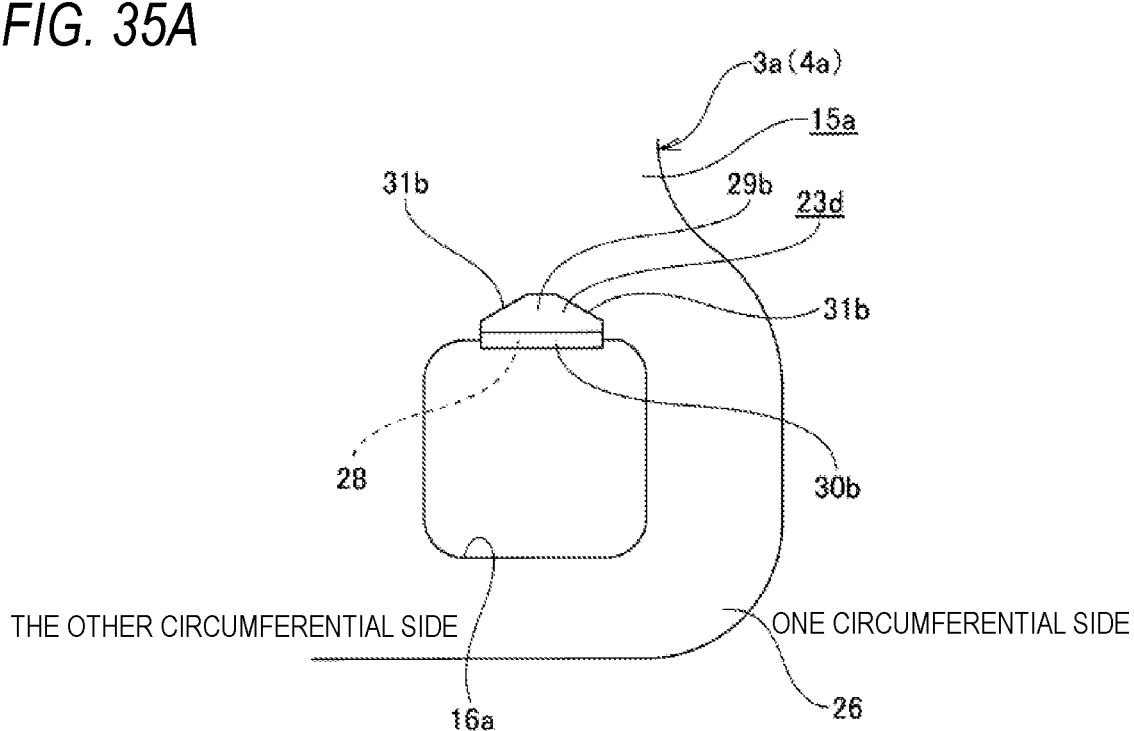
FIGS. 35A and 35B illustrate a tenth embodiment and correspond to FIGS. 15A and 15B.
Figure 35B:
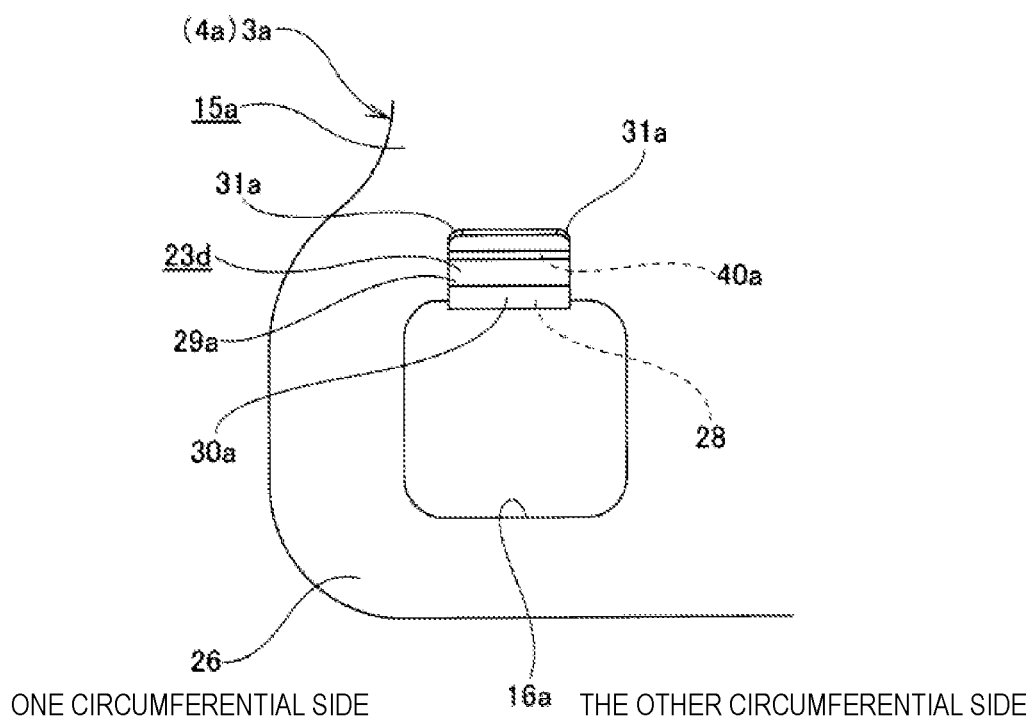
Figure 36B:
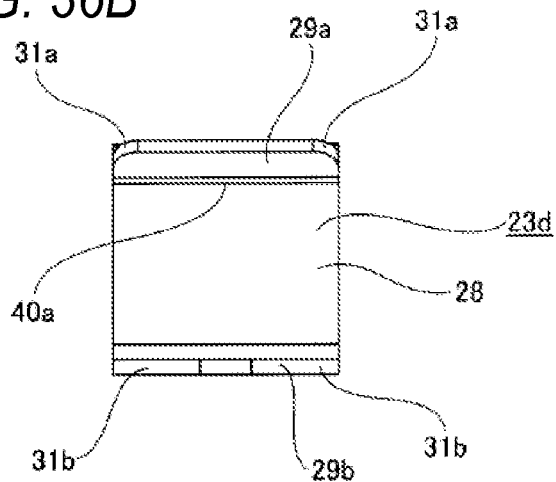
FIGS. 36A to 36D illustrate the tenth embodiment and correspond to FIGS. 20A to 20D.
Figure 36A:
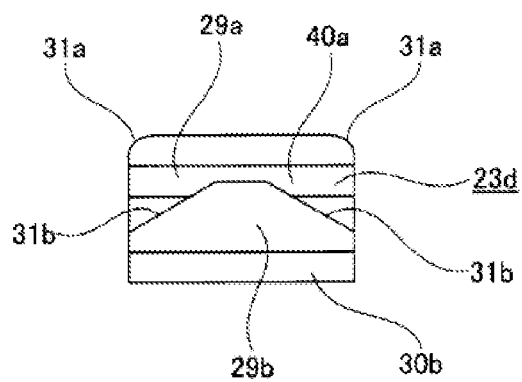
Figure 36D:
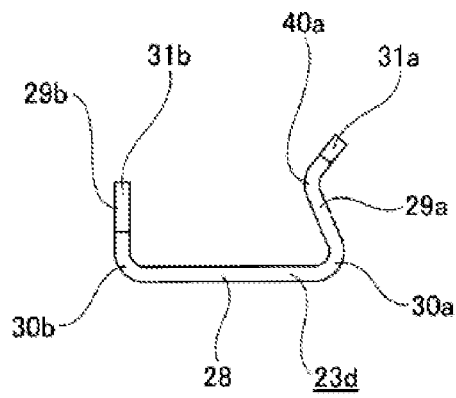
Figure 36C:
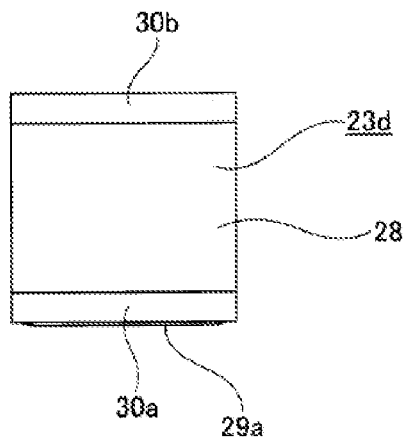
Figure 37A:
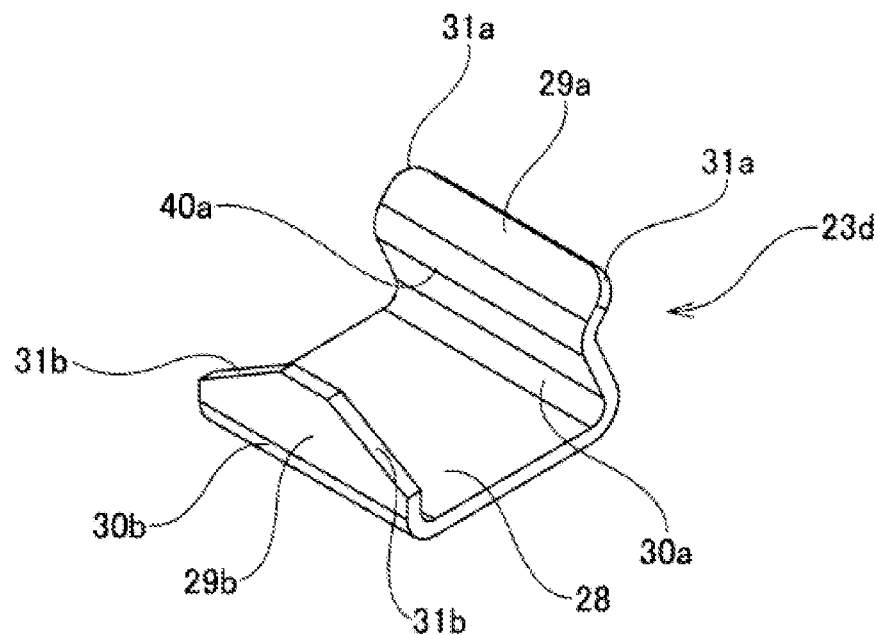
FIGS. 37A and 37B illustrate the tenth embodiment and correspond to FIGS. 21A and 21B.
Figure 37B:
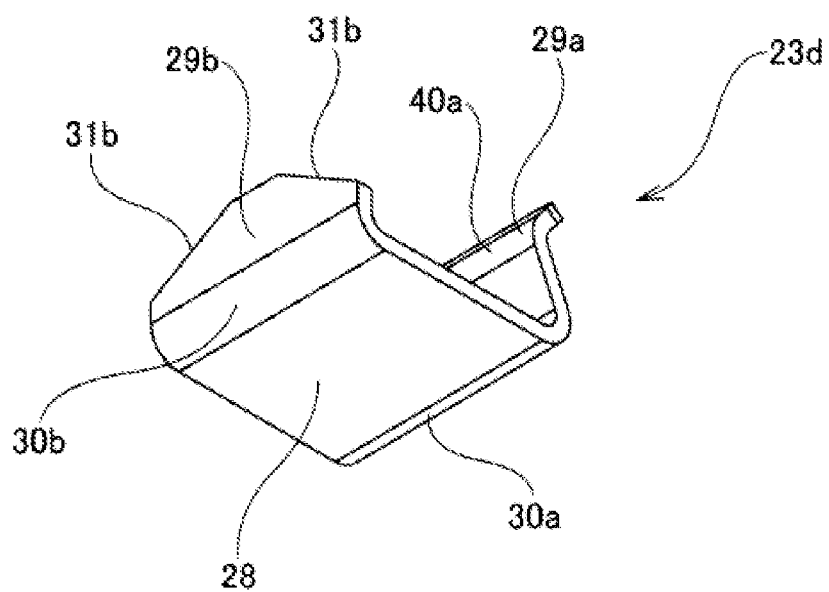
Figure 38B:
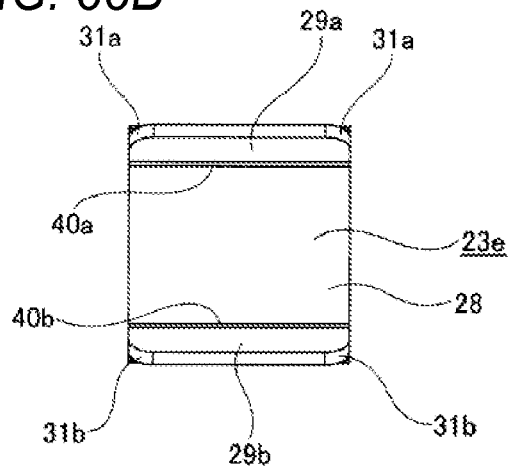
FIGS. 38A to 38D illustrate an eleventh embodiment and correspond to FIGS. 20A to 20D.
Figure 38A:
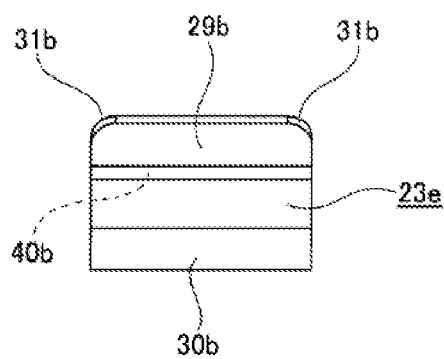
Figure 38D:
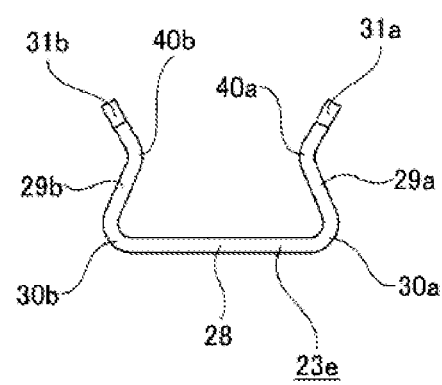
Figure 38C:
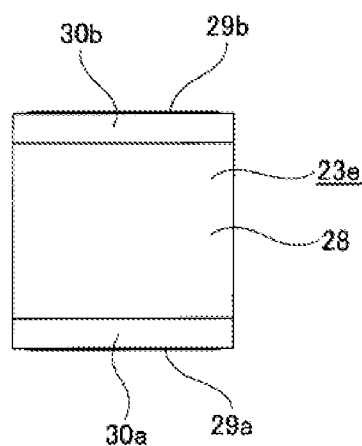
Figure 39A:
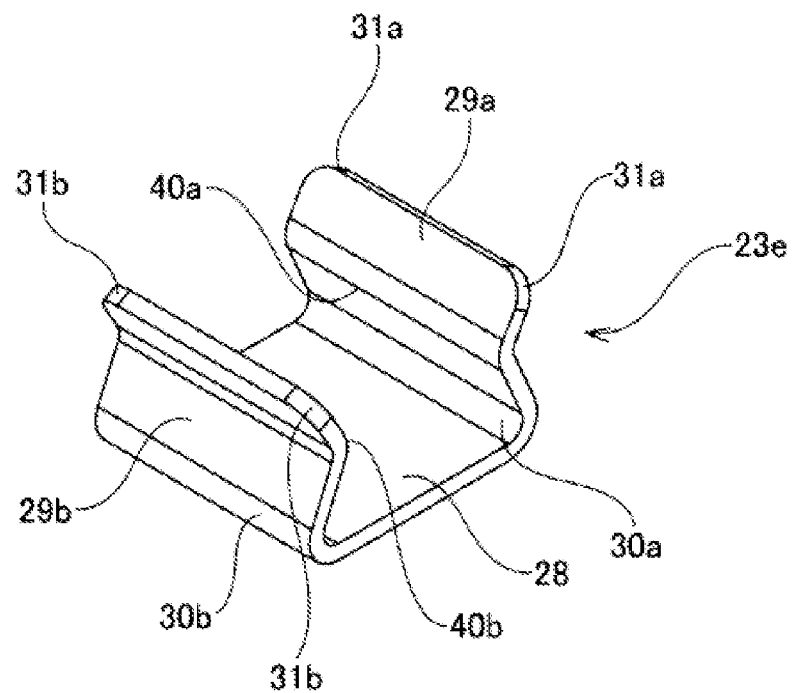
FIGS. 39A and 39B illustrate the eleventh embodiment and correspond to FIGS. 21A and 21B.
Figure 39B:
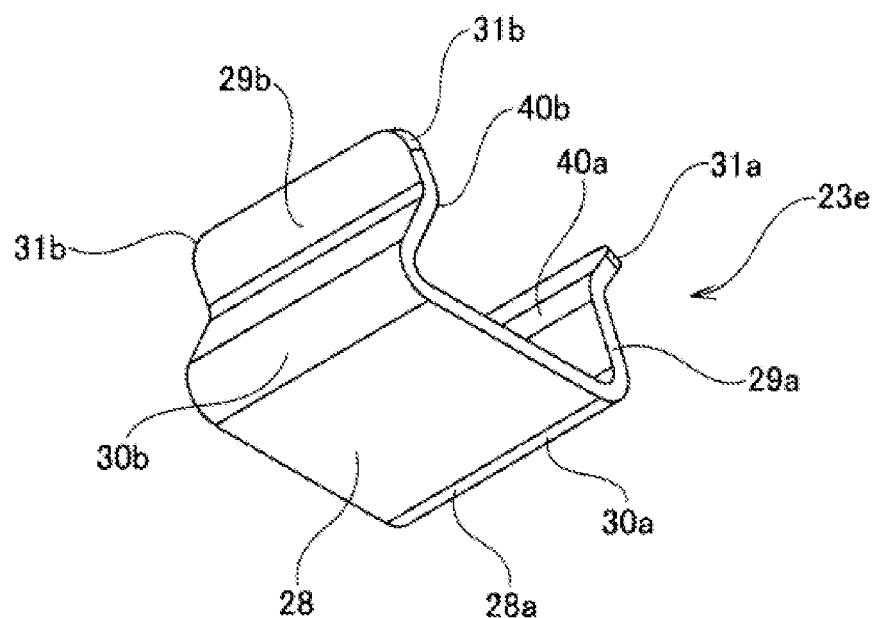

The ninth embodiment will be described with reference to FIGS. 34A and 34B.

In the present embodiment, an attachment position of the pin receiver 23c to the insertion hole 16a provided in the back plate 15a of the inner pad 3a (and the outer pad 4a) is changed from the structures of the seventh embodiment and the eighth embodiment.

In the present embodiment, the pin receiver 23c is attached to an inner side of the insertion hole 16a so that the body plate 28 covers one circumferential side surface of an inner peripheral surface of the insertion hole 16a and the auxiliary plate 37 covers a radially outer side surface of the inner peripheral surface of the insertion hole 16a. The auxiliary plate 37a applies an elastic force directed to a radially inner side to the pin 11a (see FIG. 17 and the like).

In the present embodiment as described above, the auxiliary plate 37a can press the pin 11a toward the radially inner side. For this reason, rattling between the outer peripheral surface of the pin 11a and the inner peripheral surface of the insertion hole 16a can be prevented. That is, one circumferential side portion of each of the inner pad 3a and the outer pad 4a can be prevented from being displaced in a circumferential direction relative to the pin 11a.

Other configurations, operations, and effects are the same as those of the seventh embodiment.

Tenth Embodiment

The tenth embodiment will be described with reference to FIGS. 35A to 37B.

The tenth embodiment is a modification of the first embodiment. A pin receiver 23d according to the present embodiment has such a shape that the bent plate 29a on an axially outer side of the pair of bent plates 29a, 29b is not a flat plate but bent in a substantially V-shape with its radially (extending direction) intermediate portion serving as a top portion 40a. Specifically, a base end-side half portion of the bent plate 29a disposed on the axially outer side is inclined toward an axially inner side as approaching a radially outer side, and a top end-side half portion thereof is inclined toward the axially outer side as approaching the radially outer side.

In the present embodiment, the top portion 40a provided at the radially intermediate portion of the bent plate 29a disposed on the axially outer side functions as a retaining portion. That is, the top portion 40a is engaged with (abutted against) a back surface of the back plate 15a.

In the present embodiment as described above, since the bent plate 29a includes the retaining portion, no punching processing is necessary for a metal plate constituting the pin receiver 23d and bending processing alone is sufficient. For this reason, processing cost can be reduced.

Other configurations, operations, and effects are the same as those of the first embodiment.

Eleventh Embodiment

The eleventh embodiment will be described with reference to FIGS. 38A to 39B.

The eleventh embodiment is a modification of the tenth embodiment. A pin receiver 23e according to the present embodiment has such a shape that each of the pair of bent plates 29a, 29b is not a flat plate but is bent into a substantially V-shape with a radially (extending direction) intermediate portion of the bent plates 29a, 29b serving as a corresponding one of top portions 40a, 40b. That is, the pin receiver 23e according to the present embodiment has a symmetrical shape in a length direction of the body plate 28.

Specifically, a base end-side half portion of the bent plate 29a disposed on an axially outer side is inclined toward an axially inner side as approaching a radially outer side, and a top end-side half portion thereof is inclined toward the axially outer side as approaching a radially outer side. A base end-side half portion of the bent plate 29b disposed on the axially inner side is inclined toward the axially outer side as approaching the radially outer side, and a top end-side half portion thereof is inclined toward the axially inner side as approaching the radially outer side. Therefore, a distance (distance in an axial direction) between the pair of bent plates 29a, 29b is smallest at the top portions 40a, 40b and gradually increases as separating from the top portions 40a, 40b in a radial direction.

In the present embodiment, each of the top portions 40a, 40b provided at a corresponding one of radially intermediate portions of the pair of bent plates 29a, 29b serves as a retaining portion. That is, the top portion 40a provided on the bent plate 29a is engaged with a back surface of the back plate 15a and the top portion 40b provided on the bent plate 29b is engaged with a front surface of the back plate 15a.

In the present embodiment as described above, since each of the bent plates 29a, 29b includes the retaining portion, no punching processing is necessary for a metal plate constituting the pin receiver 23e and bending processing alone is sufficient. For this reason, processing cost can be reduced. Further, since the distance between the pair of bent plates 29a, 29b can be increased at top end portions thereof, the back plate 15a can be easily pushed in between the pair of bent plates 29a, 29b. Since the pin receiver 23e according to the present embodiment has a symmetrical shape in the length direction of the body plate 28, it is not necessary to pay attention to an attachment direction when the pin receiver 23e is attached, which can improve workability.

Other configurations, operations, and effects are the same as those of the first embodiment.

Twelfth Embodiment

Figure 40A:
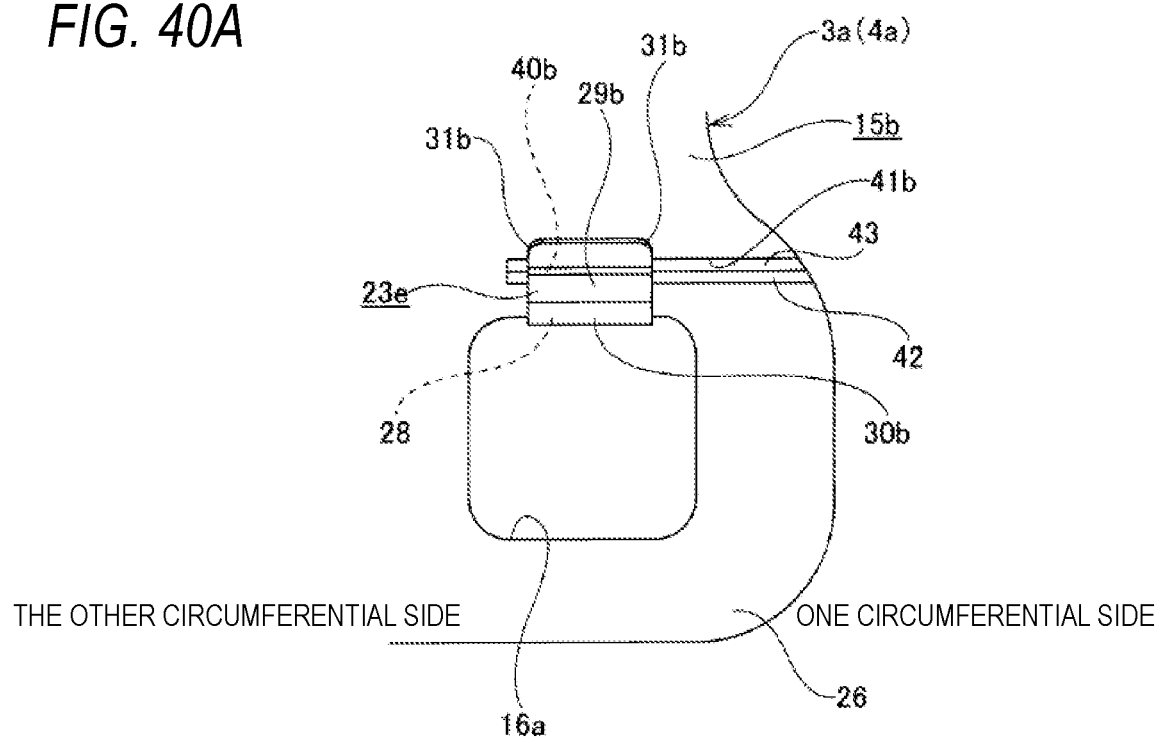
FIGS. 40A and 40B illustrate a twelfth embodiment and correspond to FIGS. 15A and 15B.
Figure 40B:
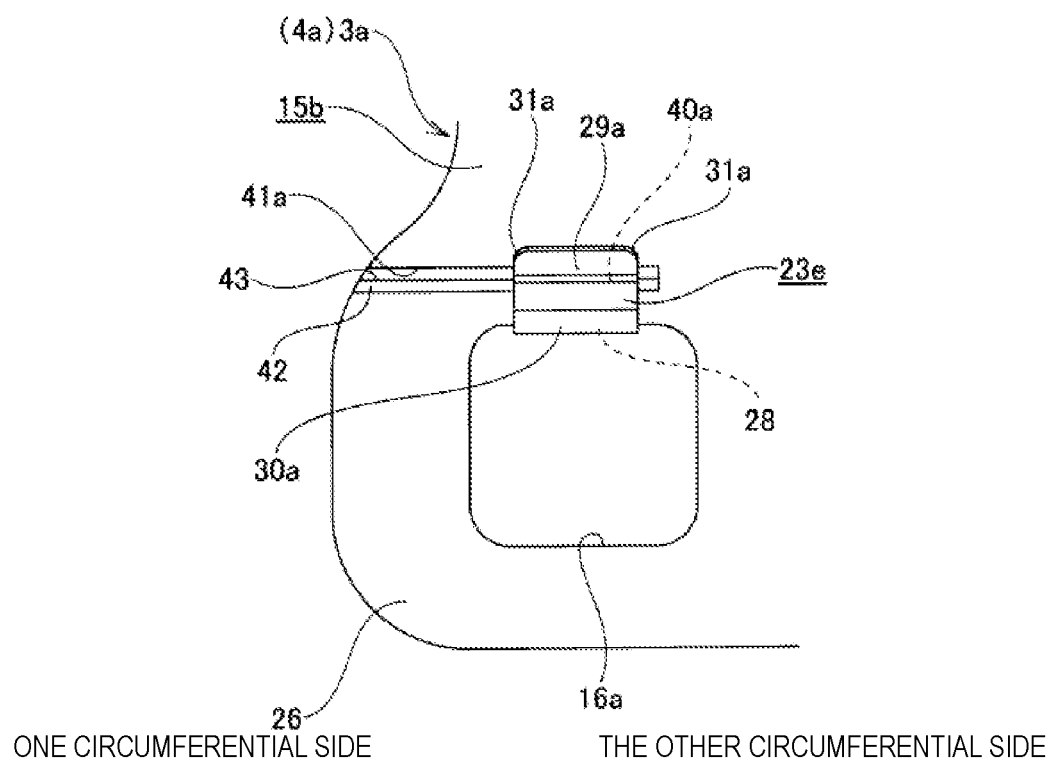
Figure 41:
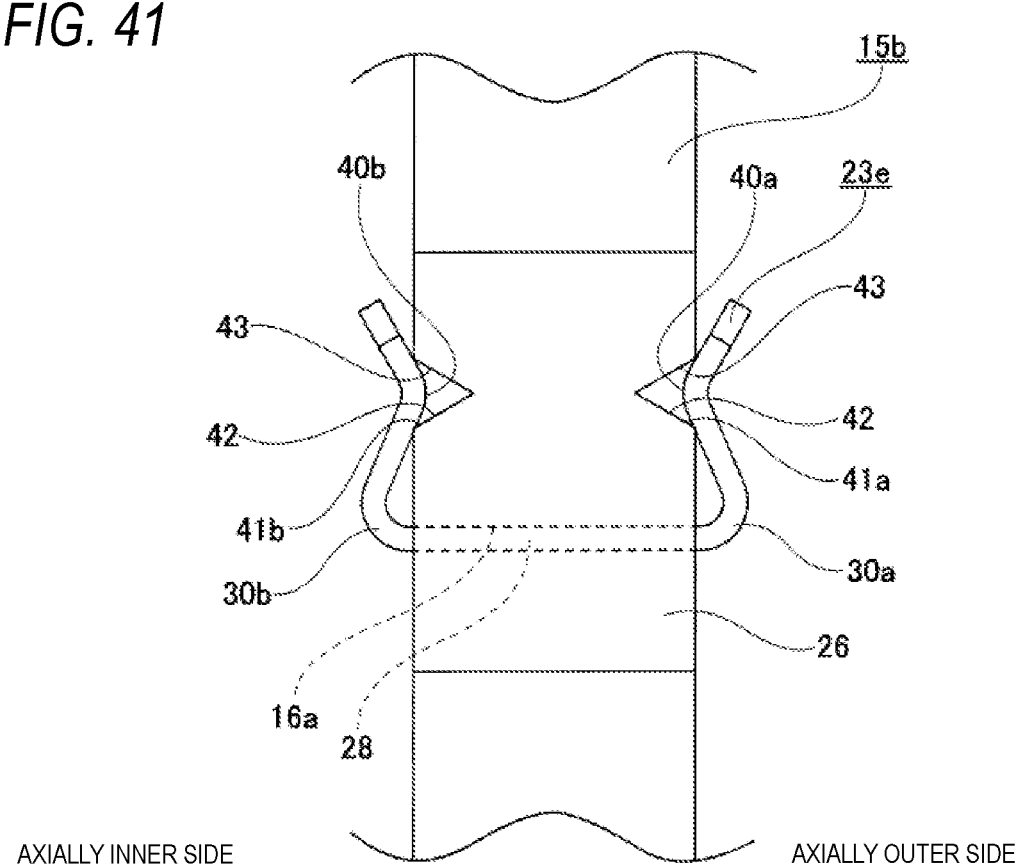
FIG. 41 illustrates the twelfth embodiment and corresponds to FIG. 16.
Figure 42A:
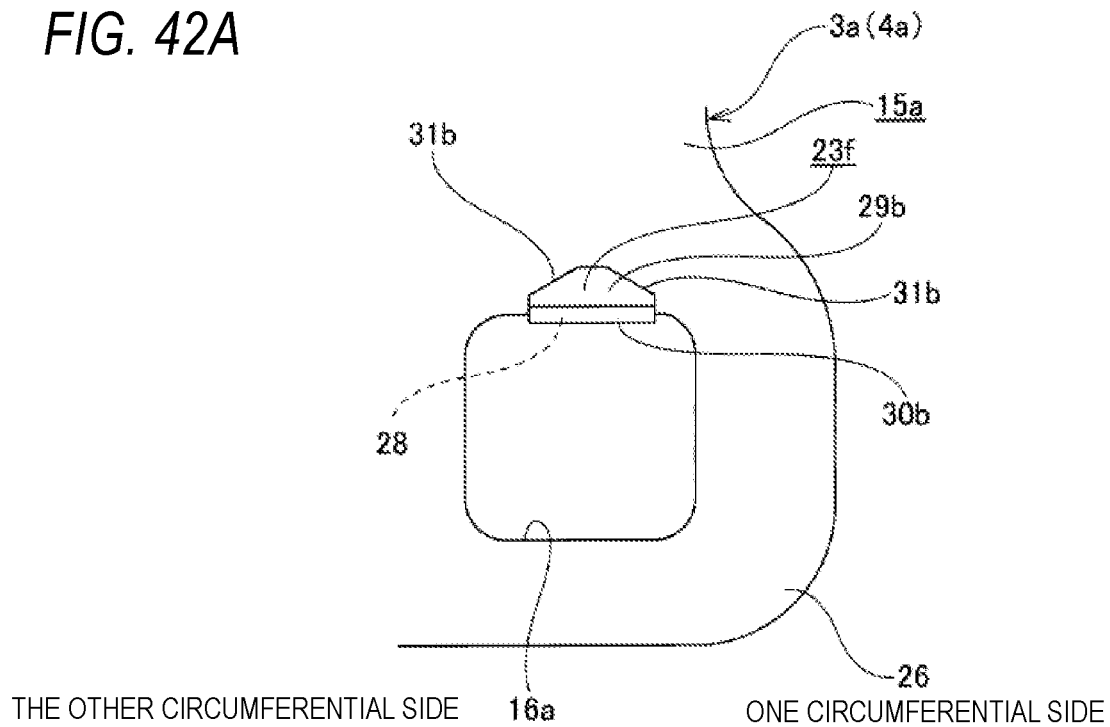
FIGS. 42A and 42B illustrate a thirteenth embodiment and correspond to FIGS. 15A and 15B
Figure 42B:
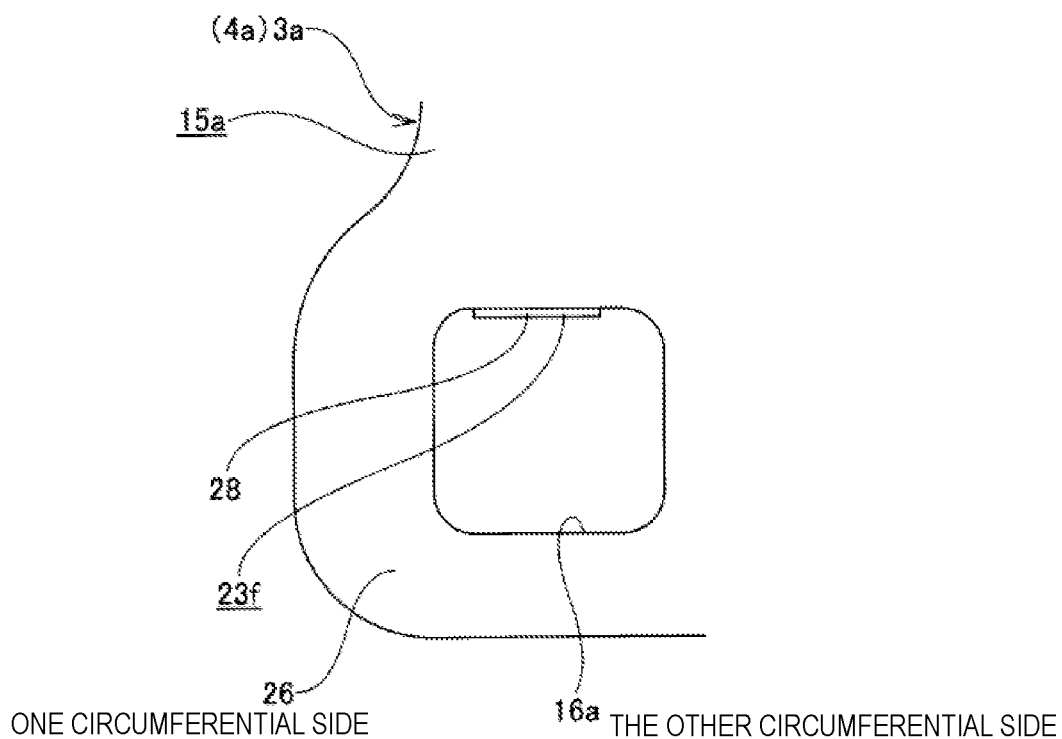
Figure 43:
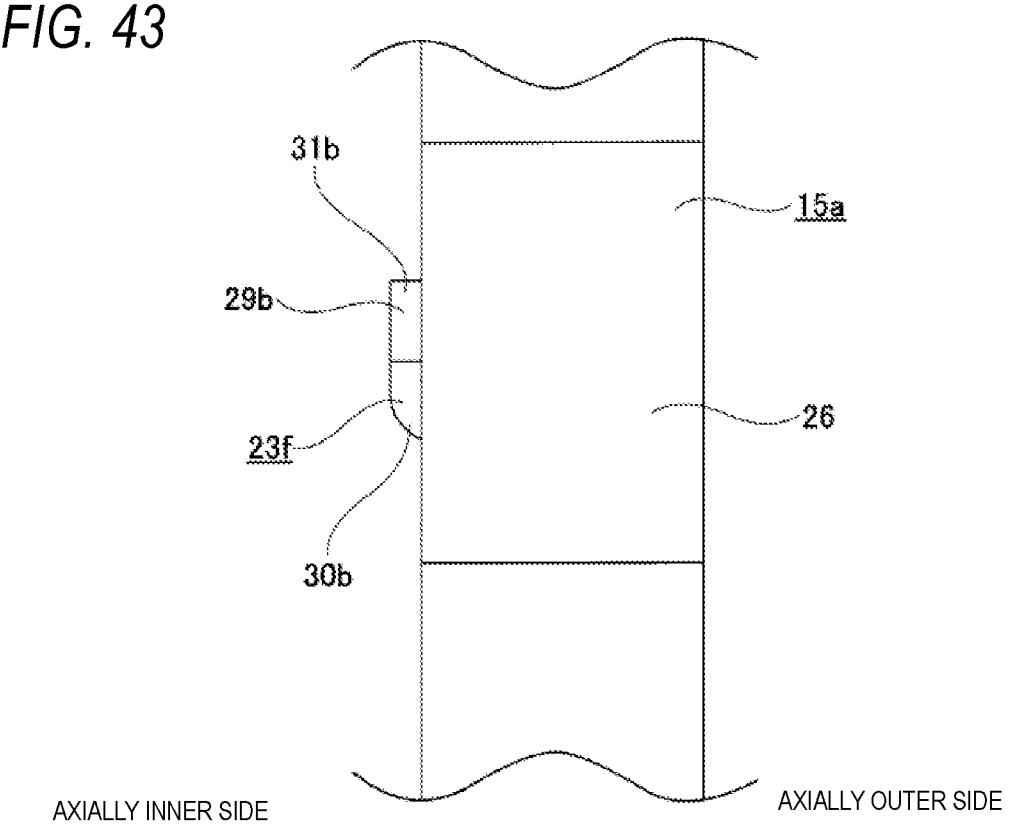
FIG. 43 illustrates the thirteenth embodiment and corresponds to FIG. 16.
Figure 44B:
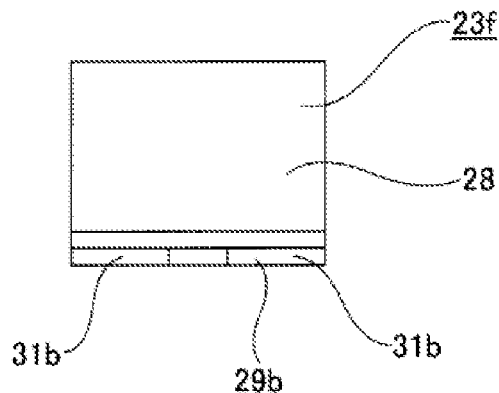
FIGS. 44A to 44D illustrate the thirteenth embodiment and correspond to FIGS. 20A to 20D.
Figure 44A:
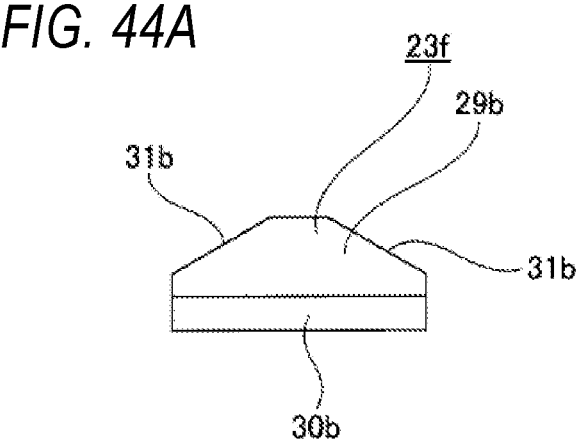
Figure 44D:
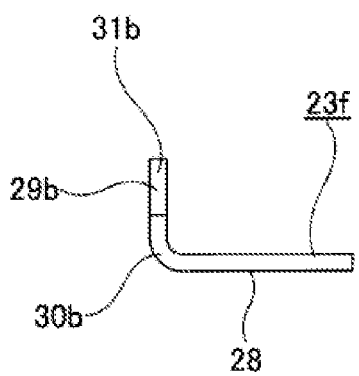
Figure 44C:
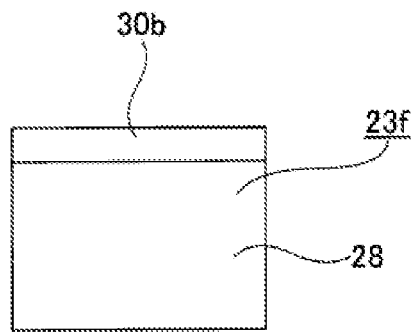
Figure 45A:
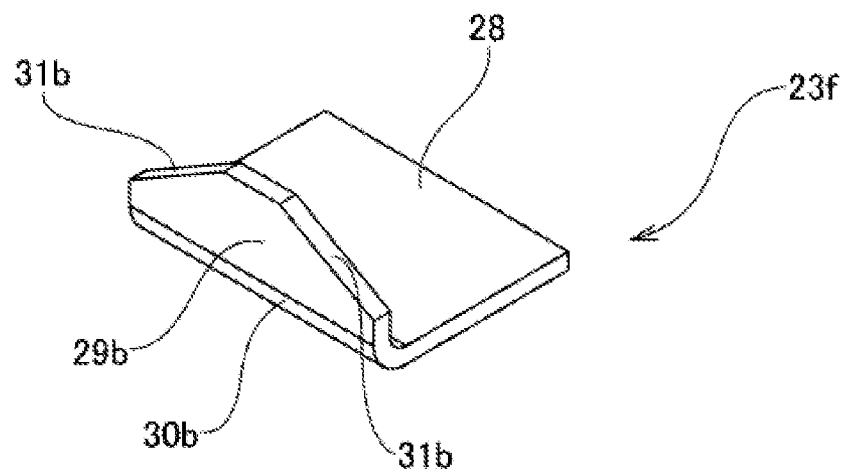
FIGS. 45A and 45B illustrate the thirteenth embodiment and correspond to FIGS. 21A and 21B.
Figure 45B:
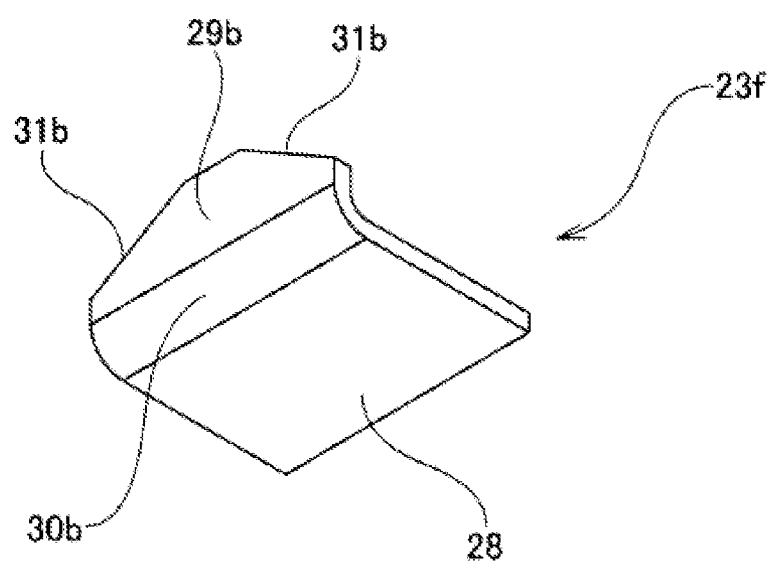
Figure 46A:
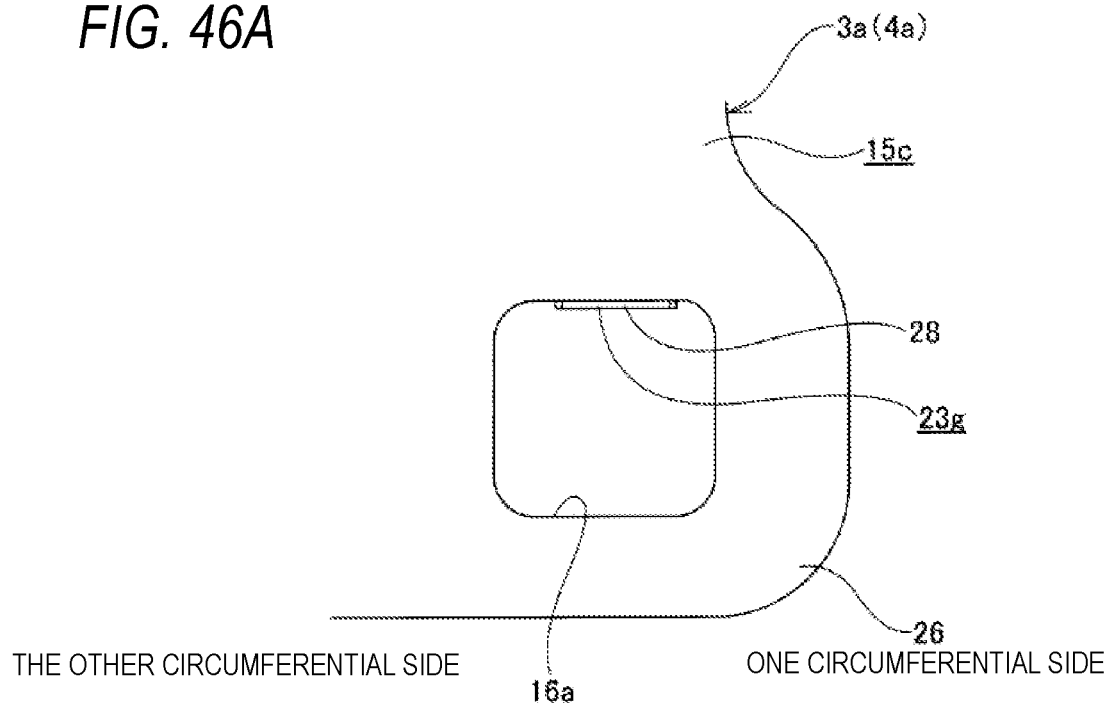
FIGS. 46A and 46B illustrate a fourteenth embodiment and correspond to FIGS. 15A and 15B.
Figure 46B:
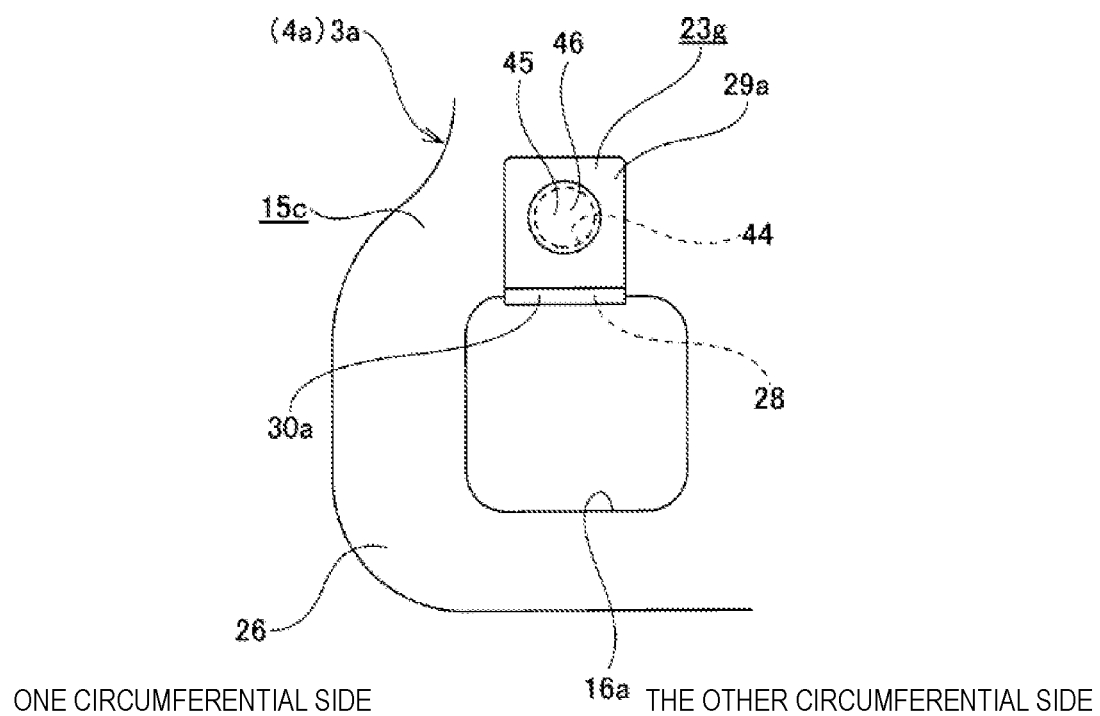
Figure 47:
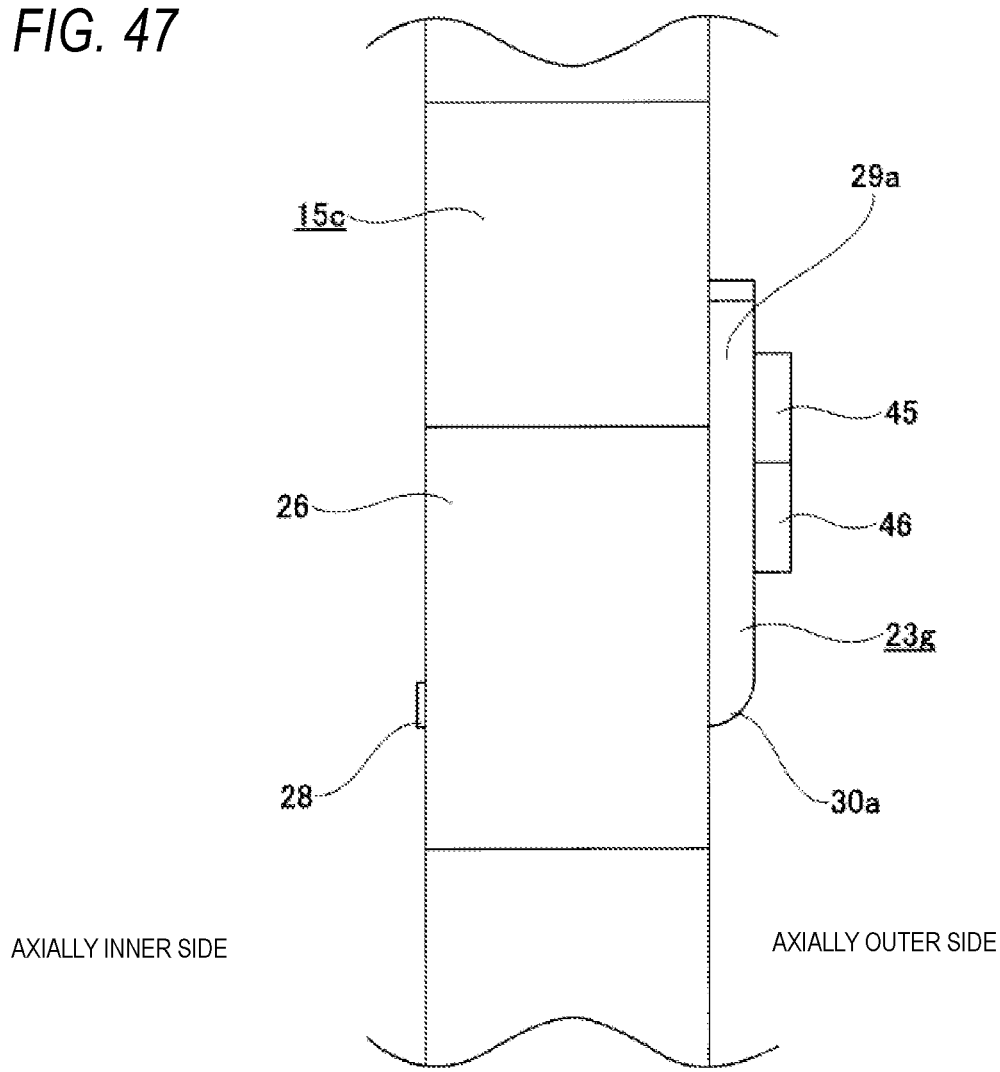
FIG. 47 illustrates the fourteenth embodiment and corresponds to FIG. 16.
Figure 48B:
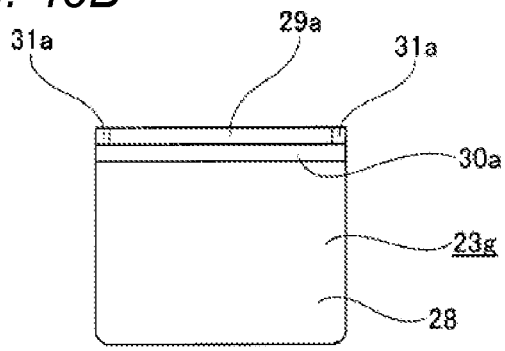
FIGS. 48A to 48D illustrate the fourteenth embodiment and correspond to FIGS. 20A to 20D.
Figure 48A:
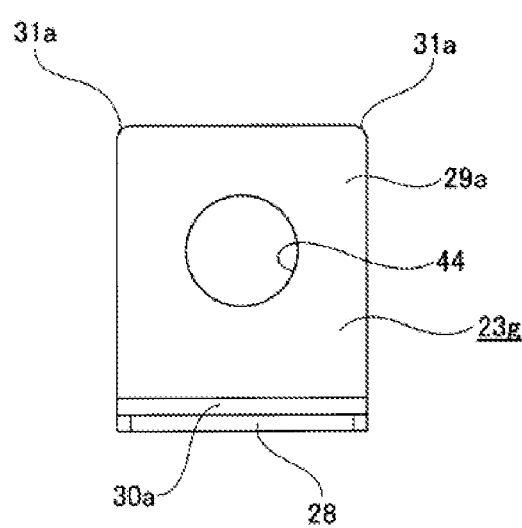
Figure 48D:
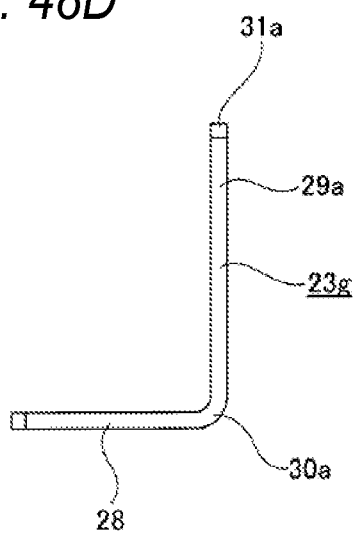
Figure 48C:
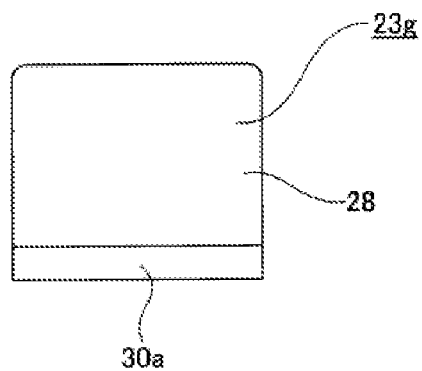
Figure 49A:
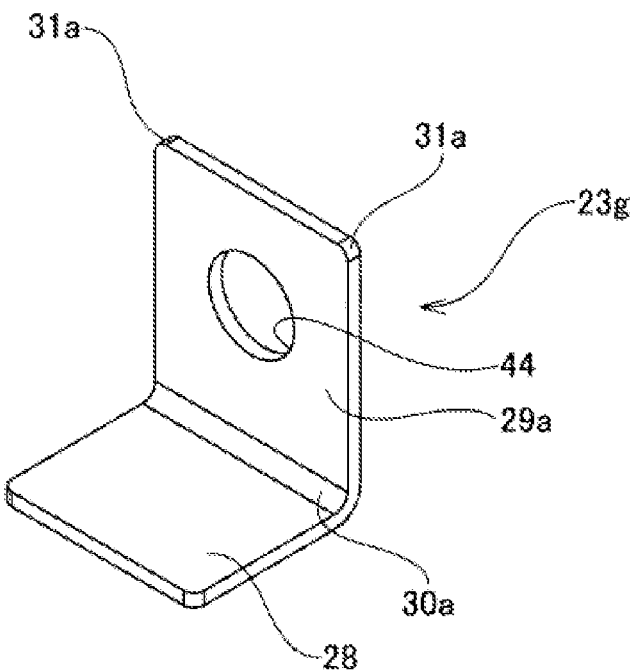
FIGS. 49A and 49B illustrate the fourteenth embodiment and correspond to FIGS. 21A and 21B.
Figure 49B:
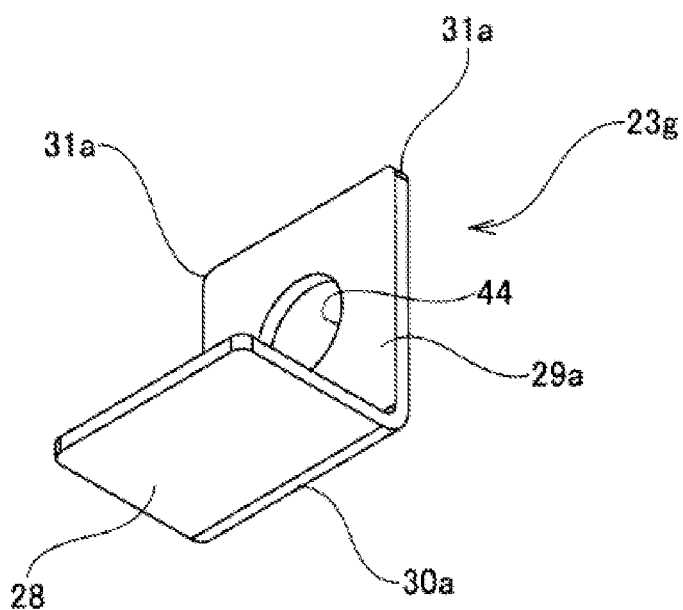
Figure 50:
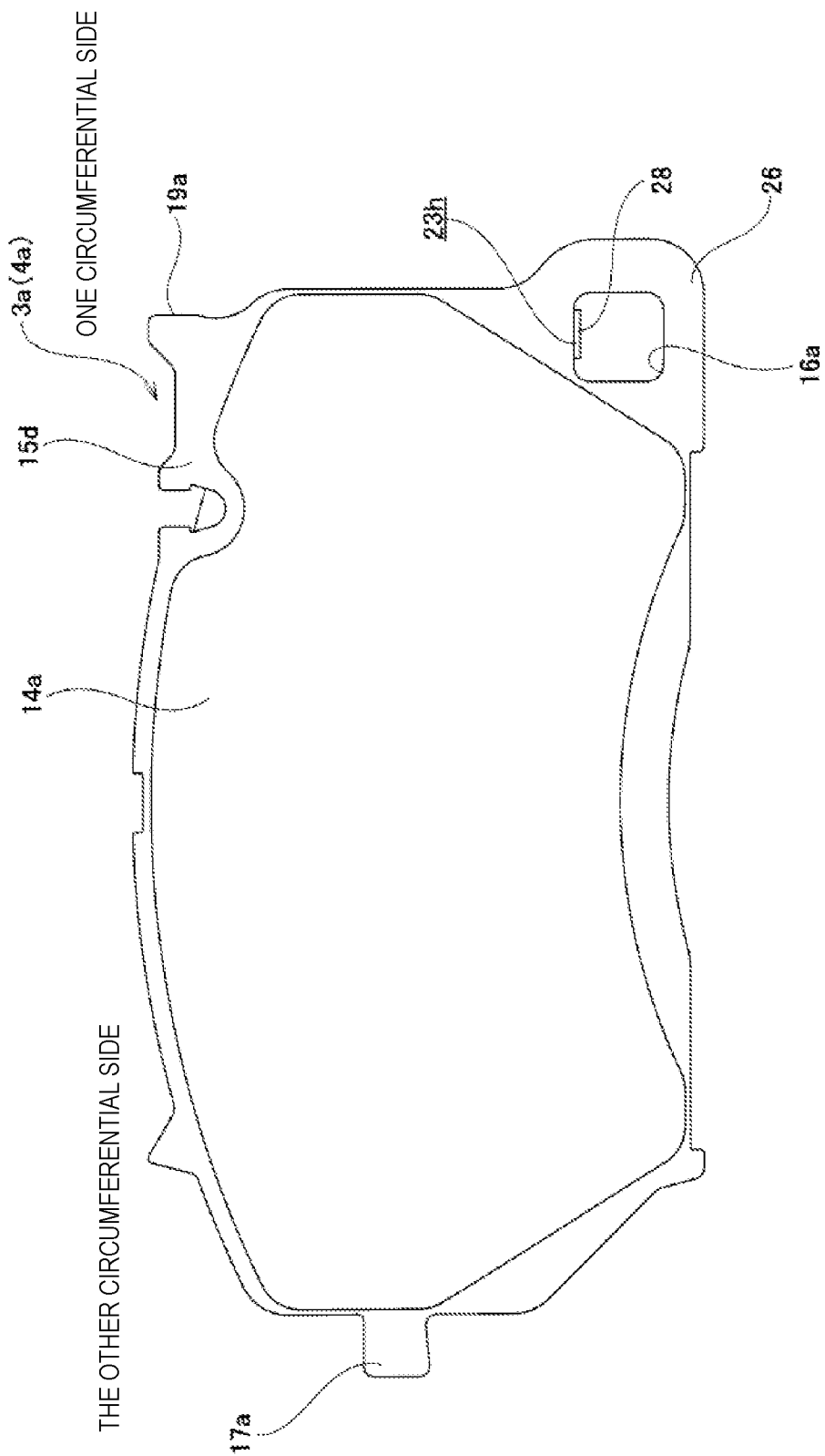
FIG. 50 illustrates a fifteenth embodiment and corresponds to FIG. 11.
Figure 51:
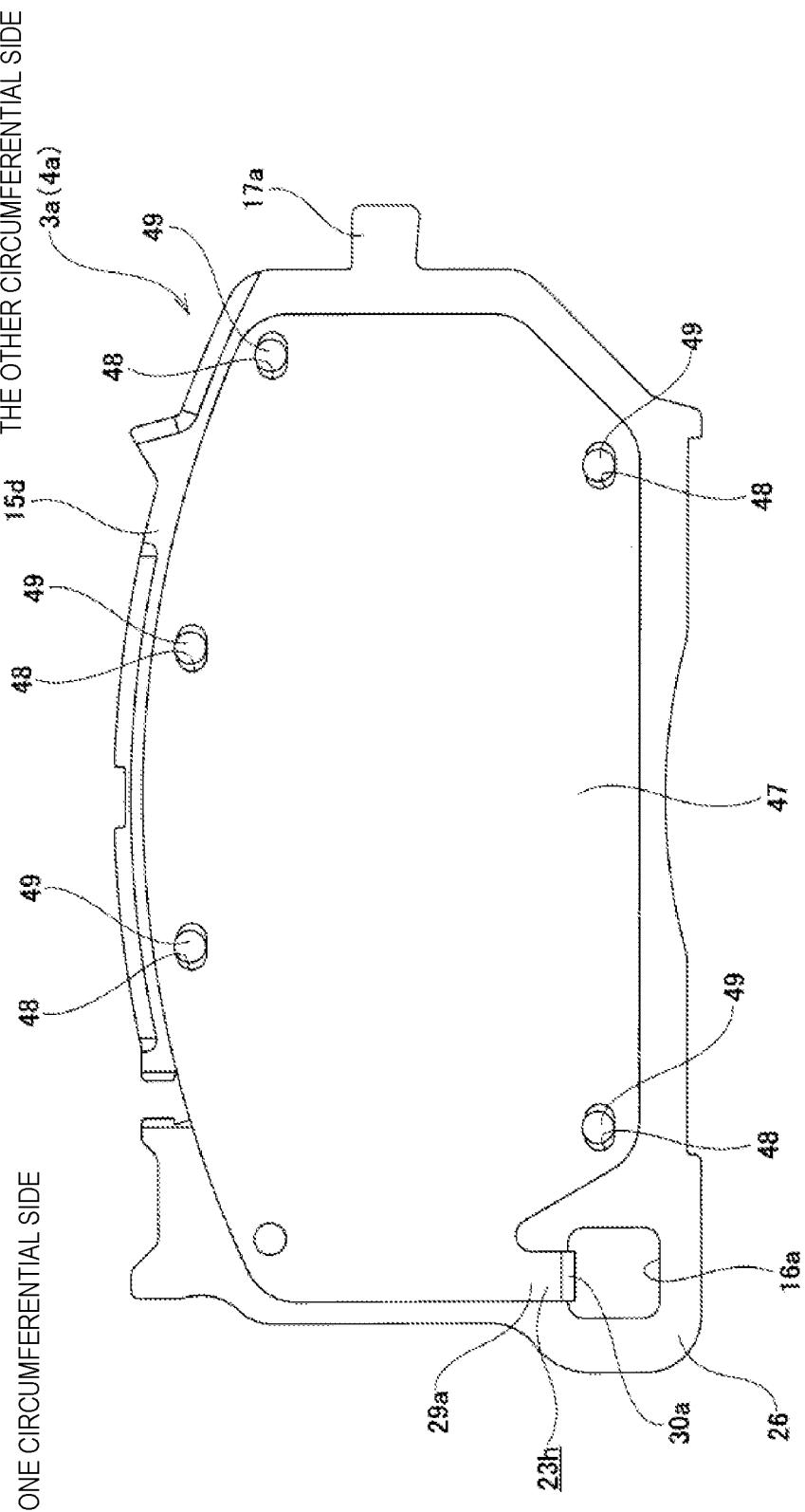
FIG. 51 illustrates the fifteenth embodiment and corresponds to FIG. 12.
Figure 52:
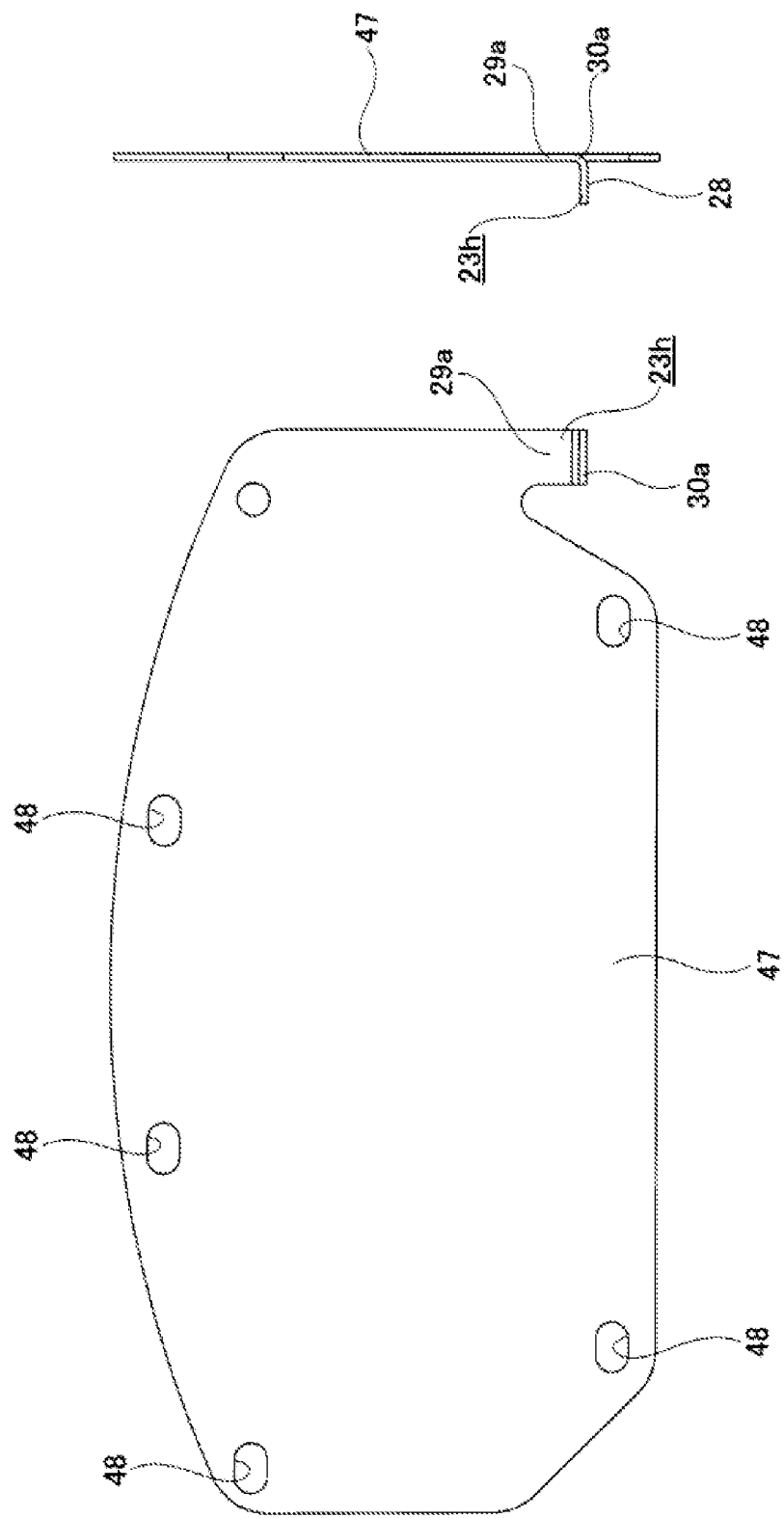

The twelfth embodiment will be described with reference to FIGS. 40A to 41.

The twelfth embodiment is a modification of the eleventh embodiment. In the present embodiment, a shape of a back plate 15b to which the pin receiver 23e is attached is devised.

The back plate 15b includes linear engagement concave portions (grooves) 41a, 41b respectively on a front surface and a back surface thereof. The linear engagement concave portions 41a, 41b extend in a circumferential direction in vicinity of a radially outer side of the insertion hole 16a. Each of the engagement concave portions 41a, 41b has a substantially triangular cross-sectional shape. Each of the engagement concave portions 41a, 41b includes a first inclined surface portion 42 disposed on a radially inner side and a second inclined surface portion 43 disposed on a radially outer side. The first inclined surface portion 42 and the second inclined surface portion 43 are provided on a bottom surface of each of the engagement concave portions 41a, 41b.

The first inclined surface portion 42 is inclined to separate (to the radially outer side) from the body plate 28 in a radial direction (extending direction of the bent plates 29a, 29b) as approaching a corresponding one of deep sides of the engagement concave portions 41a, 41b in a thickness direction of the back plate 15b. The second inclined surface portion 43 is inclined to approach (to the radially inner side) the body plate 28 in the radial direction (extending direction of the bent plates 29a, 29b) as approaching a corresponding one of the deep sides of the engagement concave portions 41a, 41b in the thickness direction of the back plate 15b. For this reason, the bottom surface of each of the engagement concave portions 41a, 41b is bent into a V-shape.

When the back plate 15b is held by the pair of bent plates 29a, 29b, the top portions 40a, 40b serving as retaining portions provided on the bent plates 29a, 29b respectively engage with the engaging concave portions 41a, 41b. Specifically, each of the top portions 40a, 40b enters a respective one of the engagement concave portions 41a, 41b and engages at least with the first inclined surface portion 42. For this reason, a force directed to the radially outer side by the engagement with the first inclined surface portion 42 acts on the top portions 40a, 40b (bent plates 29a, 29b). In the present embodiment, such a force presses the body plate 28 against a radially outer surface of an inner peripheral surface of the insertion hole 16a.

In the present embodiment as described above, since the force directed to the radially outer side by the engagement between the top portions 40a, 40b serving as the retaining portions and the engagement concave portions 41a, 41b acts on the pin receiver 23e, the pin receiver 23e can be more effectively prevented from coming off from the back plate 15b (moving toward the radially inner side).

Other configurations, operations, and effects are the same as those of the eleventh embodiment.

Thirteenth Embodiment

The thirteenth embodiment will be described with reference to FIGS. 42A to 45B.

A pin receiver 23f according to the present embodiment includes the body plate 28, the bent plate 29b, and the curved portion 30b. The bent plate 29b is provided at an axially inner end portion of the body plate 28.

In the present embodiment, the pin receiver 23f is adhesively fixed to the back plate 15a using an adhesive material. Specifically, the body plate 28 is adhesively fixed to a radially outer surface of an inner peripheral surface of the insertion hole 16a.

In the present embodiment as described above, a size and weight of the pin receiver 23f can be reduced since the pin receiver 23f includes the body plate 28, the bent plate 29b, and the curved portion 30b. Since the pin receiver 23f is adhesively fixed to the back plate 15a, no large force is required when the pin receiver 23f is fixed. In the present embodiment, the bent plate 29b is provided only at the axially inner end portion of the body plate 28. Therefore, a force that acts on the pin receiver 23f (the body plate 28) during braking by sliding contact with the pin 11a (see FIG. 17 and the like) can be borne by the engagement between the bent plate 29b and a front surface of the back plate 15a. Therefore, the pin receiver 23f can be effectively prevented from coming off from the back plate 15a. Further, by abutting the bent plate 29b against the front surface of the back plate 15a, it is also possible to position the pin receiver 23f on the back plate 15a in an axial direction.

Other operations and effects are the same as those of the first embodiment.

Fourteenth Embodiment

The fourteenth embodiment will be described with reference to FIGS. 46A to 49B.

The fourteenth embodiment is a modification of the first embodiment. A pin receiver 23g according to the present embodiment includes the body plate 28, the bent plate 29a, and the curved portion 30a. The bent plate 29a is provided at an axially outer end portion of the body plate 28 and includes a retaining portion. In the present embodiment, the retaining portion is constituted by an engagement hole 44 that passes through the bent plate 29a in a thickness direction (axial direction).

A back plate 15c of each of the inner pad 3a and the outer pad 4a includes a columnar engagement convex portion 45 on a back surface thereof. The engagement convex portion 45 protrudes toward an axially outer side in vicinity of a radially outer side of the insertion hole 16a. An outer diameter of the engagement convex portion 45 is equal to or slightly smaller than an inner diameter of the engagement hole 44.

In the present embodiment, the engagement convex portion 45 is fitted into (inserted into) the engagement hole 44. A top end portion of the engagement convex portion 45 is crimped (plastically deformed) to the engagement hole 44, to form a crimped portion 46 at the top end portion of the engagement convex portion 45.

In the present embodiment as described above, the pin receiver 23g can be more effectively prevented from coming off (moving toward a radially inner side) from the back plate 15c. When the present disclosure is carried out, the crimped portion 46 can be omitted from the top end portion of the engagement convex portion 45, that is, a structure can be adopted in which the engagement convex portion 45 is only fitted on an inner side of the engagement hole 44.

Other configurations, operations, and effects are the same as those of the first embodiment.

Fifteenth Embodiment

The fifteenth embodiment will be described with reference to FIGS. 50 to 52B.

Similar to the pin receiver 23g according to the fourteenth embodiment, a pin receiver 23h according to the present embodiment includes the body plate 28, the bent plate 29a, and the curved portion 30a. In particular, in the pin receiver 23h according to the present embodiment, the bent plate 29a disposed on an axially outer side integrally includes a shim plate 47 that is superposed on a back surface of a back plate 15d.

The shim plate 47 is formed in a flat plate shape and is sandwiched between the back surface of the back plate 15d and an inner piston (or outer piston) during braking. The shim plate 47 has a function of preventing brake noise generated by vibration of the inner pad 3a (outer pad 4a) during braking and preventing uneven wear of the friction member 14a.

The shim plate 47 has elongated holes 48 extending in a circumferential direction at a plurality of positions of its outer peripheral portion. Each of protrusions 49 erected on the back surface of the back plate 15d is engaged with a corresponding one of the elongated holes 48 to be relatively displaceable in the circumferential direction and not relatively displaceable in an axial direction. For this reason, the shim plate 47 is supported not to come off in the axial direction from the back surface of the back plate 15d. In the present embodiment, since the shim plate 47 is integrally provided with the bent plate 29a, the pin receiver 23h is not fixed to the back plate 15d by a fixing unit such as an adhesive material or a crimping method.

In the present embodiment as described above, since the pin receiver 23h can be fixed to the back plate 15d using the shim plate 47 integrally provided with the bent plate 29a, the number of components can be reduced and the number of man-hours required for the fixing operation can be reduced as compared with a case in which the shim plate is provided separated from the pin receiver.

Other configurations, operations, and effects are the same as those of the first embodiment.

Sixteenth Embodiment

Figure 53:
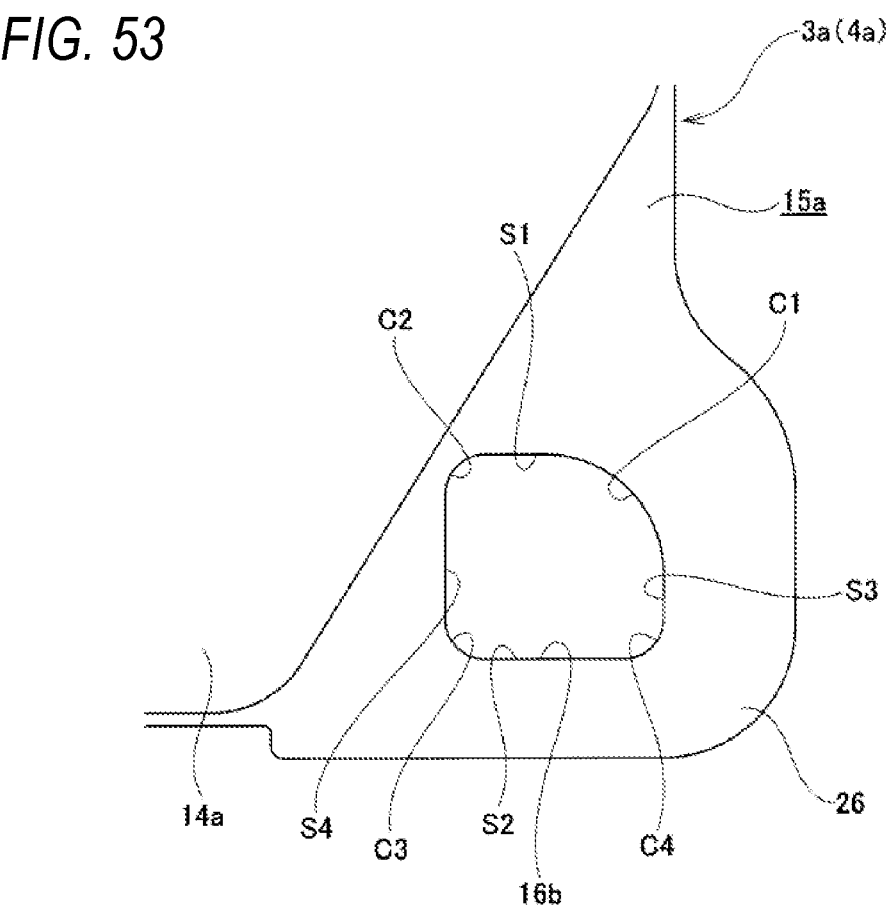
FIG. 53 illustrates a sixteenth embodiment and is an enlarged view of a part of an inner pad.

The sixteenth embodiment will be described with reference to FIG. 53.

In the present embodiment, a shape of an insertion hole 16b provided in the back plate 15a of each of the inner pad 3a and the outer pad 4a is different from that of the first to the fifteenth embodiments.

In the present embodiment, an inner peripheral surface of the insertion hole 16b is also constituted by four flat side surfaces S1 to S4 (radially outer side surface S1, radially inner side surface S2, one circumferential side surface S3, the other circumferential side surface S4) and four corner portions C1 to C4 that are concave curved surfaces. Particularly, in the present embodiment, a radius of curvature of the corner portion C1 on a radially outer side and one circumferential side is sufficiently larger than radii of curvature of the other corner portions C2 to C4 and is also larger than a radius of curvature of the pin 11a (see FIG. 17 and the like) inserted into the insertion hole 16b. When the corner portion C1 of the inner peripheral surface of the insertion hole 16b is covered by a body plate of a pin receiver, the body plate is formed in a partial cylindrical shape instead of a flat plate shape.

In the present embodiment, a contact area between an outer peripheral surface of the pin 11a and the inner peripheral surface of the insertion hole 16b can be increased. For this reason, abnormal sound can be prevented.

Other configurations, operations, and effects are the same as those of the first embodiment.

Seventeenth Embodiment

Figure 54:
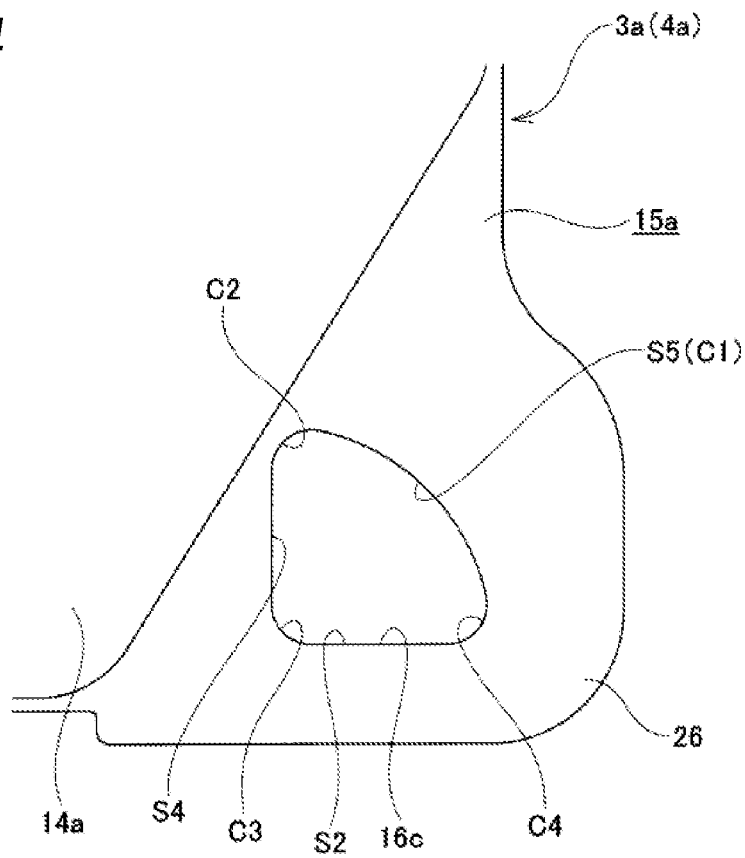
FIG. 54 illustrates a seventeenth embodiment and corresponds to FIG. 53.

The seventeenth embodiment will be described with reference to FIG. 54.

In the present embodiment, a shape of an insertion hole 16c provided in the back plate 15a of each of the inner pad 3a and the outer pad 4a is different from that of the first to the sixteenth embodiments.

In the present embodiment, a radius of curvature of the corner portion C1 constituting the insertion hole 16b according to the sixteenth embodiment is further increased (two side surfaces S1, S3 are omitted) so that the insertion hole 16c is formed in a substantially triangular shape (fan shape) or a substantially ¼ circular shape when viewed in an axial direction. An inner peripheral surface of the insertion hole 16c includes two side surfaces S2, S4 (radially inner side surface S2, the other circumferential side surface S4), each of which is a flat surface, and three corner portions C2 to C4, each of which is a concave curved surface. When a side surface S5 of the inner peripheral surface of the insertion hole 16c is covered by a body plate of a pin receiver, the body plate is formed in a partial cylindrical shape instead of a flat plate shape.

Also in the present embodiment as described above, a contact area between an outer peripheral surface of the pin 11a and the inner peripheral surface of the insertion hole 16c can be increased. For this reason, abnormal sound can be prevented. Further, a gap between the outer peripheral surface of the pin 11a and the inner peripheral surface of the insertion hole 16c can be reduced. Accordingly, rattling of the inner pad 3a and the outer pad 4a can be prevented.

Other configurations, operations, and effects are the same as those of the first embodiment.

Eighteenth Embodiment

Figure 55:
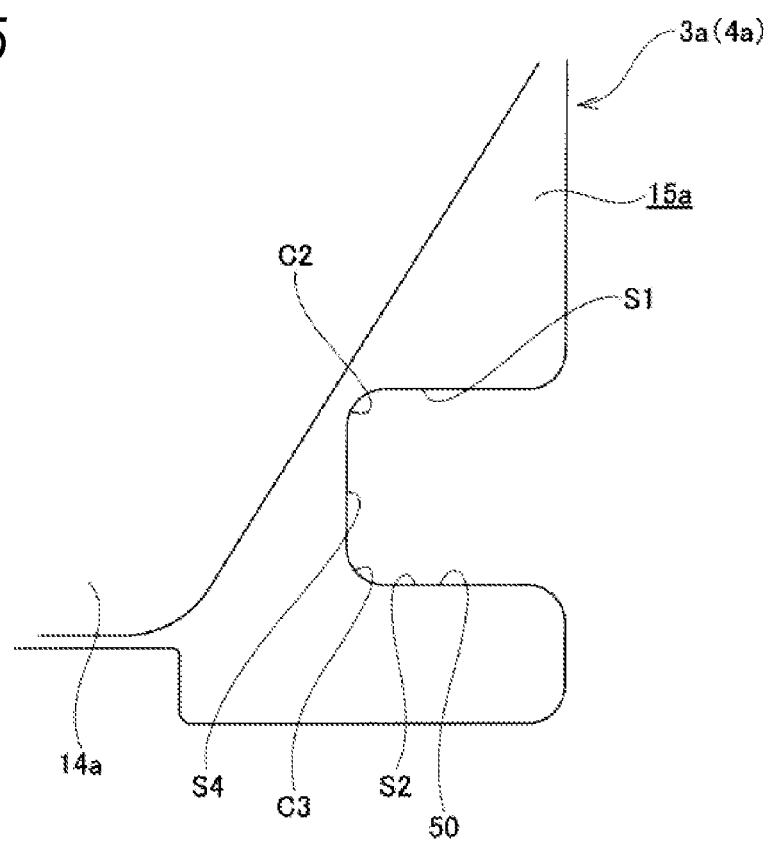
FIG. 55 illustrates an eighteenth embodiment and corresponds to FIG. 53.

The eighteenth embodiment will be described with reference to FIG. 55.

In the present embodiment, a pin insertion portion provided in the back plate 15a of the inner pad 3a (and the outer pad 4a) is not an insertion hole that opens only on two sides of the back plate 15a in an axial direction, but is constituted by a notch 50 that further opens on one circumferential side.

The notch 50 is formed in a substantially rectangular shape when viewed in the axial direction. An inner peripheral surface of the notch 50 includes three side surfaces S1, S2, S4 (radially outer side surface S1, radially inner side surface S2, the other circumferential side surface S4), each of which is a flat surface, and two corner portions C2, C3, each of which is a concave curved surface. In the structure of the present embodiment, a brake tangential force directed to the other circumferential side (left side and rotation-out side in FIG. 55) acts on the inner pad 3a (outer pad 4a) during forward braking, and is borne by abutment between the other circumferential side surface of the back plate 15a and the guide wall 13a (see FIG. 9 and the like).

In the present embodiment as described above, since the pin insertion portion is the notch 50 instead of an insertion hole, processing cost of the pin insertion portion can be reduced and the weight of the inner pad 3a (and the outer pad 4a) can be reduced.

Other configurations, operations, and effects are the same as those of the first embodiment.

Nineteenth Embodiment

Figure 56:
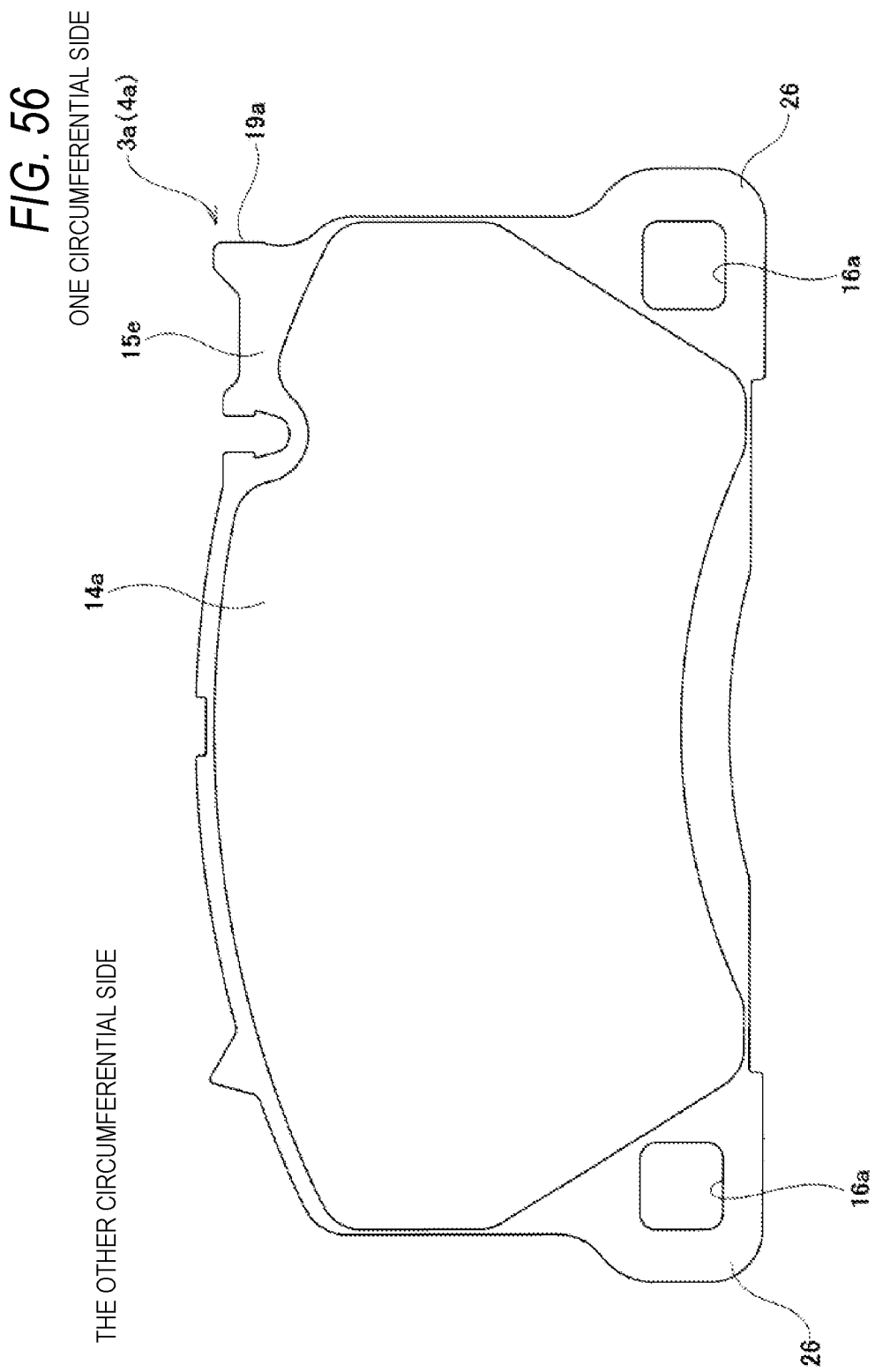
FIG. 56 illustrates a nineteenth embodiment and corresponds to FIG. 10.
Figure 59A:
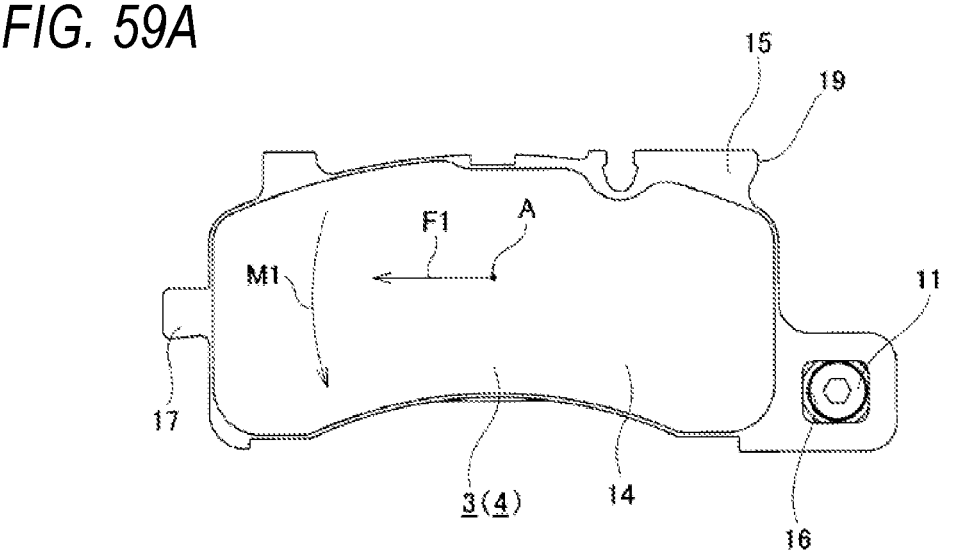
Figure 59B:
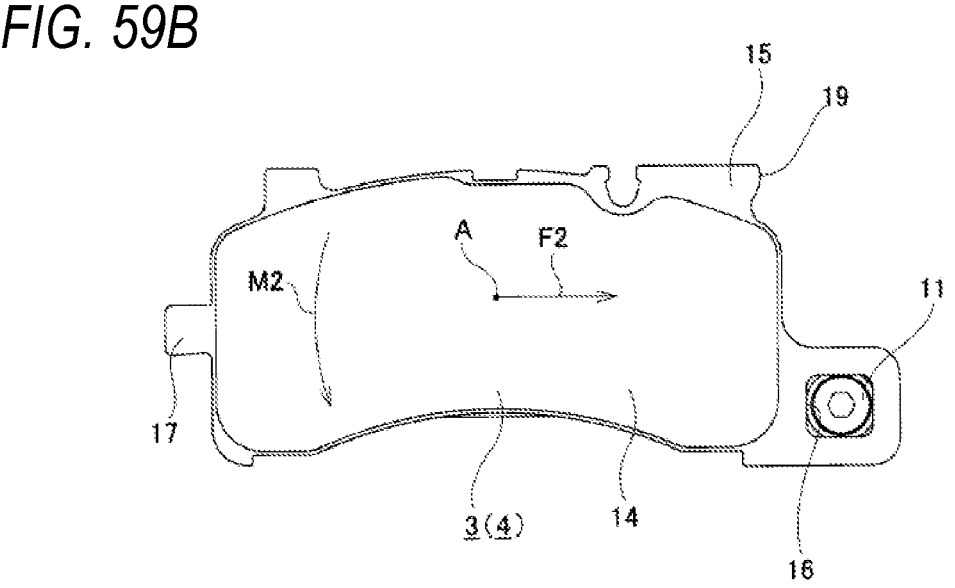

The nineteenth embodiment will be described with reference to FIG. 56.

In the present embodiment, a support structure of the inner pad 3a (and the outer pad 4a) to the caliper 2a (see FIG. 1 and the like) is changed. Specifically, in the present embodiment, the entire disc brake device 1a includes four pins 11a (see FIG. 17 and the like) in total. Two circumferential side portions of the inner pad 3a (and the outer pad 4a) are engaged with a pair of pins 11a supported by the caliper 2a to be movable in an axial direction of the rotor 5. For this reason, a back plate 15e of each of the inner pad 3a (and the outer pad 4a) includes the protruding portion 26 having the insertion hole 16a on two side circumferential portions.

In the present embodiment, the pin receiver 23 can be attached to not only an inner side of the insertion hole 16a disposed on the one circumferential side but also an inner side of the insertion hole 16a disposed on the other circumferential side. For this reason, abnormal sound due to a collision between an inner peripheral surface of the insertion hole 16a disposed on the one circumferential side and an outer peripheral surface of the pin 11a can be prevented, and abnormal sound due to a collision between an inner peripheral surface of the insertion hole 16a disposed on the other circumferential side and the outer peripheral surface of the pin 11a can be prevented.

Other configurations, operations, and effects are the same as those of the first embodiment.

Structures of the embodiments can be appropriately combined as long as no contradiction occurs.

The pin receiver of the present disclosure is not limited to the structures described in the embodiments, and its shape can be changed as appropriate as long as abnormal sound generated between the pin and the pin insertion portion can be prevented. The attachment position of the pin receiver and the number of attached pin receivers are not limited to the structures in the embodiments. The shape of the pin insertion portion (insertion hole and notch) to which the pin receiver is attached is not limited to the shapes described in the embodiments. Further, the support structure of the pad on the pad support member at the other circumferential side portion of the disc brake device is not limited to the structures described in the embodiments.

According to the present disclosure, it is possible to implement a disc brake device capable of reducing abnormal sound due to a collision between an inner peripheral surface of a pin insertion portion provided on a back plate and an outer peripheral surface of a pin inserted into the pin insertion portion.

What is claimed is:

1. A pad pin receiver comprising:
    a body plate configured to be attached to an inner side of a pin insertion portion provided in a back plate of a disc brake pad, the pin insertion portion being configured to engage with a pin inserted into the pin insertion portion during braking, the body plate being configured to cover a portion of an inner peripheral surface of the pin insertion portion; and
    a plurality of bent plates, a first bent plate of the plurality of bent plates is bent at a first end portion of the body plate in a length direction of the body plate, and a second bent plate of the plurality of bent plates is bent at a second end portion of the body plate in the length direction of the body plate, the first end portion of the body plate opposite the second end portion of the body plate, wherein
    a length of the first bent plate is larger than a length of the second bent plate,
    the body plate is configured to be brought into contact with the pin,
    when the body plate is attached to the pin insertion portion, the body plate is configured to extend in a thickness direction of the back plate, and the first bent plate and the second bent plate are configured to overlap with the back plate in the thickness direction of the back plate,
    the first bent plate includes a retaining portion configured to engage with the back plate,
    a tip end of the retaining portion is provided at a position below a top portion of the second bent plate, and
    a base end of the retaining portion is provided at a position which does not overlap with the second bent plate in the thickness direction of the back plate.

2. The pad pin receiver according to claim 1, wherein the first bent plate and the second bent plate are bent at a substantially right angle relative to the body plate at the first end portion of the body plate and the second end portion of the body plate, respectively, in the length direction.

3. The pad pin receiver according to claim 1, wherein the body plate and both the first bent plate and the second bent plate are jointed to each other by a curved portion having an arc cross-sectional shape.

4. The pad pin receiver according to claim 1, wherein the first bent plate is provided at the first end portion of the body plate in the length direction and the second bent plate is provided at the second end portion of the body plate in the length direction so that the first bent plate and the second bent plate elastically hold the back plate therebetween.

5. The pad pin receiver according to claim 1, wherein
    the retaining portion is provided only on the first bent plate,
    the second bent plate is not provided with a retaining portion, and
    the first bent plate is disposed on an axially outer side in an axial direction of a rotor, more than the second bent plate.

6. The pad pin receiver according to claim 1, wherein the retaining portion is constituted by a tongue piece surrounded by a substantially U-shaped slit.

7. The pad pin receiver according to claim 6, wherein
    the tongue piece extends in an extending direction of the first and second bent plates, and
    one of end portions of the tongue piece at a side of the body plate is a free end.

8. The pad pin receiver according to claim 1, further comprising:
    an auxiliary plate that is bent at at least one end portion of the body plate in a width direction of the body plate, the width direction being orthogonal to a length direction and a thickness direction of the body plate, and
    the auxiliary plate is configured to cover a portion of the inner peripheral surface of the pin insertion portion which is excluded from the portion covered by the body plate, when the body plate is attached to the pin insertion portion.

9. The pad pin receiver according to claim 8, wherein the auxiliary plate is bent at a substantially right angle relative to the body plate at the at least one end portion of the body plate in the width direction.

10. The pad pin receiver according to claim 8, wherein the auxiliary plate is configured to apply an elastic force to the pin inserted into the pin insertion portion.

11. The pad pin receiver according to claim 8, wherein
    the auxiliary plate includes a guide portion at one of end portions of the auxiliary plate in a length direction of the body plate,
    the one of the end portions of the auxiliary plate is disposed at farer away from a rotor than the other of the end portions of the auxiliary plate, and
    the guide portion is configured to protrude to an outer side relative to the pin insertion portion when the body plate is attached to the pin insertion portion.

12. A disc brake pad, the disc brake pad comprising:
    the pad pin receiver according to claim 1;
    a back plate including a pin insertion portion constituted by an insertion hole or a notch that engages with a pin inserted into the pin insertion portion, and
    a friction member supported on a front surface of the back plate, wherein
    the pad pin receiver is attached to an inner side of the pin insertion portion.

13. The disc brake pad according to claim 12, wherein
    the pin insertion portion is the insertion hole, and
    the insertion hole has a substantially rectangular shape.

14. The disc brake pad according to claim 12, wherein the body plate covers a radially outer side surface of the inner peripheral surface of the pin insertion portion which is located on an outer side in a radial direction of a rotor.

15. The disc brake pad according to claim 12, wherein the body plate covers a circumferential side surface of the inner peripheral surface of the pin insertion portion which is located on a side opposite to the friction member in a circumferential direction of a rotor.

16. A disc brake device comprising:
a pair of disc brake pads disposed with a rotor sandwiched therebetween; and
a pad support member including at least one pair of pins arranged in parallel to a central axis of the rotor, and configured to support the pair of disc brake pads to be movable in an axial direction of the rotor, wherein
at least one of the pair of disc brake pads is the disc brake pad according to claim 12.

* * * * *